(12) United States Patent
Kojima

(10) Patent No.: US 11,378,151 B2
(45) Date of Patent: Jul. 5, 2022

(54) VIBRATION-DAMPING DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 122 days.

(21) Appl. No.: 16/652,442

(22) PCT Filed: Oct. 11, 2018

(86) PCT No.: PCT/JP2018/037960
§ 371 (c)(1),
(2) Date: Mar. 31, 2020

(87) PCT Pub. No.: WO2019/074069
PCT Pub. Date: Apr. 18, 2019

(65) Prior Publication Data
US 2020/0232534 A1    Jul. 23, 2020

(30) Foreign Application Priority Data

Oct. 11, 2017  (JP) .............................. JP2017-197633
Nov. 8, 2017  (JP) .............................. JP2017-215411
(Continued)

(51) Int. Cl.
*F16F 13/10*    (2006.01)
*B60K 5/12*    (2006.01)

(52) U.S. Cl.
CPC ............ *F16F 13/10* (2013.01); *B60K 5/1208* (2013.01); *F16F 13/107* (2013.01)

(58) Field of Classification Search
CPC ........ F16F 13/10; F16F 13/107; B60K 5/1208
See application file for complete search history.

(56) References Cited

U.S. PATENT DOCUMENTS 4,568,069 A    2/1986  Poupard
4,583,723 A    4/1986  Ozawa
(Continued)

FOREIGN PATENT DOCUMENTS

CN    101305205 A    11/2008
CN    102434619 A    5/2012
(Continued)

OTHER PUBLICATIONS

Search Report dated Mar. 29, 2021 from the China National Intellectual Property Administration in CN Application No. 201880065984.8.
(Continued)

*Primary Examiner* — Pamela Rodriguez
(74) *Attorney, Agent, or Firm* — Sughrue Mion, PLLC

(57) ABSTRACT

The vibration-damping device includes a tubular first attachment member; a second attachment member; an elastic body that couples the first attachment member and the second attachment member to each other; and a partition member that partitions a liquid chamber within the first attachment member into a main liquid chamber having the elastic body in a portion of a barrier wall thereof, and an auxiliary liquid chamber. The partition member includes a membrane; a first orifice passage that includes a main liquid chamber-side passage, and an opposite liquid chamber-side passage; and a damping force difference increasing part that restrains any one of swelling deformation of the membrane toward the main liquid chamber side and swelling deformation of the membrane toward the opposite liquid chamber and increases a difference between a damping force generated when a bound load is input and a damping force generated when a rebound load is input.

9 Claims, 26 Drawing Sheets

(30) Foreign Application Priority Data

| Nov. 8, 2017 | (JP) | ............................ JP2017-215412 |
| Jun. 13, 2018 | (JP) | ............................ JP2018-113064 |
| Jun. 13, 2018 | (JP) | ............................ JP2018-113163 |

(56) References Cited

U.S. PATENT DOCUMENTS

| 4,907,786 | A | 3/1990 | Okazaki et al. |
| 10,487,905 | B2 * | 11/2019 | Takakura .............. F16F 13/105 |
| 2009/0008195 | A1 | 1/2009 | Ueki |
| 2014/0097564 | A1 | 4/2014 | Satori et al. |

FOREIGN PATENT DOCUMENTS

| EP | 1923597 | A1 | | 5/2008 |
| JP | 59-231233 | A | | 12/1984 |
| JP | 2007-085523 | A | | 4/2007 |
| JP | 2009052696 | A | * | 3/2009 |
| JP | 2009-103223 | A | | 5/2009 |
| JP | 2012-107763 | A | | 6/2012 |
| JP | 2019215052 | A | * | 12/2019 |
| WO | 2012165215 | A1 | | 12/2012 |

OTHER PUBLICATIONS

International Search Report for PCT/JP2018/037960 dated Jan. 15, 2019 (PCT/ISA/210).

Communication dated Jul. 1, 2021, from the European Patent Office in application No. 18866704.2.

\* cited by examiner

VIBRATION-DAMPING DEVICE

TECHNICAL FIELD

This application is a National Stage of International Application No. PCT/JP2018/037960 filed Oct. 11, 2018, claiming priority based on Japanese Patent Application No. 2017-197633, filed on Oct. 11, 2017, Japanese Patent Application No. 2017-215411 and Japanese Patent Application No. 2017-215412, filed on Nov. 8, 2017, and Japanese Patent Application No. 2018-113064 and Japanese Patent Application No. 2018-113163, on Jun. 13, 2018, the contents of which are incorporated herein by reference.

The present invention relates to a vibration-damping device that is applied to, for example, automobiles, industrial machines, or the like, and absorbs and damps vibrations of vibration generating parts, such as engines.

BACKGROUND ART

In the related art, for example, a vibration-damping device described in the following Patent Document 1 is known. The vibration-damping device includes a tubular first attachment member that is coupled to any one of a vibration generating part and a vibration receiving part, a second attachment member that is coupled to the other thereof, an elastic body that couples the first attachment member and the second attachment member to each other, and a partition member that partitions a liquid chamber within the first attachment member into a main liquid chamber having the elastic body in a portion of a barrier wall thereof, and an auxiliary liquid chamber.

The partition member includes a membrane that forms a portion of the barrier wall of the main liquid chamber, an intermediate chamber that is located opposite to the main liquid chamber side with the membrane therebetween and has the membrane in a portion of the barrier wall thereof, a first orifice passage that allows the main liquid chamber and the intermediate chamber to communicate with each other, and a second orifice passage that allows the intermediate chamber and the auxiliary liquid chamber to communicate with each other.

CITATION LIST

Patent Documents

[Patent Document 1]
Japanese Unexamined Patent Application, First Publication No. 2007-85523

SUMMARY OF INVENTION

Technical Problem

However, in the related-art vibration-damping device, a damping force generated when a bound load for causing a liquid to flow from the main liquid chamber toward the auxiliary liquid chamber side is input and a damping force generated when a rebound load for causing the liquid to flow from the auxiliary liquid chamber toward the main liquid chamber side is input cannot be made different from each other.

The invention has been made in view of the aforementioned circumstances, and an object thereof is to provide a vibration-damping device capable of making a damping force generated when a bound load is input and a damping force generated when a rebound load is input different from each other.

Solution to Problem

In order to solve the above problems, the invention suggests the following means. In a first aspect of the invention, a vibration-damping device a tubular first attachment member that is coupled to any one of a vibration generating part and a vibration receiving part, and a second attachment member that is coupled to the other thereof; an elastic body that couples the first attachment member and the second attachment member to each other; and a partition member that partitions a liquid chamber within the first attachment member into a main liquid chamber having the elastic body in a portion of a barrier wall thereof, and an auxiliary liquid chamber, and the partition member includes a membrane that forms a portion of the barrier wall of the main liquid chamber, a first orifice passage that is configured to allow the main liquid chamber and an opposite liquid chamber, which is located opposite to the main liquid chamber side with the membrane therebetween and has the membrane as a portion of a barrier wall thereof, to communicate with each other and in which a flow resistance of a liquid in an opposite liquid chamber-side passage located on the opposite liquid chamber side is different from a flow resistance of the liquid in a main liquid chamber-side passage located on the main liquid chamber side, and a damping force difference increasing part that restrains any one of swelling deformation of the membrane toward the main liquid chamber side and swelling deformation of the membrane toward the opposite liquid chamber and increases a difference between a damping force generated when a bound load is input and a damping force generated when a rebound load is input.

Advantageous Effects of Invention

According to the invention, the damping force generated when the bound load is input and the damping force generated when the rebound load is input can be made different from each other.

DESCRIPTION OF EMBODIMENTS

First Embodiment

Figure 1:
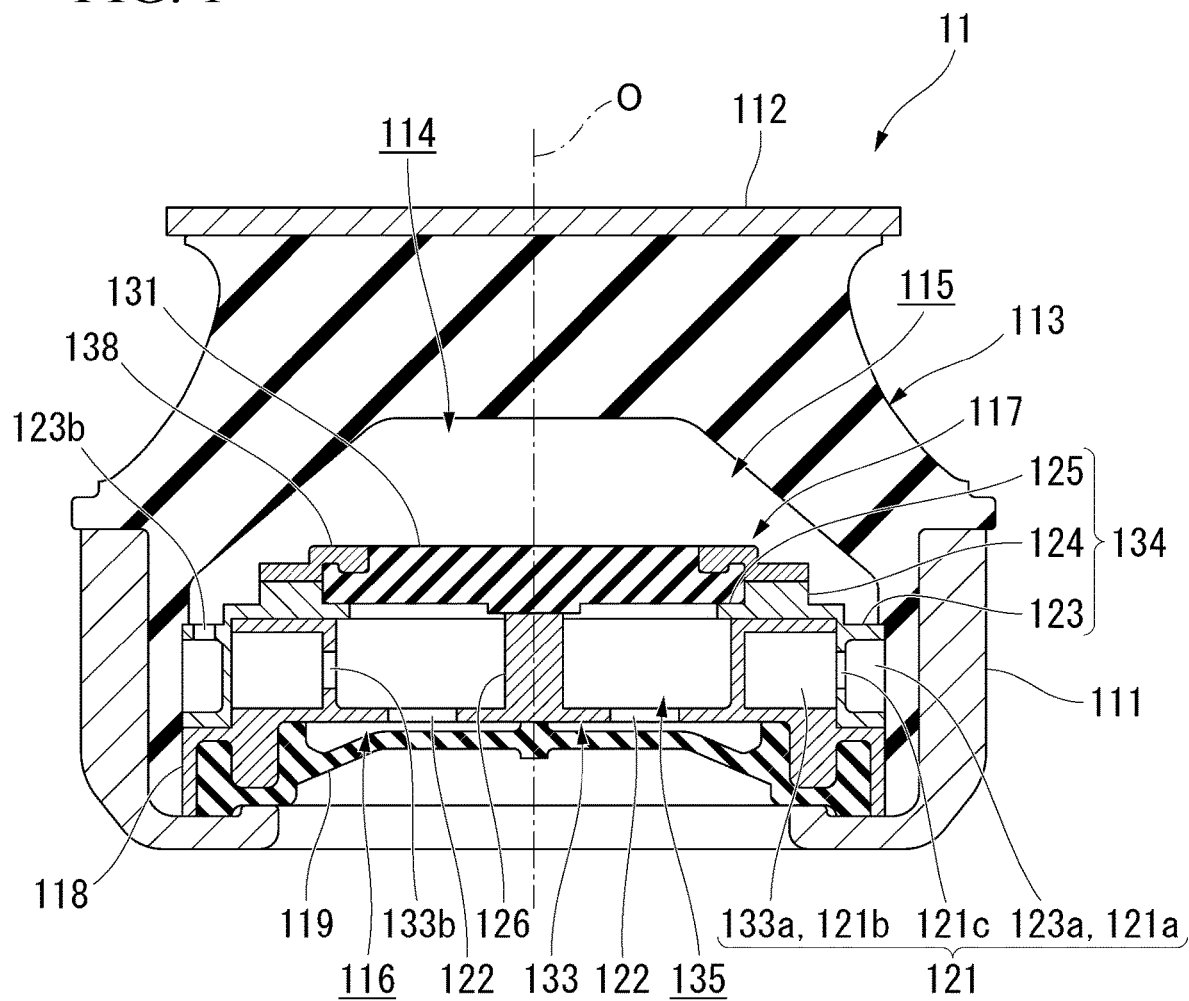
FIG. 1 is a longitudinal sectional view of a vibration-damping device related to a first embodiment of the invention.
Figure 2:
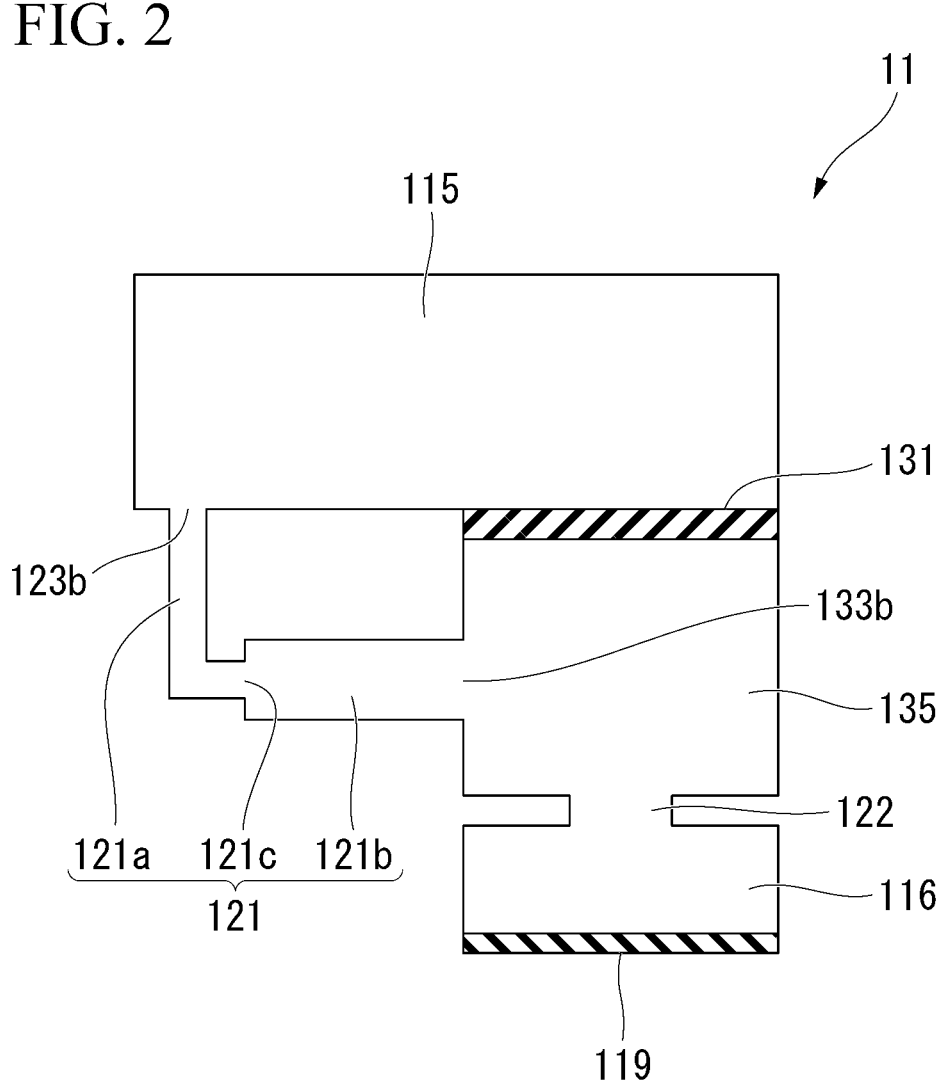
FIG. 2 is a schematic view of the vibration-damping device shown in FIG. 1.

Hereinafter, a vibration-damping device related to a first embodiment of the invention will be described, referring to FIGS. 1 and 2. As shown in FIG. 1, the vibration-damping device 11 includes a tubular first attachment member 111 that is coupled to any one of a vibration generating part and a vibration receiving part, a second attachment member 112 that is coupled to the other thereof, an elastic body 113 that couples the first attachment member 111 and the second attachment member 112 to each other, a partition member 117 that partitions a liquid chamber 114 within the first attachment member 111 into a main liquid chamber 115 and an auxiliary liquid chamber 116 having the elastic body 113 as a portion of a barrier wall. In the example shown, the partition member 117 partitions the liquid chamber 114 in an axial direction along a central axis O of the first attachment member 111. In a case where the vibration-damping device 11 is used, for example, an engine mount of an automobile, the first attachment member 111 is coupled to a vehicle body serving as the vibration receiving part, and the second attachment member 112 is coupled to an engine serving as the vibration generating part. As a result, the transmission of the vibration of the engine to the vehicle body is suppressed.

Hereinafter, the main liquid chamber 115 side in the axial direction with respect to the partition member 117 is referred to as an upper side, and the auxiliary liquid chamber 116 side is referred to as a lower side. Additionally, in a plan view of the vibration-damping device 11 as viewed from the axial direction, a direction orthogonal to the central axis O is referred to as a radial direction, and a direction going around the central axis O is referred to as a circumferential direction.

The first attachment member 111 is formed in a bottomed tubular shape. A bottom part of the first attachment member 111 is formed in an annular shape and is disposed coaxially with the central axis O. An inner peripheral surface of a lower part of the first attachment member 111 is covered with a covering rubber formed integrally with the elastic body 113. The second attachment member 112 is formed in a flat plate shape having front and back surfaces orthogonal to the central axis O. The second attachment member 112 is formed, for example, in a disk shape and is disposed coaxially with the central axis O. The second attachment member 112 is disposed above the first attachment member 111. The external diameter of the second attachment member 112 is equal to the internal diameter of the first attachment member 111.

The elastic body 113 couples an inner peripheral surface of an upper part of the first attachment member 111 and a lower surface of the second attachment member 112 to each other. An upper end opening part of the first attachment member 111 is sealed with the elastic body 113. The elastic body 113 is vulcanized and bonded to the first attachment member 111 and the second attachment member 112. The elastic body 113 is formed in a topped tubular shape and is disposed coaxially with the central axis O. A top wall part of the elastic body 113 is coupled to the second attachment member 112, and a lower end part in a peripheral wall part thereof is coupled to the first attachment member 111. The peripheral wall part of the elastic body 113 gradually extends outward in the radial direction from the upper side to the lower side.

A diaphragm ring 118 is liquid-tightly fitted into the lower end part of the first attachment member 111 via the covering rubber. The diaphragm ring 118 is formed in a double tubular shape and is disposed coaxially with the central axis O. An outer peripheral part of a diaphragm 119, which is formed to be elastically deformable with rubber or the like, is vulcanized and bonded to the diaphragm ring 118. An outer tube portion of the diaphragm ring 118 is fitted into the first attachment member 111, and an inner tube portion thereof is buried within the diaphragm 119. The diaphragm 119 is vulcanized and bonded to an inner peripheral surface of the outer tube portion of the diaphragm ring 118. The diaphragm 119 is deformed to expand and contract with the inflow and outflow of a liquid into the auxiliary liquid chamber 116. The liquid chamber 114 in which the liquid is enclosed is defined within the first attachment member 111 by the diaphragm 119 and the elastic body 113. In addition, as the liquid enclosed in the liquid chamber 114, for example, water, ethylene glycol, or the like can be used.

The partition member 117 is formed in a disk shape having front and back surfaces orthogonal to the central axis O and is fitted into the first attachment member 111 via the covering rubber. The liquid chamber 114 within the first attachment member 111 is divided into the main liquid chamber 115 defined by the elastic body 113 and the partition member 117 and the auxiliary liquid chamber 116 defined by the diaphragm 119 and the partition member 117 by the partition member 117.

The partition member 117 includes a tubular body member 134 that is fitted into the first attachment member 111 via the covering rubber, a membrane 131 that blocks an upper end opening part of the body member 134 and forms a portion of the barrier wall of the main liquid chamber 115, a lower member 133 that blocks a lower end opening part of the body member 134, an intermediate liquid chamber 135 that is located opposite to the main liquid chamber 115 side with the membrane 131 therebetween and has the membrane 131 as a portion of the barrier wall, an annular fixing member 138 that fixes the membrane 131 to the body member 134, a first orifice passage 121 that allows the main liquid chamber 115 and the intermediate liquid chamber 135 to communicate with each other, and a second orifice passage 122 that allows the intermediate liquid chamber 135 and the auxiliary liquid chamber 116 to communicate with each other. In addition, a liquid chamber, which is located opposite to the main liquid chamber 115 side with the membrane 131 therebetween and has the membrane in a portion of a barrier wall thereof, is referred to as an opposite liquid chamber. The opposite liquid chamber of the present embodiment and a second embodiment to be described below is the intermediate liquid chamber 135.

The membrane 131 is formed in a disk shape with an elastic material, such as rubber. The membrane 131 is disposed coaxially with the central axis O. The volume of the membrane 131 is smaller than the volume of the elastic body 113. The body member 134 includes a body ring 123 that is fitted into the first attachment member 111, an outer flange part 124 that protrudes inward in the radial direction from an upper end part of the body ring 123, and an inner flange part 125 that protrudes inward in the radial direction from a lower end part of the outer flange part 24. The body ring 123, the outer flange part 124, and the inner flange part 125 are disposed coaxially with the central axis O. Respective lower surfaces of the outer flange part 124 and the inner flange part 125 are flush with each other.

The membrane 131 is fitted into the outer flange part 124. An outer peripheral edge in a lower surface of the membrane 131 is supported on the inner flange part 125. The membrane 131 overhangs upward from an upper surface of the outer flange part 124. An outer peripheral edge in an upper surface of the membrane 131 is supported by a fixing member 138, and the outer peripheral edge of the membrane 131 is fixed by being sandwiched between the fixing member 138 and the inner flange part 125 in the axial direction. For this reason, the membrane 131 is supported to be elastically deformable in the axial direction with the outer peripheral edge thereof as a fixed end. The fixing member 138 is disposed coaxially with the central axis O, an outer peripheral part of the fixing member 138 is disposed on the upper surface of the outer flange part 124 and an inner peripheral part of the fixing member 138 supports the upper surface of the membrane 131.

A first orifice groove 123a, which opens outward in the radial direction and extends in the circumferential direction, is formed in an outer peripheral surface of the body ring 123 of the body member 134. A radially outer opening of the first orifice groove 123a is blocked by the covering rubber. A first communication hole 123b, which allows the main liquid chamber 115 and the first orifice groove 123a to communicate with each other, is formed in an upper surface of the body ring 123. The first communication hole 123b allows the main liquid chamber 115 and the first orifice groove 123a to communicate with each other in the axial direction. The first orifice groove 123a extends in the circumferential direction over an angular range exceeding 180° from the first communication hole 123b toward one side in the circumferential direction with the central axis O as a center.

The lower member 133 is formed in a bottomed tubular shape and is disposed coaxially with the central axis O. The lower member 133 is liquid-tightly fitted into the body ring 123 of the body member 134. A bottom wall part of the lower member 133 forms a barrier wall that partitions the auxiliary liquid chamber 116 and the intermediate liquid chamber 135 in the axial direction. An upper end opening edge of a peripheral wall part of the lower member 133 integrally abuts against respective lower surfaces of the outer flange part 124 and the inner flange part 125 in the body member 134. An upper surface of the bottom wall part of the lower member 133 is separated downward from the lower surface of the membrane 131. The aforementioned intermediate liquid chamber 135 is defined by the upper surface of the bottom wall part and an inner peripheral surface of the peripheral wall part in the lower member 133a and the lower surface of the membrane 131. The intermediate liquid chamber 135 and the main liquid chamber 115 are partitioned in the axial direction by the membrane 131. The internal volume of the intermediate liquid chamber 135 is smaller than the internal volume of the main liquid chamber 115.

A second orifice groove 133a, which opens outward in the radial direction and extends in the circumferential direction, is formed in an outer peripheral surface of the peripheral wall part of the lower member 133. A radially outer opening of the second orifice groove 133a is blocked by an inner peripheral surface of the body ring 123. A second communication hole 133b, which allows the second orifice groove 133a and the intermediate liquid chamber 135 to communicate with each other, is formed in an inner peripheral surface of the peripheral wall part of the lower member 133. The second communication hole 133b allows the second orifice groove 133a and the intermediate liquid chamber 135 to communicate with each other in the radial direction. The second orifice groove 133a extends in the circumferential direction over an angular range exceeding 180° from the second communication hole 133b toward one side in the circumferential direction with the central axis O as a center. End parts of the second orifice groove 133a and the first orifice groove 123a on one side in the circumferential direction are disposed at the same circumferential position.

The auxiliary liquid chamber 116 is defined by a lower surface of the bottom wall part in the lower member 133 and the diaphragm 119. A second orifice passage 122, which allows the auxiliary liquid chamber 116 and the intermediate liquid chamber 135 to communicate with each other, is formed in the bottom wall part of the lower member 133. The second orifice passage 122 allows the auxiliary liquid chamber 16 and the intermediate liquid chamber 135 to communicate with each other in the axial direction. An opening part of the second orifice passage 122 on the intermediate liquid chamber 135 side faces the membrane 131. The second orifice passage 122 is a through-hole formed in the bottom wall part of the lower member 133, and a plurality of the second orifice passages are formed in the bottom wall part of the lower member 133. All the second orifice passages 122 face the membrane 131 in the axial direction.

The aforementioned diaphragm ring 118 is disposed at an outer peripheral edge located radially outside the plurality of second orifice passages 122 on the lower surface of the bottom wall part in the lower member 133. The diaphragm ring 118 is formed integrally with the lower member 133. The portion of the diaphragm ring 118 located radially outside the inner tube portion is located radially outside the lower member 133, and a lower surface of the body ring 123 liquid-tightly abuts against an upper surface of a connection portion between the outer tube portion and the inner tube portion.

The channel cross-sectional area and the channel length of each second orifice passage 122 are smaller than the channel cross-sectional area and the channel length of the first orifice passage 121 to be described below, respectively. The channel length of the second orifice passage 122 is smaller than the internal diameter thereof. In addition, the channel length of the second orifice passage 122 may be equal to or greater than the internal diameter. The flow resistance of the liquid in each second orifice passage 122 is smaller than the flow resistance of the liquid in the first orifice passage 121.

Here, a connection hole 121c, which allows the first orifice groove 123a and the second orifice groove 133a to communicate with each other, is formed in the inner peripheral surface of the body ring 123. The connection hole 121c allows the first orifice groove 123a and the second orifice groove 133a to communicate with each other in the radial direction. Also, the first orifice passage 121, which allows the main liquid chamber 115 and the intermediate liquid chamber 135 to communicate with each other is constituted of the first orifice groove 123a having the radially outer opening blocked by the covering rubber and the second orifice groove 133a having a radially outer opening blocked by the inner peripheral surface of the body ring 123, and the connection hole 121c. Hereinafter, the portion of the first orifice passage 121, which is located on the main liquid chamber 115 side and is defined by the first orifice groove 123a, is referred to as a main liquid chamber-side passage 121a, and the portion of the first orifice passage, which is located on the intermediate liquid chamber 135 side and is defined by the second orifice groove 133a, is referred to as an intermediate liquid chamber-side passage 121b. In addition, the portion of the first orifice passage, which is located opposite to the main liquid chamber side with the membrane therebetween and is located on the liquid chamber (opposite liquid chamber) having the membrane in a portion of a barrier wall thereof, is referred to as an opposite liquid chamber-side passage. The opposite liquid chamber-side passage of the present embodiment and the second embodiment to be described below is an intermediate liquid chamber-side passage 121b.

Here, the connection hole 121c connects an end part of the first orifice groove 123a on one side in the circumferential direction and an end part of the second orifice groove 133a on one side in the circumferential direction to each other. As a result, a liquid flows from any one of the main liquid chamber-side passage 121a and the intermediate liquid chamber-side passage 121b through the connection hole 121c to the other, and in the process in which the liquid flows through the other, the flow direction of the liquid flowing through the one and the flow direction of the liquid flowing through the other are opposite to each other in the circumferential direction.

Also, in the present embodiment, a restraining member 126, which restrains swelling deformation of the membrane 131 toward the intermediate liquid chamber 135 side, is disposed. The restraining member 126 is disposed in the partition member 117. The restraining member 126 is formed in a columnar shape that is erected upward from the bottom wall part of the lower member 133. An upper end surface of the restraining member 126 is in abutment against or close to the lower surface of the membrane 131. In the example shown, the membrane 131 abuts against the upper end surface of the restraining member 126 in a state where an upward pressing force is not applied from the restraining member 126. In this case, in a case where the lower surface of the membrane 131 is close to the upper end surface of the restraining member 126, when a rebound load is input, it is possible to smoothly swell and deform the membrane 131 toward the main liquid chamber 115 side, and an increase in a damping force can be reliably prevented. The restraining member 126 is in abutment against or close to a central part of the membrane 131 in the radial direction.

In addition, the restraining member 126 may be formed, for example, in a tubular shape, may abut against a portion apart from the central part of the membrane 131 in the radial direction, may be formed in a plate shape that, for example, abuts against the entire lower surface of the membrane 131, or may be appropriately changed without being limited to the above embodiment. The restraining member 126 may be appropriately changed, for example, by being disposed in the first attachment member 111. For example, the restraining member 126 may be formed integrally with the same material as the membrane 131. The restraining member 126 may abut against the membrane 131 in a state where the upward pressing force is applied.

Moreover, in the present embodiment, the flow resistance of the liquid in the main liquid chamber-side passage 121a is higher than the flow resistance of the liquid in the intermediate liquid chamber-side passage 121b. In the example shown, the channel cross-sectional area of the main liquid chamber-side passage 121a is smaller than the channel cross-sectional area of the intermediate liquid chamber-side passage 121b. The opening area of the connection hole 121c is smaller than the channel cross-sectional area of the main liquid chamber-side passage 121a. The channel length of the connection hole 121c is shorter than the channel length of each of the main liquid chamber-side passage 121a and the intermediate liquid chamber-side passage 121b. In addition, in a longitudinal sectional view of the first orifice passage 121, the axial length of the intermediate liquid chamber-side passage 121b is equal to the radial length of the intermediate liquid chamber-side passage 121b and the axial length of the main liquid chamber-side passage 121a. In the longitudinal sectional view of the first orifice passage 121, the radial length of the main liquid chamber-side passage 121a is shorter than the axial length of the main liquid chamber-side passage 121a.

Here, the respective flow resistances of the main liquid chamber-side passage 121a and the first communication hole 123b may be equal to each other or may be different from each other. For example, in a case where the flow resistance of the main liquid chamber-side passage 121a is higher than the flow resistance of the first communication hole 123b, the flow resistance of the liquid when passing through the first communication hole 123b and entering the main liquid chamber-side passage 121a is increased, and a high damping force is generated when a bound load for causing the liquid to flow from the main liquid chamber 115 toward the auxiliary liquid chamber 116 side is input.

Additionally, the respective flow resistances of the connection hole 121c and the main liquid chamber-side passage 121a may be equal to each other or may be different from each other. For example, in a case where the flow resistance of the connection hole 121c is higher than the flow resistance of the main liquid chamber-side passage 121a, the flow resistance of the liquid when passing through the main liquid chamber-side passage 121a and entering the connection hole 121c is increased, and a high damping force is generated when the bound load is input.

Additionally, the respective flow resistances of the intermediate liquid chamber-side passage 121b and the connection hole 121c may be equal to each other or may be different from each other. For example, in a case where the flow resistance of the intermediate liquid chamber-side passage 121b is higher than the flow resistance of the connection hole 121c, the flow resistance of the liquid when passing through the connection hole 121c and entering the intermediate liquid chamber-side passage 121b is increased, and a high damping force is generated when the bound load is input.

Additionally, the respective flow resistances of the second communication hole 133b and the intermediate liquid chamber-side passage 121b may be equal to each other or may be different from each other. For example, in a case where the flow resistance of the second communication hole 133b is higher than the flow resistance of the intermediate liquid chamber-side passage 121b, the flow resistance of the liquid when passing through the intermediate liquid chamber-side passage 121b and entering the second communication hole 133b is increased, and a high damping force is generated when the bound load is input.

Additionally, in the present embodiment, an opening direction in which the first orifice passage 121 opens toward the intermediate liquid chamber 135, that is, an opening direction of the second communication hole 133b toward the intermediate liquid chamber 135 intersects an opening direction in which the second orifice passage 122 opens toward the intermediate liquid chamber 135. In the example shown, the second communication hole 133b opens in the radial direction toward the intermediate liquid chamber 135, and the second orifice passage 122 opens in the axial direction toward the intermediate liquid chamber 135. That is, the opening direction of the second communication hole 133b toward the intermediate liquid chamber 135 is orthogonal to the opening direction in which the second orifice passage 122 opens toward the intermediate liquid chamber 135.

Additionally, in the present embodiment, the cross-sectional area of the intermediate liquid chamber 135 in the direction orthogonal to the opening direction in which the second orifice passage 122 opens toward the intermediate liquid chamber 135 is larger than the channel cross-sectional area of the second orifice passage 122, the channel cross-sectional area of the intermediate liquid chamber-side passage 121b of the first orifice passage 121, and the channel cross-sectional area of the main liquid chamber-side passage 121a of the first orifice passage 121. Additionally, in the present embodiment, the main liquid chamber-side passage 121a and the intermediate liquid chamber-side passage 121b are passages having a longer channel length than a channel diameter. Here, in the example shown, the channel cross-sectional shape of the first orifice passage 121 is a rectangular shape. In this case, when the channel cross-sectional shape is substituted with a circular shape having the same channel cross-sectional area, the channel diameter can be represented by the diameter of the circular shape.

As described above, according to the vibration-damping device 11 related to the present embodiment, the restraining member 126 that restrains the swelling deformation of the membrane 131 toward the intermediate liquid chamber 135 side is provided. Thus, when the bound load for causing the liquid to flow from the main liquid chamber 115 toward the auxiliary liquid chamber 116 side is input and a positive pressure acts on the main liquid chamber 115, the membrane 131 is restrained from swelled and deformed toward the intermediate liquid chamber 135 side. Therefore, the positive pressure of the main liquid chamber 115 is not relieved, and a high damping force can be generated. On the other hand, when the rebound load for causing the liquid to flow from the auxiliary liquid chamber 116 toward the main liquid chamber 115 side is input to the vibration-damping device 11, the restraining member 126 does not restrain the deformation of the membrane 131, and the membrane 131 is smoothly swelled and deformed toward the main liquid chamber 115 side, and thereby, an increase in the damping force is suppressed. That is, the restraining member 126 of the present embodiment is a damping force difference increasing part that restrains the swelling deformation of the membrane 131 toward the intermediate liquid chamber (opposite liquid chamber) 135 side out of the swelling deformation of the membrane 131 toward the main liquid chamber 115 side and the swelling deformation of the membrane 131 toward the intermediate liquid chamber (opposite liquid chamber) 135 side and that increases a difference between the damping force generated when the bound load is input and the damping force generated when the rebound load is input.

Moreover, since the partition member 117 includes the intermediate liquid chamber 135 having the membrane 131 in a portion of the barrier wall, when the bound load is input and when the liquid of the main liquid chamber 115 flows into the intermediate liquid chamber 135 through the first orifice passage 121, the membrane 131 is elastically deformed so as to swell toward the main liquid chamber 115 side. Hence, the flow speed of the liquid is reduced until the liquid of the main liquid chamber 115 flows into the second orifice passage 122, and a high damping force can be generated when the bound load is input. As described above, the damping force generated when the bound load is input can be made higher than the damping force generated when the rebound load is input.

Additionally, the flow resistance of the liquid in the main liquid chamber-side passage 121a in the first orifice passage 121 that allows the main liquid chamber 115 and the intermediate liquid chamber 135 to communicate with each other is higher than the flow resistance of the liquid in the intermediate liquid chamber-side passage 121b. Thus, when the bound load is input and when the liquid of the main liquid chamber 115 flows into the main liquid chamber-side passage 121a through the first orifice passage 121, a larger resistance is applied compared to a case where the liquid directly flows into the intermediate liquid chamber-side passage 121b. As a result, a high damping force can be generated when the bound load is input. On the other hand, when the liquid on the auxiliary liquid chamber 116 side flows through the first orifice passage 121 toward the main liquid chamber 115, even if the flow resistance is different between the main liquid chamber-side passage 121a and the intermediate liquid chamber-side passage 121b, both the passages constitute one orifice passage continuously with each other. Thus, it is possible to suppress the resistance generated when the liquid passes through a boundary portion therebetween, and the damping force generated when the rebound load is input can be suppressed. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased.

Moreover, even if the main liquid chamber 115 tends to have a negative pressure suddenly with the input of a large rebound load, the membrane 131 is smoothly swelled and deformed toward the main liquid chamber 115 side, and thereby, the negative pressure of the main liquid chamber 115 can be suppressed. Therefore, the occurrence of cavitation can also be suppressed. Additionally, these respective functions and effects are achieved by a configuration in which the flow resistance of the liquid in the main liquid chamber-side passage 121a is higher than the flow resistance of the liquid in the intermediate liquid chamber-side passage 121b and the membrane 131 constitutes portions of the barrier walls of both the main liquid chamber 115 and intermediate liquid chamber 135, as mentioned above, without adopting, for example, members that operate when the liquid pressure within the main liquid chamber 115 reaches a predetermined value. Therefore, the aforementioned functions and effects can be stably and accurately achieved even with vibration of a relatively small amplitude.

Additionally, since the opening direction in which the first orifice passage 121 opens toward the intermediate liquid chamber 135 intersects the opening direction in which the second orifice passage 122 opens toward the intermediate liquid chamber 135, it is possible to suppress that the liquid from the main liquid chamber 115 side that has flowed into the intermediate liquid chamber 135 goes straight toward the second orifice passage 122, and this liquid can be diffused within the intermediate liquid chamber 135. As a result, the flow speed of the liquid is reliably reduced until the liquid of the main liquid chamber 115 flows into the second orifice passage 122.

Additionally, since the cross-sectional area of the intermediate liquid chamber 135 is larger than the channel cross-sectional area of the second orifice passage 122, it is possible to increase the resistance generated when the liquid of the intermediate liquid chamber 135 flows into the second orifice passage 122, and the damping force generated when the bound load is input can be reliably increased. Additionally, since the main liquid chamber-side passage 121a of the first orifice passage 121 is a passage having a longer channel length than a channel diameter, the resistance applied to the liquid from the main liquid chamber 115 side that flows into this portion can be much more reliably increased.

Second Embodiment

Figure 3:
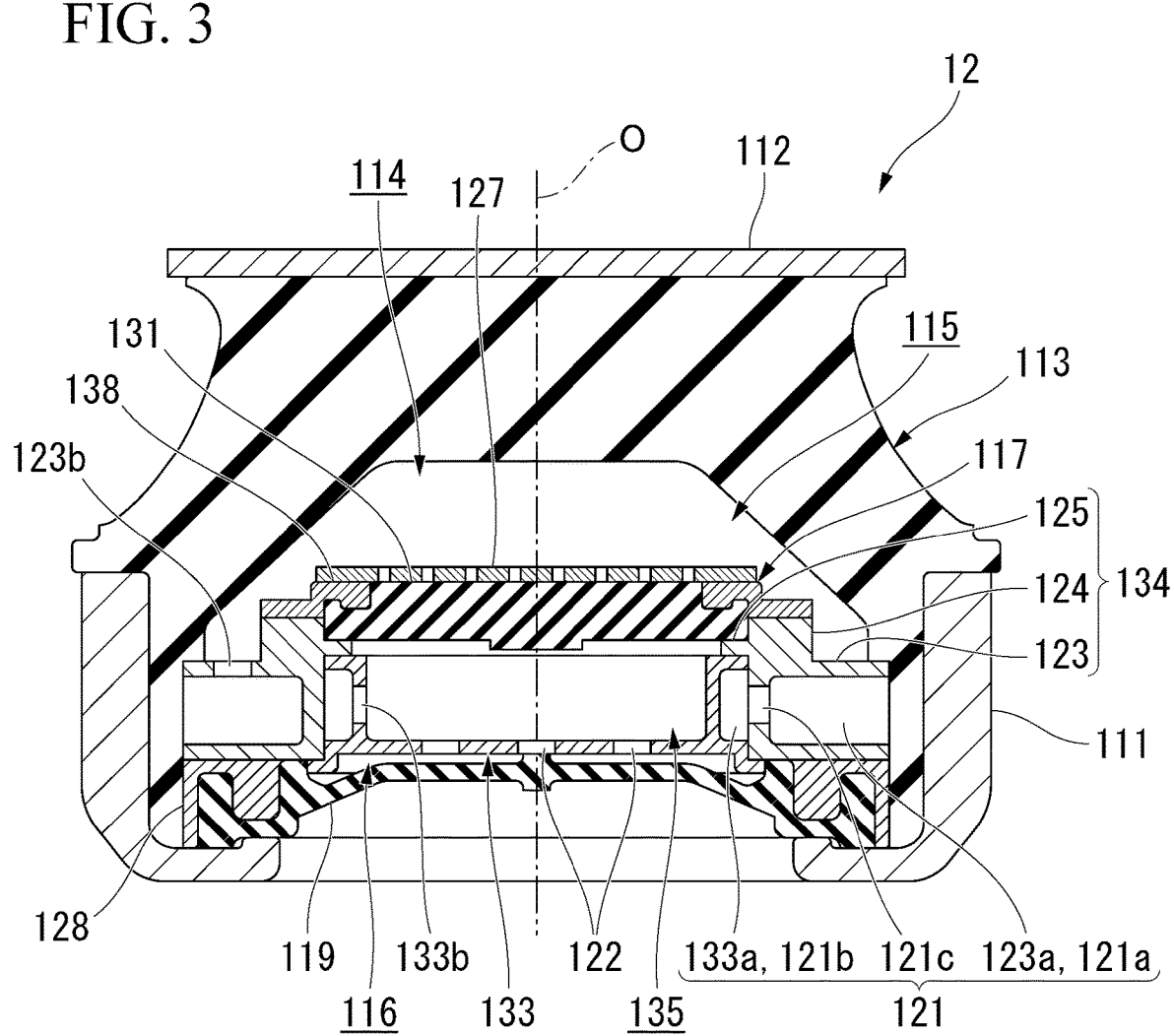
FIG. 3 is a longitudinal sectional view of a vibration-damping device related to a second embodiment of the invention.
Figure 4:
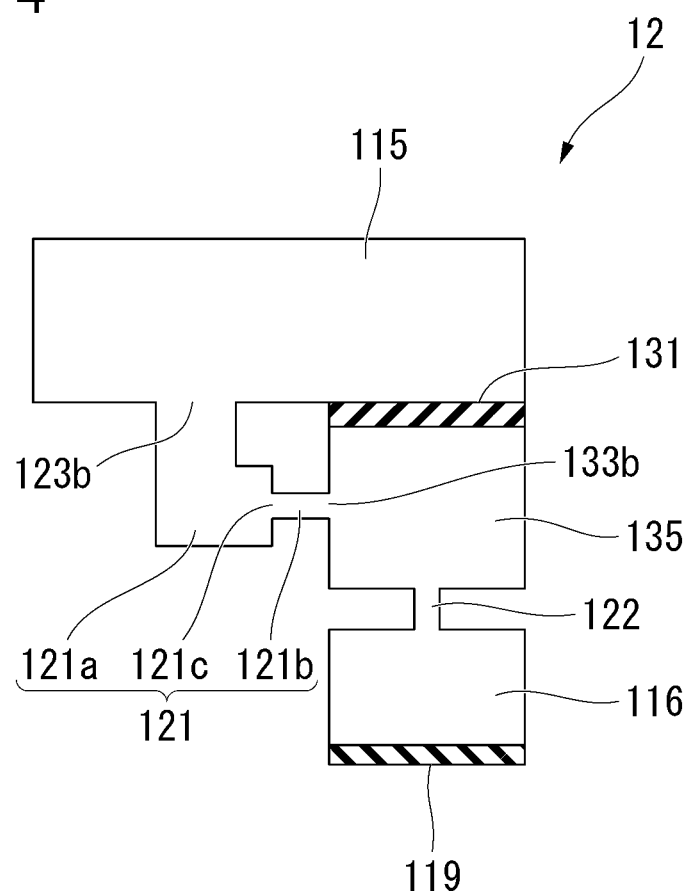
FIG. 4 is a schematic view of the vibration-damping device shown in FIG. 3.

Next, a vibration-damping device related to a second embodiment of the invention will be described, referring to FIGS. 3 and 4. In addition, in the second embodiment, the same portions as the constituent elements in the above-described first embodiment will be designated by the same reference signs, and a description thereof will be omitted, and only different points will be described.

A diaphragm ring 128 is formed in a topped tubular shape having an annular top wall part and is disposed coaxially with the central axis O. A tubular body, which protrudes downward and is disposed coaxially with the central axis O, is formed on the top wall part of the diaphragm ring 128. An outer peripheral part of the diaphragm 119 is vulcanized and bonded to an inner surface of the diaphragm ring 128. The tubular body of the diaphragm ring 128 is buried within the diaphragm 119.

An upper surface of the top wall part of a diaphragm ring 128 liquid-tightly abuts against a lower surface of the body ring 123 of the partition member 117. The outer flange part 124 of the partition member 117 protrudes upward from an inner peripheral edge in the upper surface of the body ring 123. Respective inner peripheral surfaces the outer flange part 124 and the body ring 123 are flush with each other. The upper end opening edge of the peripheral wall part of the lower member 133 abuts against the lower surface of the inner flange part 125 of the body member 134.

Also, in the present embodiment, a restraining member 127, which restrains swelling deformation of the membrane 131 toward the main liquid chamber 115 side, is disposed. The restraining member 127 is formed in a plate shape, and an outer peripheral edge thereof is disposed on an inner peripheral part of the fixing member 138. A plurality of through-holes, which penetrate in the axial direction, are formed in the entire restraining member 127. An entire upper surface of the membrane 131 is in abutment against or close to the lower surface of the restraining member 127. In the example shown, the membrane 131 abuts against the lower surface of the restraining member 127 in a state where a downward pressing force is not applied from the restraining member 127. In addition, the restraining member 127 may be formed, for example, a columnar shape or a tubular shape that is in abutment against or close to a portion of the upper surface of the membrane 131 or may be appropriately changed without being limited to the above embodiment. The restraining member 127 may be appropriately changed, for example, by being disposed in the first attachment member 111.

Moreover, in the present embodiment, the flow resistance of the liquid in the intermediate liquid chamber-side passage 121b is higher than the flow resistance of the liquid in the main liquid chamber-side passage 121a. In the example shown, the channel cross-sectional area of the intermediate liquid chamber-side passage 121b is smaller than the channel cross-sectional area of the main liquid chamber-side passage 121a. Additionally, the opening area of the connection hole 121c is smaller than the channel cross-sectional area of the intermediate liquid chamber-side passage 121b. In addition, in a longitudinal sectional view of the first orifice passage 121, the axial length of the intermediate liquid chamber-side passage 121b is longer than the radial length of the intermediate liquid chamber-side passage 121b and is equal to the axial length of the main liquid chamber-side passage 121a. In the longitudinal sectional view of the first orifice passage 121, the radial length of the main liquid chamber-side passage 121a is longer than the axial length of the main liquid chamber-side passage 121a.

Here, the respective flow resistances of the intermediate liquid chamber-side passage 121b and the second communication hole 133b may be equal to each other or may be different from each other. For example, in a case where the flow resistance of the intermediate liquid chamber-side passage 121b is higher than the flow resistance of the second communication hole 133b, the flow resistance of the liquid when passing through the second communication hole 133b and entering the intermediate liquid chamber-side passage 121b is increased, and a high damping force is generated when a rebound load for causing the liquid to flow from the auxiliary liquid chamber 116 toward the main liquid chamber 115 side is input.

Additionally, the respective flow resistances of the connection hole 121c and the intermediate liquid chamber-side passage 121b may be equal to each other or may be different from each other. For example, in a case where the flow resistance of the connection hole 121c is higher than the flow resistance of the intermediate liquid chamber-side passage 121b, the flow resistance of the liquid when passing through the intermediate liquid chamber-side passage 121b and entering the connection hole 121c is increased, and a high damping force is generated when the rebound load is input.

Additionally, the respective flow resistances of the main liquid chamber-side passage 121a and the connection hole 121c may be equal to each other or may be different from each other. For example, in a case where the flow resistance of the main liquid chamber-side passage 121a is higher than the flow resistance of the connection hole 121c, the flow resistance of the liquid when passing through the connection hole 121c and entering the main liquid chamber-side passage 121a is increased, and a high damping force is generated when the rebound load is input.

Additionally, the respective flow resistances of the first communication hole 123b and the main liquid chamber-side passage 121a may be equal to each other or may be different from each other. For example, in a case where the flow resistance of the first communication hole 123b is higher than the flow resistance of the main liquid chamber-side passage 121a, the flow resistance of the liquid when passing through the main liquid chamber-side passage 121a and entering the first communication hole 123b is increased, and a high damping force is generated when the rebound load is input.

As described above, according to the vibration-damping device 12 related to the present embodiment, the restraining member 127 that restrains the swelling deformation of the membrane 131 toward the main liquid chamber 115 side is provided. Thus, when the rebound load is input and the negative pressure acts on the main liquid chamber 115, the membrane 131 is restrained from swelled and deformed toward the main liquid chamber 115 side. Therefore, the negative pressure of the main liquid chamber 115 is not relieved, and a high damping force can be generated. On the other hand, when the bound load is input to the vibration-damping device 12, the restraining member 127 does not restrain the deformation of the membrane 131, and the membrane 131 is smoothly swelled and deformed toward the intermediate liquid chamber 135 side, and thereby, an increase in the damping force is suppressed. That is, the restraining member 127 of the present embodiment is a damping force difference increasing part that restrains the swelling deformation of the membrane 131 toward the main liquid chamber 115 side out of the swelling deformation of the membrane 131 toward the main liquid chamber 115 side and the swelling deformation of the membrane 131 toward the intermediate liquid chamber (opposite liquid chamber) 135 side and that increases a difference between the damping force generated when the bound load is input and the damping force generated when the rebound load is input.

Moreover, since the partition member 117 includes the intermediate liquid chamber 135, when the rebound load is input and when the liquid of the auxiliary liquid chamber 116 flows into the intermediate liquid chamber 135, the liquid collides against a front surface on which the second orifice passage 122 opens out of wall surfaces that define the auxiliary liquid chamber 116. As a result, the flow speed of the liquid is reduced until the liquid of the auxiliary liquid chamber 116 flows into the first orifice passage 121, and a high damping force can be generated when the rebound load is input. As described above, the damping force generated when the rebound load is input can be made higher than the damping force generated when the bound load is input.

Additionally, the flow resistance of the liquid in the intermediate liquid chamber-side passage 121b in the first orifice passage 121 that allows the main liquid chamber 115 and the intermediate liquid chamber 135 to communicate with each other is higher than the flow resistance of the liquid in the main liquid chamber-side passage 121a. Thus, when the rebound load is input and when the liquid of the auxiliary liquid chamber 116 flows into the intermediate liquid chamber-side passage 121b of the first orifice passage 121 after flowing into the intermediate liquid chamber 135 through the second orifice passage 122, a larger resistance is applied compared to a case where the liquid directly flows into the main liquid chamber-side passage 121a. As a result, a high damping force can be generated when the rebound load is input. On the other hand, when the liquid of the main liquid chamber 115 flows through the first orifice passage 121 toward the auxiliary liquid chamber 116, even if the flow resistance is different between the main liquid chamber-side passage 121a and the intermediate liquid chamber-side passage 121b, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Additionally, these respective functions and effects are achieved by a configuration in which the flow resistance of the liquid in the intermediate liquid chamber-side passage 121b is higher than the flow resistance of the liquid in the main liquid chamber-side passage 121a and the membrane 131 constitutes portions of both the barrier walls of both the main liquid chamber 115 and intermediate liquid chamber 135, as mentioned above, without adopting, for example, members that operate when the liquid pressure within the main liquid chamber 115 reaches a predetermined value. Therefore, the aforementioned functions and effects can be stably and accurately achieved even with vibration of a relatively small amplitude. Additionally, since the cross-sectional area of the intermediate liquid chamber 135 is larger than the channel cross-sectional area of the intermediate liquid chamber-side passage 121b of the first orifice passage 121, it is possible to reliably increase the resistance generated when the liquid of the intermediate liquid chamber 135 flows into the intermediate liquid chamber-side passage 121b, and the damping force generated when the rebound load is input can be reliably increased. Additionally, since the intermediate liquid chamber-side passage 121b of the first orifice passage 121 is a passage having a longer channel length than a channel diameter, the resistance applied to the liquid from the auxiliary liquid chamber 116 side that flows into this portion can be much more reliably increased.

The vibration-damping devices 11 and 12 related to the first and second embodiments described above include the tubular first attachment member 111 that is coupled to any one of the vibration generating part and the vibration receiving part, the second attachment member 112 that is coupled to the other thereof, the elastic body 113 that couples the first attachment member 111 and the second attachment member 112 to each other, and the partition member 117 that partitions the liquid chamber within the first attachment member 111 into the main liquid chamber 115 having the elastic body 113 in a portion of a barrier wall thereof, and the auxiliary liquid chamber 116, and the partition member 117 includes the membrane 131 that forms a portion of the barrier wall of the main liquid chamber 115, the first orifice passage 121 that allows the main liquid chamber 115 and the opposite liquid chamber, which is located opposite to the main liquid chamber 115 side with the membrane 131 therebetween and has the membrane 131 in a portion of the barrier wall thereof, to communicate with each other and in which the flow resistance of the liquid in the opposite liquid chamber-side passage located on the opposite liquid chamber side is different from the flow resistance of the liquid in the main liquid chamber-side passage 121a located on the main liquid chamber 115 side, and the damping force difference increasing part that restrains any one of the swelling deformation of the membrane 131 toward the main liquid chamber 115 side and the swelling deformation of the membrane 131 toward the opposite liquid chamber and increases a difference between the damping force generated when the bound load is input and the damping force generated when the rebound load is input.

As a result, since the vibration-damping device 11 or 12 includes the damping force difference increasing part, any one of the swelling deformation of the membrane 131 toward the main liquid chamber 115 side and the swelling deformation of the membrane 131 toward the opposite liquid chamber can be restrained, and the difference between the damping force generated when the bound load is input and the damping force generated when the rebound load is input can be increased.

Here, the partition member 117 may further include the intermediate liquid chamber 135, which is the opposite liquid chamber, and the second orifice passage 122 that allows the intermediate liquid chamber 135 and the auxiliary liquid chamber 116 to communicate with each other, and the damping force difference increasing part may include the restraining member 126 or 127 that restrains any one of the swelling deformation of the membrane 131 toward the intermediate liquid chamber 135 side or the swelling deformation of the membrane 131 toward the main liquid chamber 115 side.

In this case, in a case where the restraining member 126 restrains the swelling deformation of the membrane 131 toward the intermediate liquid chamber 135 side is provided, when the bound load for causing the liquid to flow from the main liquid chamber 115 toward the auxiliary liquid chamber 116 side is input to the vibration-damping device 11 and a positive pressure acts on the main liquid chamber 115, the membrane 131 is restrained from swelled and deformed toward the intermediate liquid chamber 135 side. Therefore, the positive pressure of the main liquid chamber 115 is not relieved, and a high damping force can be generated. In this case, when the rebound load for causing the liquid to flow from the auxiliary liquid chamber 116 toward the main liquid chamber 115 side is input to the vibration-damping device 11, the restraining member 126 does not restrain the deformation of the membrane 131, and the membrane 131 is smoothly swelled and deformed toward the main liquid chamber 115 side, and thereby, an increase in the damping force is suppressed. Moreover, since the partition member 117 includes the intermediate liquid chamber 135 having the membrane 131 in a portion of the barrier wall, when the bound load is input and when the liquid of the main liquid chamber 115 flows into the intermediate liquid chamber 135 through the first orifice passage 121, the membrane 131 is elastically deformed so as to swell toward the main liquid chamber 115 side. Hence, the flow speed of the liquid is reduced until the liquid of the main liquid chamber 115 flows into the second orifice passage 122, and a high damping force can be generated when the bound load is input. As described above, the damping force generated when the bound load is input can be made higher than the damping force generated when the rebound load is input.

On the other hand, in a case where the restraining member 127 restrains the swelling deformation of the membrane 131 toward the main liquid chamber 115 side, when the rebound load is input to the vibration-damping device 12 and the negative pressure acts on the main liquid chamber 115, the membrane 131 is restrained from being swelled and deformed toward the main liquid chamber 115 side. Therefore, the negative pressure of the main liquid chamber 115 is not relieved, and a high damping force can be generated. In this case, when the bound load is input to the vibration-damping device 12, the restraining member 127 does not restrain the deformation of the membrane 131, and the membrane 131 is smoothly swelled and deformed toward the intermediate liquid chamber 135 side, and thereby, an increase in the damping force is suppressed. Moreover, since the partition member 117 includes the intermediate liquid chamber 135, when the rebound load is input and when the liquid of the auxiliary liquid chamber 116 flows into the intermediate liquid chamber 135, the liquid collides against a front surface on which the second orifice passage 122 opens out of wall surfaces that define the auxiliary liquid chamber 116. As a result, the flow speed of the liquid is reduced until the liquid of the auxiliary liquid chamber 116 flows into the first orifice passage 121, and a high damping force can be generated when the rebound load is input. As described above, the damping force generated when the rebound load is input can be made higher than the damping force generated when the bound load is input.

Here, the restraining member 126 may restrain the swelling deformation of the membrane 131 toward the intermediate liquid chamber 135 side, and the flow resistance of the liquid in the main liquid chamber-side passage 121a in the first orifice passage 121 may be higher than the flow resistance of the liquid in the intermediate liquid chamber-side passage 121b located on the intermediate liquid chamber 135 side as the opposite liquid chamber-side passage.

In this case, the flow resistance of the liquid in the portion (hereinafter the main liquid chamber-side passage 121a) located on the main liquid chamber 115 side in the first orifice passage 121 that allows the main liquid chamber 115 and the intermediate liquid chamber 135 to communicate with each other is higher than the flow resistance of the liquid in the portion (hereinafter the intermediate liquid chamber-side passage 121b) located on the intermediate liquid chamber 135 side. Thus, when the bound load is input and when the liquid of the main liquid chamber 115 flows into the main liquid chamber-side passage 121a through the first orifice passage 121, a larger resistance is applied compared to a case where the liquid directly flows into the intermediate liquid chamber-side passage 121b. As a result, a high damping force can be generated when the bound load is input. On the other hand, when the liquid on the auxiliary liquid chamber 116 side flows through the first orifice passage 121 toward the main liquid chamber 115, even if the flow resistance is different between the main liquid chamber-side passage 121a and the intermediate liquid chamber-side passage 121b, both the passages constitute one orifice passage continuously with each other. Thus, it is possible to suppress the resistance generated when the liquid passes through a boundary portion therebetween, and the damping force generated when the rebound load is input can be suppressed. Moreover, since the restraining member 126 restrains the swelling deformation of the membrane 131 toward the intermediate liquid chamber 135 side, as mentioned above, a high damping force can be generated when the bound load is input. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased. Moreover, even if the main liquid chamber 115 tends to have a negative pressure suddenly with the input of a large rebound load, the membrane 131 is smoothly swelled and deformed toward the main liquid chamber 115 side, and thereby, the negative pressure of the main liquid chamber 115 can be suppressed. Therefore, the occurrence of cavitation can also be suppressed. Additionally, these respective functions and effects are achieved by a configuration in which the flow resistance of the liquid in the main liquid chamber-side passage 121a is higher than the flow resistance of the liquid in the intermediate liquid chamber-side passage 121b and the membrane 131 constitutes portions of both the barrier walls of both the main liquid chamber 115 and the intermediate liquid chamber 135, as mentioned above, without adopting, for example, members that operate when the liquid pressure within the main liquid chamber 115 reaches a predetermined value. Therefore, the aforementioned functions and effects can be stably and accurately achieved even with vibration of a relatively small amplitude.

Here, the opening direction in which the first orifice passage 121 opens toward the intermediate liquid chamber 135 may intersect the opening direction in which the second orifice passage 122 opens toward the intermediate liquid chamber 135.

In this case, it is possible to suppress that the liquid from the main liquid chamber 115 side that has flowed into the intermediate liquid chamber 135 goes straight toward the second orifice passage 122, and this liquid can be diffused within the intermediate liquid chamber 135. As a result, the flow speed of the liquid is much more reliably reduced until the liquid of the main liquid chamber 115 flows into the second orifice passage 122.

Here, the cross-sectional area of the intermediate liquid chamber 135 in the direction orthogonal to the opening direction in which the second orifice passage 122 opens toward the intermediate liquid chamber 135 may be larger than the channel cross-sectional area of the second orifice passage 122.

In this case, since the cross-sectional area of the intermediate liquid chamber 135 is larger than the channel cross-sectional area of the second orifice passage 122, it is possible to increase the resistance generated when the liquid of the intermediate liquid chamber 135 flows into the second orifice passage 122, and the damping force generated when the bound load is input can be reliably increased.

Here, the main liquid chamber-side passage 121a of the first orifice passage 121 may be a passage having a longer channel length than a channel diameter.

In this case, since the main liquid chamber-side passage 121a of the first orifice passage 121 is a passage having a longer channel length than a channel diameter, the resistance applied to the liquid from the main liquid chamber 115 side that flows through the passage 121a can be much more reliably increased.

Here, the restraining member 127 may restrain the swelling deformation of the membrane 131 toward the main liquid chamber 115 side, and the flow resistance of the liquid in the intermediate liquid chamber-side passage 121b located on the intermediate liquid chamber 116 side in the first orifice passage 121 may be higher than the flow resistance of the liquid in the main liquid chamber-side passage 121a.

In this case, the flow resistance of the liquid in the intermediate liquid chamber-side passage 121b is higher than the flow resistance of the liquid in the main liquid chamber-side passage 121a. Thus, when the rebound load is input and when the liquid of the auxiliary liquid chamber 116 flows into the intermediate liquid chamber-side passage 121b of the first orifice passage 121 after flowing into the intermediate liquid chamber 135 through the second orifice passage 122, a larger resistance is applied compared to a case where the liquid directly flows into the main liquid chamber-side passage 121a. As a result, a high damping force can be generated when the rebound load is input. On the other hand, when the liquid of the main liquid chamber 115 flows through the first orifice passage 121 toward the auxiliary liquid chamber 116, even if the flow resistance is different between the main liquid chamber-side passage 121a and the intermediate liquid chamber-side passage 121b, both the passages constitute one orifice passage continuously with each other. Thus, it is possible to suppress the resistance generated when the liquid passes through a boundary portion therebetween, and the damping force generated when the bound load is input can be suppressed. Moreover, since the restraining member 127 restrains the swelling deformation of the membrane 131 toward the main liquid chamber 115 side, as mentioned above, a high damping force can be generated when the rebound load is input. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased. Additionally, these respective functions and effects are achieved by a configuration in which the flow resistance of the liquid in the intermediate liquid chamber-side passage 121b is higher than the flow resistance of the liquid in the main liquid chamber-side passage 121a and the membrane 131 constitutes portions of both the barrier walls of both the main liquid chamber 115 and intermediate liquid chamber 135, as mentioned above, without adopting, for example, members that operate when the liquid pressure within the main liquid chamber 115 reaches a predetermined value. Therefore, the aforementioned functions and effects can be stably and accurately achieved even with vibration of a relatively small amplitude.

Here, the cross-sectional area of the intermediate liquid chamber 135 in the direction orthogonal to the opening direction in which the second orifice passage 122 opens toward the intermediate liquid chamber 135 may be larger than the channel cross-sectional area of the intermediate liquid chamber-side passage 121b in the first orifice passage 121.

In this case, since the cross-sectional area of the intermediate liquid chamber is larger than the channel cross-sectional area of the intermediate liquid chamber-side passage 121b of the first orifice passage 121, it is possible to reliably increase the resistance generated when the liquid of the intermediate liquid chamber 135 flows into the intermediate liquid chamber-side passage 121b of the first orifice passage 121, and the damping force generated when the rebound load is input can be reliably increased.

Here, the intermediate liquid chamber-side passage 121*b* of the first orifice passage 121 may be a passage having a longer channel length than a channel diameter.

In this case, since the intermediate liquid chamber-side passage 121*b* of the first orifice passage 121 is a passage having a longer channel length than a channel diameter, the resistance applied to the liquid from the auxiliary liquid chamber 116 side that flows through the passage 121*b* can be much more reliably increased.

In addition, the technical scope of the invention is not limited to the above embodiment, and various changes can be made without departing the spirit of the invention.

For example, in the above embodiment, the first orifice passage 121 extends in the circumferential direction, and the second orifice passage 122 extends in the axial direction. However, the invention is not limited to this. Additionally, in the above embodiments, the compression type vibration-damping devices 11 and 12 in which the positive pressure acts on the main liquid chamber 115 as the support load acts have been described. However, it is also applicable to a hanging-type vibration-damping device that is attached such that the main liquid chamber 115 is located on the lower side in a vertical direction and the auxiliary liquid chamber 116 is located on the upper side in the vertical direction and the negative pressure acts on the main liquid chamber 115 as the support load acts. Additionally, the vibration-damping device 11 related to the invention is not limited to an engine mount of a vehicle and is also applicable to those other than the engine mount. For example, the vibration-damping device is also applicable to mounts of power generators loaded on construction machines or is also applicable to mounts of machines installed in factories or the like.

In addition, it is possible to appropriately substitute the constituent elements in the above-described embodiments with well-known constituent elements without departing from the spirit of the invention. Additionally, the above-described modification examples may be combined appropriately.

Third Embodiment

Figure 5:
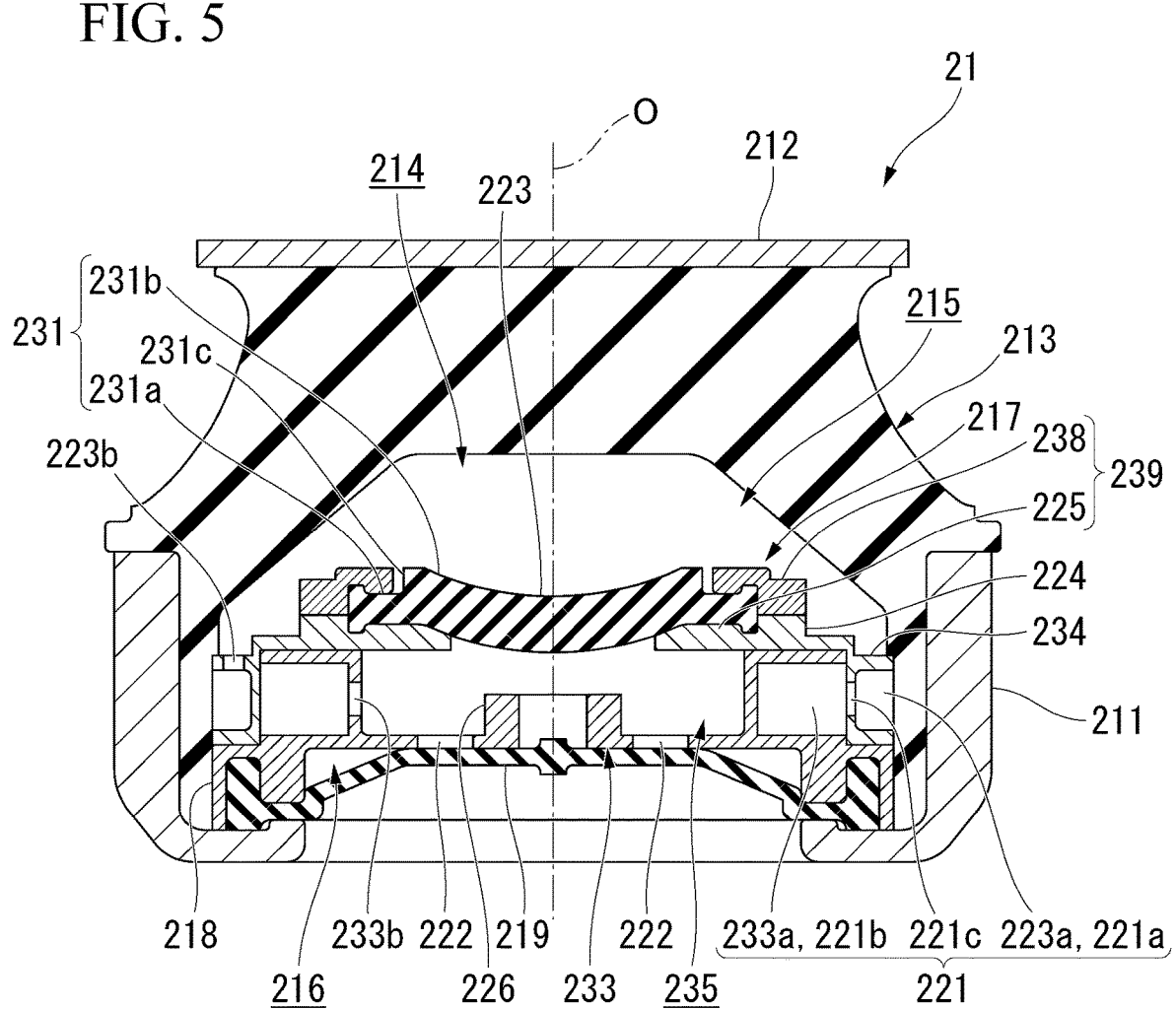
FIG. 5 is a longitudinal sectional view of a vibration-damping device related to a third embodiment of the invention.
Figure 6:
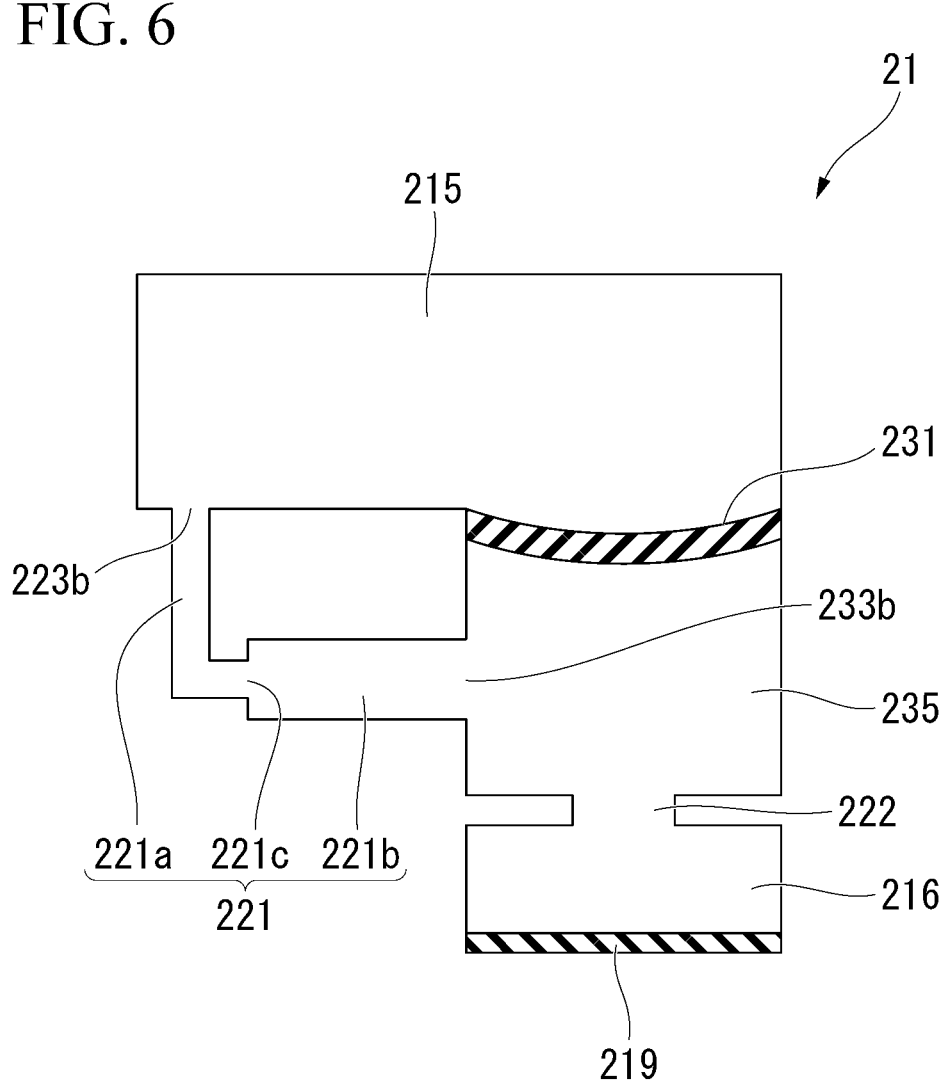
FIG. 6 is a schematic view of the vibration-damping device shown in FIG. 5.

Hereinafter, a vibration-damping device 21 related to a third embodiment of the invention will be described, referring to FIGS. 5 and 6. As shown in FIG. 5, the vibration-damping device 21 includes a tubular first attachment member 211 that is coupled to any one of a vibration generating part and a vibration receiving part, a second attachment member 212 that is coupled to the other thereof, an elastic body 213 that couples the first attachment member 211 and the second attachment member 212 to each other, a partition member 217 that partitions a liquid chamber 214 within the first attachment member 211 into a main liquid chamber 215 and an auxiliary liquid chamber 216 having the elastic body 213 as a portion of a barrier wall. In the example shown, the partition member 217 partitions the liquid chamber 214 in an axial direction along a central axis O of the first attachment member 211. In a case where the vibration-damping device 21 is used, for example, an engine mount of an automobile, the first attachment member 211 is coupled to a vehicle body serving as the vibration receiving part, and the second attachment member 212 is coupled to an engine serving as the vibration generating part. As a result, the transmission of the vibration of the engine to the vehicle body is suppressed. In addition, the first attachment member 211 may be coupled to the vibration generating part, and the second attachment member 212 may be coupled to the vibration receiving part.

Hereinafter, the main liquid chamber 215 side in the axial direction with respect to the partition member 217 is referred to as an upper side, and the auxiliary liquid chamber 216 side is referred to as a lower side. Additionally, in a plan view of the vibration-damping device 21 as viewed from the axial direction, a direction intersecting the central axis O is referred to as a radial direction, and a direction going around the central axis O is referred to as a circumferential direction.

The first attachment member 211 is formed in a bottomed tubular shape. A bottom part of the first attachment member 211 is formed in an annular shape and is disposed coaxially with the central axis O. An inner peripheral surface of a lower part of the first attachment member 211 is covered with a covering rubber formed integrally with the elastic body 213. The second attachment member 212 is formed in a flat plate shape having front and back surfaces orthogonal to the central axis O. The second attachment member 212 is formed, for example, in a disk shape and is disposed coaxially with the central axis O. The second attachment member 212 is disposed above the first attachment member 211. The external diameter of the second attachment member 212 is equal to the internal diameter of the first attachment member 211.

The elastic body 213 couples an inner peripheral surface of an upper part of the first attachment member 211 and a lower surface of the second attachment member 212 to each other. An upper end opening part of the first attachment member 211 is sealed with the elastic body 213. The elastic body 213 is vulcanized and bonded to the first attachment member 211 and the second attachment member 212. The elastic body 213 is formed in a topped tubular shape and is disposed coaxially with the central axis O. A top wall part of the elastic body 213 is coupled to the second attachment member 212, and a lower end part in a peripheral wall part thereof is coupled to the first attachment member 211. The peripheral wall part of the elastic body 213 gradually extends outward in the radial direction from the upper side to the lower side.

A diaphragm ring 218 is liquid-tightly fitted into the lower end part of the first attachment member 211 via the covering rubber. The diaphragm ring 218 is formed in a double tubular shape and is disposed coaxially with the central axis O. An outer peripheral part of a diaphragm 219, which is formed to be elastically deformable with rubber or the like, is vulcanized and bonded to the diaphragm ring 218. An outer peripheral part of the diaphragm 219 is vulcanized and bonded to an inner peripheral surface of an outer tube portion and an outer peripheral surface of an inner tube portion in the diaphragm ring 218. The diaphragm 219 is deformed to expand and contract with the inflow and outflow of a liquid into the auxiliary liquid chamber 216. The liquid chamber 214 in which the liquid is enclosed is defined within the first attachment member 211 by the diaphragm 219 and the elastic body 213. In addition, as the liquid enclosed in the liquid chamber 214, for example, water, ethylene glycol, or the like can be used.

The partition member 217 is formed in a disk shape having front and back surfaces orthogonal to the central axis O and is fitted into the first attachment member 211 via the covering rubber. The liquid chamber 214 within the first attachment member 211 is divided into the main liquid chamber 215 defined by the elastic body 213 and the partition member 217 and the auxiliary liquid chamber 216 defined by the diaphragm 219 and the partition member 217 by the partition member 217.

The partition member 217 includes a tubular body member 234 that is fitted into the first attachment member 211 via the covering rubber, a membrane 231 that blocks an upper end opening part of the body member 234 and forms a portion of the barrier wall of the main liquid chamber 215, a lower member 233 that blocks a lower end opening part of the body member 234, an intermediate liquid chamber 235 that is located opposite to the main liquid chamber 215 side with the membrane 231 therebetween and has the membrane 231 as a portion of the barrier wall, an annular sandwiching member 239 that fixes the membrane 231 to the body member 234, a first orifice passage 221 that allows the main liquid chamber 215 and the intermediate liquid chamber 235 to communicate with each other, and a second orifice passage 222 that allows the intermediate liquid chamber 235 and the auxiliary liquid chamber 216 to communicate with each other. In addition, a liquid chamber, which is located opposite to the main liquid chamber side with the membrane therebetween and has the membrane in a portion of the barrier wall thereof, is referred to as an opposite liquid chamber. The opposite liquid chamber of the present embodiment and a fourth embodiment to be described below is the intermediate liquid chamber 235.

The membrane 231 is formed in a disk shape with an elastic material, such as rubber. The membrane 231 is disposed coaxially with the central axis O. The volume of the membrane 231 is smaller than the volume of the elastic body 213. The membrane 231 includes a disk-shaped body part 231b, and an outer peripheral edge 231a that is formed to be thinner than the body part 231b, protrudes outward in the radial direction from a lower part of the body part 231b, and continuously extends over the entire circumference. Locking projections, which protrude toward both sides in the axial direction, are formed on an outer end part of the outer peripheral edge 231a in the radial direction.

The body member 234 is disposed coaxially with the central axis O. A first orifice groove 223a, which opens outward in the radial direction and extends in the circumferential direction, is formed in an outer peripheral surface of the body member 234. A radially outer opening of the first orifice groove 223a is blocked by the covering rubber. A first communication hole 223b, which allows the main liquid chamber 215 and the first orifice groove 223a to communicate with each other, is formed in an upper surface of the body member 234. The first communication hole 223b allows the main liquid chamber 215 and the first orifice groove 223a to communicate with each other in the axial direction. The first orifice groove 223a extends in the circumferential direction over an angular range exceeding 180° from the first communication hole 223b toward one side in the circumferential direction with the central axis O as a center.

The sandwiching member 239 sandwiches the outer peripheral edge 231a of the membrane 231 from both directions of the main liquid chamber 215 side and the intermediate liquid chamber 235 side. The sandwiching member 239 includes a first sandwiching part 225 that supports a lower surface of the membrane 231, and a second sandwiching part 238 that supports an upper surface of the membrane 231. The first sandwiching part 225 and the second sandwiching part 238 are formed in an annular shape, respectively, and are disposed coaxially with the central axis O. As the outer peripheral edge 231a of the membrane 231 is sandwiched and fixed by the first sandwiching part 225 and the second sandwiching part 238 in the axial direction, the membrane 231 is supported to be elastically deformable in the axial direction with the outer peripheral edge 231a thereof as a fixed end.

The first sandwiching part 225 is coupled to the body member 234 via an outer flange part 224. The outer flange part 224 is formed integrally with the body member 234 and protrudes inward in the radial direction from an upper end part of the body member 234. The outer flange part 224 is disposed coaxially with the central axis O. The first sandwiching part 225 is formed integrally with the outer flange part 224 and protrudes inward in the radial direction from the outer flange part 224. Respective lower surfaces of the first sandwiching part 225 and the outer flange part 224 are flush with each other. An upper surface of the first sandwiching part 225 is located below an upper surface of the outer flange part 224. A lower annular groove, which continuously extends over the entire circumference, is formed at an outer peripheral edge in the upper surface of the first sandwiching part 225.

An outer peripheral part of the second sandwiching part 238 is disposed on the upper surface of the outer flange part 224 and the inner peripheral part thereof supports the upper surface of the membrane 231. An upper annular groove, which continuously extends over the entire circumference, is formed at an outer peripheral edge in a lower surface of an inner peripheral part of the second sandwiching part 238. The upper annular groove faces a lower annular groove of the first sandwiching part 225 in the axial direction. The locking projections of the outer peripheral edge 231a of the membrane 231 are separately locked to the upper annular groove and the lower annular groove.

Here, the portion of the body part 231b of the membrane 231 located above the outer peripheral edge 231a is inserted into the inner peripheral part of the second sandwiching part 238. A radial gap is provided between an outer peripheral surface (hereinafter, referred to as the outer peripheral surface 231c of the body part 231b of the membrane 231) of the portion of the body part 231b of the membrane 231 located above the outer peripheral edge 231a, and an inner peripheral surface of the inner peripheral part of the second sandwiching part 238. The inner peripheral surface of the inner peripheral part of the second sandwiching part 238 and the outer peripheral surface 231c of the body part 231b of the membrane 231 extend in the axial direction, respectively. The inner peripheral surface of the inner peripheral part of the second sandwiching part 238 and the outer peripheral surface 231c of the body part 231b of the membrane 231 are substantially parallel to each other. In addition, the inner peripheral surface of the inner peripheral part of the second sandwiching part 238 and the outer peripheral surface 231c of the body part 231b of the membrane 231 may be inclined with respect to each other.

The lower member 233 is formed in a bottomed tubular shape and is disposed coaxially with the central axis O. The lower member 233 is liquid-tightly fitted into the body member 234. A bottom wall part of the lower member 233 forms a barrier wall that partitions the auxiliary liquid chamber 216 and the intermediate liquid chamber 235 in the axial direction. An upper end opening edge of a peripheral wall part of the lower member 233 integrally abuts against respective lower surfaces of the first sandwiching part 225 and the outer flange part 224. An upper surface of the bottom wall part of the lower member 233 is separated downward from the lower surface of the membrane 231. The aforementioned intermediate liquid chamber 235 is defined by the upper surface of the bottom wall part and an inner peripheral surface of the peripheral wall part in the lower member 233a and the lower surface of the membrane 231. The intermediate liquid chamber 235 and the main liquid chamber 215 are partitioned in the axial direction by the membrane 231. The internal volume of the intermediate liquid chamber 235 is smaller than the internal volume of the main liquid chamber 215.

A second orifice groove 233a, which opens outward in the radial direction and extends in the circumferential direction, is formed in an outer peripheral surface of the peripheral wall part of the lower member 233. A radially outer opening of the second orifice groove 233a is blocked by an inner peripheral surface of the body member 234. A second communication hole 233b, which allows the second orifice groove 233a and the intermediate liquid chamber 235 to communicate with each other, is formed in an inner peripheral surface of the peripheral wall part of the lower member 233. The second communication hole 233b allows the second orifice groove 233a and the intermediate liquid chamber 235 to communicate with each other in the radial direction. The second orifice groove 233a extends in the circumferential direction over an angular range exceeding 180° from the second communication hole 233b toward one side in the circumferential direction with the central axis O as a center. End parts of the second orifice groove 233a and the first orifice groove 223a on one side in the circumferential direction are disposed at the same circumferential position.

The auxiliary liquid chamber 216 is defined by a lower surface of the bottom wall part in the lower member 233 and the diaphragm 219. A second orifice passage 222, which allows the auxiliary liquid chamber 216 and the intermediate liquid chamber 235 to communicate with each other, is formed in the bottom wall part of the lower member 233. The second orifice passage 222 allows the auxiliary liquid chamber 216 and the intermediate liquid chamber 235 to communicate with each other in the axial direction. An opening part of the second orifice passage 222 on the intermediate liquid chamber 235 side faces the membrane 31. The second orifice passage 222 is a through-hole formed in the bottom wall part of the lower member 233, and a plurality of the second orifice passages are formed in the bottom wall part of the lower member 233. At least some of the second orifice passages 222 face the membrane 31 in the axial direction.

A restriction projection 226, which restricts excessively large swelling deformation of the membrane 231 toward the intermediate liquid chamber 235 side, is disposed the upper surface of the bottom wall part in the lower member 233. The restriction projection 226 is formed integrally with the lower member 233. The restriction projection 226 is formed in a tubular shape and is disposed coaxially with the central axis O. In addition, the restriction projection 226 may be formed in a solid form or may not be disposed coaxially with the central axis O.

The aforementioned diaphragm ring 218 is disposed at an outer peripheral edge located radially outside the plurality of second orifice passages 222 on the lower surface of the bottom wall part in the lower member 233. The diaphragm ring 218 is formed integrally with the lower member 233. The portion of the diaphragm ring 218 located radially outside the inner tube portion is located radially outside the lower member 233, and a lower surface of the body member 234 liquid-tightly abuts against an upper surface of a connection portion between the outer tube portion and the inner tube portion.

The channel cross-sectional area and the channel length of each second orifice passage 222 are smaller than the channel cross-sectional area and the channel length of the first orifice passage 221 to be described below, respectively. The channel length of the second orifice passage 222 is smaller than the internal diameter thereof. In addition, the channel length of the second orifice passage 222 may be equal to or greater than the internal diameter. The flow resistance of the liquid in each second orifice passage 222 is smaller than the flow resistance of the liquid in the first orifice passage 221.

Here, a connection hole 221c, which allows the first orifice groove 223a and the second orifice groove 233a to communicate with each other, is formed in the inner peripheral surface of the body member 234. The connection hole 221c allows the first orifice groove 223a and the second orifice groove 233a to communicate with each other in the radial direction. Also, the first orifice passage 221, which allows the main liquid chamber 215 and the intermediate liquid chamber 235 to communicate with each other, is constituted of the first orifice groove 223a having the radially outer opening blocked by the covering rubber, the second orifice groove 233a having a radially outer opening blocked by the inner peripheral surface of the body member 234, and the connection hole 221c. Hereinafter, the portion of the first orifice passage 221, which is located on the main liquid chamber 215 side and is defined by the first orifice groove 223a, is referred to as a main liquid chamber-side passage 221a, and the portion of the first orifice passage, which is located on the intermediate liquid chamber 235 side and is defined by the second orifice groove 233a, is referred to as an intermediate liquid chamber-side passage 221b. In addition, the portion of the first orifice passage, which is located opposite to the main liquid chamber side with the membrane therebetween and is located on the liquid chamber (opposite liquid chamber) having the membrane in a portion of the barrier wall thereof, is referred to as an opposite liquid chamber-side passage. The opposite liquid chamber-side passage of the present embodiment and the fourth embodiment to be described below is the intermediate liquid chamber-side passage 221b.

Here, the connection hole 221c connects an end part of the first orifice groove 223a on one side in the circumferential direction and an end part of the second orifice groove 233a on one side in the circumferential direction to each other. As a result, the liquid flows from any one of the main liquid chamber-side passage 221a and the intermediate liquid chamber-side passage 221b through the connection hole 221c into the other, and in the process in which the liquid flows through the other side, the flow direction of the liquid flowing through the one and the flow direction of the liquid flowing through the other are opposite to each other in the circumferential direction.

Moreover, in the present embodiment, the flow resistance of the liquid in the intermediate liquid chamber-side passage 221b is lower than the flow resistance of the liquid in the main liquid chamber-side passage 221a. In the example shown, the channel cross-sectional area of the main liquid chamber-side passage 221a is smaller than the channel cross-sectional area of the intermediate liquid chamber-side passage 221b. The opening area of the connection hole 221c is smaller than the channel cross-sectional area of the main liquid chamber-side passage 221a. The channel length of the connection hole 221c is shorter than the channel length of each of the main liquid chamber-side passage 221a and the intermediate liquid chamber-side passage 221b.

Here, the respective flow resistances of the main liquid chamber-side passage 221a and the first communication hole 223b may be equal to each other or may be different from each other. For example, in a case where the flow resistance of the main liquid chamber-side passage 221a is higher than the flow resistance of the first communication hole 223b, the flow resistance of the liquid when passing through the first communication hole 223b and entering the main liquid chamber-side passage 221a is increased, and a high damping force is generated when a bound load for causing the liquid to flow from the main liquid chamber 215 toward the auxiliary liquid chamber 216 side is input.

Additionally, the respective flow resistances of the connection hole 221c and the main liquid chamber-side passage 221a may be equal to each other or may be different from each other. For example, in a case where the flow resistance of the connection hole 221c is higher than the flow resistance of the main liquid chamber-side passage 221a, the flow resistance of the liquid when passing through the main liquid chamber-side passage 221a and entering the connection hole 221c is increased, and a high damping force is generated when the bound load is input.

Additionally, the respective flow resistances of the intermediate liquid chamber-side passage 221b and the connection hole 221c may be equal to each other or may be different from each other. For example, in a case where the flow resistance of the intermediate liquid chamber-side passage 221b is higher than the flow resistance of the connection hole 221c, the flow resistance of the liquid when passing through the connection hole 221c and entering the intermediate liquid chamber-side passage 221b is increased, and a high damping force is generated when the bound load is input.

Additionally, the respective flow resistances of the second communication hole 233b and the intermediate liquid chamber-side passage 221b may be equal to each other or may be different from each other. For example, in a case where the flow resistance of the second communication hole 233b is higher than the flow resistance of the intermediate liquid chamber-side passage 221b, the flow resistance of the liquid when passing through the intermediate liquid chamber-side passage 221b and entering the second communication hole 233b is increased, and a high damping force is generated when the bound load is input.

Additionally, in the present embodiment, an opening direction in which the first orifice passage 221 opens toward the intermediate liquid chamber 235, that is, an opening direction of the second communication hole 233b toward the intermediate liquid chamber 235 intersects an opening direction in which the second orifice passage 222 opens toward the intermediate liquid chamber 235. In the example shown, the second communication hole 233b opens in the radial direction toward the intermediate liquid chamber 235, and the second orifice passage 222 opens in the axial direction toward the intermediate liquid chamber 235. That is, the opening direction of the second communication hole 233b toward the intermediate liquid chamber 235 is orthogonal to the opening direction in which the second orifice passage 222 opens toward the intermediate liquid chamber 235.

Additionally, in the present embodiment, the cross-sectional area of the intermediate liquid chamber 235 in the direction orthogonal to the opening direction in which the second orifice passage 222 opens toward the intermediate liquid chamber 235 is larger than the channel cross-sectional area of the second orifice passage 222, the channel cross-sectional area of the intermediate liquid chamber-side passage 221b of the first orifice passage 221, and the channel cross-sectional area of the main liquid chamber-side passage 221a of the first orifice passage 221. Additionally, in the present embodiment, the main liquid chamber-side passage 221a and the intermediate liquid chamber-side passage 221b are passages having a longer channel length than a channel diameter. Here, in the example shown, the channel cross-sectional shape of the first orifice passage 221 is a rectangular shape. In this case, when the channel cross-sectional shape is substituted with a circular shape having the same channel cross-sectional area, the channel diameter can be represented by the diameter of the circular shape.

Here, in the present embodiment, the intermediate liquid chamber 235 is located on the intermediate liquid chamber-side passage 221b side where the flow resistance of the liquid is low out of the main liquid chamber-side passage 221a and the intermediate liquid chamber-side passage 221b in the flow direction of the liquid in the first orifice passage 221. Also, in the present embodiment, an uneven swelling part 223 is formed that makes the swelling deformation of the membrane toward the main liquid chamber 215 side larger than the swelling deformation of the membrane toward the intermediate liquid chamber 235 side when the same pressing force is applied to the membrane 231. The uneven swelling part 223 is curved so as to project toward the intermediate liquid chamber 235 side. The uneven swelling part 223 is integrally formed over the entire body part 231b, which is located radially inside the outer peripheral edge 231a sandwiched in the axial direction by the sandwiching member 239, in the membrane 231. In addition, the uneven swelling part 223 is not limited to the aforementioned curved shape and may be appropriately changed, for example, by making the sizes of grooves formed in the upper and lower surfaces of the membrane 231 different from each other.

Moreover, in the present embodiment, the first sandwiching part 225, which supports the membrane 231 from the intermediate liquid chamber 235 side, protrudes longer inward in the radial direction than the second sandwiching part 238 that supports the membrane 231 from the main liquid chamber 215 side. The portion of the first sandwiching part 225 located radially inside the second sandwiching part 238 supports an outer peripheral part in a lower surface of the body part 231b of the membrane 231. The upper surface of the inner peripheral edge of the first sandwiching part 225, which abuts against the membrane 231, is gradually inclined downward so as to be separated from the main liquid chamber 215 inward in the radial direction. In the example shown, the upper surface of the inner peripheral edge of the first sandwiching part 225 is formed in a curved surface shape that projects toward the main liquid chamber 215 side. In addition, the upper surface of the inner peripheral edge of the first sandwiching part 225 may be a flat surface that extends in the direction orthogonal to the central axis O.

The lower surface of the membrane 231 abuts against the upper surface of the inner peripheral edge of the first sandwiching part 225. The uneven swelling part 223 of the membrane 231 overhangs to the inside of the first sandwiching part 225. Respective axial positions of a lower end part in a lower surface of the uneven swelling part 223 and a lower surface of the first sandwiching part 225 are the same as each other. The lower surface of the membrane 231 is in non-contact with an inner peripheral surface of the first sandwiching part 225. The membrane 231 abuts against the entire upper surface of the first sandwiching part 225, and the entire lower surface of the inner peripheral part of the second sandwiching part 238. In addition, the lower surface of the membrane 231 may be spaced apart upward from the upper surface of the inner peripheral edge of the first sandwiching part 225. The uneven swelling part 223 of the membrane 231 may be located above the inner peripheral surface of the first sandwiching part 225. The lower surface of the membrane 231 may be brought into contact with the inner peripheral surface of the first sandwiching part 225.

As described above, according to the vibration-damping device 21 related to the present embodiment, the uneven swelling part 223 is formed in the membrane 231. Thus, when the same pressing force is applied, the amount of swelling deformation of the membrane 231 toward the main liquid chamber 215 side is larger than that toward the intermediate liquid chamber 235 side. Hence, if the rebound load is input to the vibration-damping device 21, the damping force to be generated can be suppressed to be low as the membrane 231 is largely swelled and deformed toward the main liquid chamber 215 side by the uneven swelling part 223. On the other hand, if the bound load is input to the vibration-damping device 21, the swelling deformation of the membrane 231 toward the intermediate liquid chamber 235 side becomes smaller than the swelling deformation of the membrane toward the main liquid chamber 215 side when the rebound load is input, the positive pressure of the main liquid chamber 215 is not easily relieved, and the damping force to be generated becomes high. That is, the uneven swelling part 223 of the present embodiment is a damping force difference increasing part that restrains the swelling deformation of the membrane toward the intermediate liquid chamber (opposite liquid chamber) 235 side out of the swelling deformation of the membrane toward the main liquid chamber 215 side and the swelling deformation of the membrane toward the intermediate liquid chamber (opposite liquid chamber) 235 side and increases a difference between the damping force generated when the bound load is input and the damping force generated when the rebound load is input.

Additionally, the flow resistance of the liquid in the intermediate liquid chamber-side passage 221b is lower than the flow resistance of the liquid in the main liquid chamber-side passage 221a. Thus, when the bound load is input and when the liquid of the main liquid chamber 215 flows into the main liquid chamber-side passage 221a, a larger resistance is applied compared to a case where the liquid directly flows into the intermediate liquid chamber-side passage 221b. As a result, a high damping force can be generated when the bound load is input. On the other hand, when the liquid on the auxiliary liquid chamber 216 side flows through the first orifice passage 221 toward the main liquid chamber 215, even if the flow resistance is different between the main liquid chamber-side passage 221a and the intermediate liquid chamber-side passage 221b, both the passages constitute one orifice passage continuously with each other. Thus, it is possible to suppress the resistance generated when the liquid passes through a boundary portion therebetween, and the damping force generated when the rebound load is input can be suppressed to be low. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased.

Moreover, even if the main liquid chamber 215 tends to have a negative pressure suddenly with the input of a large rebound load, the membrane 231 is largely swelled and deformed toward the main liquid chamber 215 side by the uneven swelling part 223, and thereby, the negative pressure of the main liquid chamber 215 can be suppressed. Therefore, the occurrence of cavitation can also be suppressed. Additionally, the aforementioned respective functions and effects are achieved by a configuration in which the flow resistance of the liquid in the intermediate liquid chamber-side passage 221b and the flow resistance of the liquid in the main liquid chamber-side passage 221a are different from each other and the membrane 231 has the uneven swelling part 223 and constitutes portions of both the barrier walls of both the main liquid chamber 215 and intermediate liquid chamber 235, as mentioned above, without adopting, for example, members that operate when the liquid pressure within the main liquid chamber 215 reaches a predetermined value. Therefore, the aforementioned functions and effects can be stably and accurately achieved even with vibration of a relatively small amplitude.

Additionally, since the uneven swelling part 223 is curved so as to project toward the intermediate liquid chamber 235 side, a configuration in which the swelling deformation of the membrane toward the main liquid chamber 215 side is larger than the swelling deformation of the membrane toward the intermediate liquid chamber 235 side when the same pressing force is applied to the membrane 231 can be easily and reliably realized. Additionally, the uneven swelling part 223 is integrally formed over the entire body part 231b, which is located radially inside the outer peripheral edge 231a sandwiched in the axial direction by the sandwiching member 239, in the membrane 231. Thus, it is possible to largely swell and deform the membrane 231 toward the main liquid chamber 215 side, and the damping force generated when the bound load is input and the damping force generated when the rebound load is input can be made greatly different from each other. Additionally, since the main liquid chamber-side passage 221a of the first orifice passage 221 is a passage having a longer channel length than a channel diameter, the resistance applied to the liquid from the main liquid chamber 215 side that flows into this portion can be increased, and the damping force generated when the bound load is input can be much more reliably increased.

Additionally, in the present embodiment, the first sandwiching part 225, which protrudes longer inward in the radial direction than the second sandwiching part 238, supports the membrane 231 from the intermediate liquid chamber 235 side. Thus, when the same pressing force is applied, the amount of swelling deformation of the membrane 231 toward the intermediate liquid chamber 235 side is smaller than that toward the main liquid chamber 215 side. That is, if the bound load is input to the vibration-damping device 21, the swelling deformation of the membrane 231 toward the intermediate liquid chamber 235 side is restrained by the first sandwiching part 225, the positive pressure of the main liquid chamber 215 is not easily relieved, and the damping force to be generated becomes high. On the other hand, if the rebound load is input to the vibration-damping device 21, the swelling deformation of the membrane 231 toward the main liquid chamber 215 side becomes larger than the swelling deformation of the membrane toward the intermediate liquid chamber 235 side when the rebound load is input to such an extent that the second sandwiching part 238 does not protrude inward in the radial direction from the first sandwiching part 225, and the damping force to be generated can be suppressed to be low. As described above, the ratio of the damping force generated when the bound load is input to the damping force generated when the rebound load is input can be reliably increased.

Additionally, the upper surface of the inner peripheral edge of the first sandwiching part 225, which abuts against the membrane 231, is gradually inclined so as to be separated from the main liquid chamber 215 inward in the radial direction. Thus, when the bound load is input and when the membrane 231 is swelled and deformed toward the intermediate liquid chamber 235 side, the membrane can easily come into surface contact with the inner peripheral edge of the first sandwiching part 225, the generation of abnormal noise can be suppressed, and the durability of the membrane 231 can be secured. Additionally, the membrane 231 abuts against the inner peripheral edge of the first sandwiching part 225. Thus, when the bound load is input, it is possible to inhibit the membrane 231 from colliding against the inner peripheral edge of the first sandwiching part 225, and the generation of abnormal noise can be reliably suppressed. Additionally, the membrane 231 abuts against the inner peripheral edge of the first sandwiching part 225. Thus, even with vibration of a relatively small amplitude, a high damping force can be generated when the bound load is input.

Additionally, the radial gap is provided between the outer peripheral surface 231c of the body part 231b of the membrane 231 and the inner peripheral surface of the inner peripheral part of the second sandwiching part 238. Thus, even with vibration of a relatively small amplitude, when the rebound load is input, it is possible to smoothly swell and deform the membrane 231 toward the main liquid chamber 215 side, and the damping force to be generated can be reliably suppressed to be low. Additionally, when the membrane 231 tends to be excessively largely swelled and deformed toward the main liquid chamber 215 side at the time of the input of the rebound load, the outer peripheral surface 231c of the body part 231b can be made to abut against the inner peripheral surface of the inner peripheral part of the second sandwiching part 238, and a large load can be prevented from being applied to the connection portion between the outer peripheral edge 231a and the body part 231b in the membrane 231.

Additionally, since the uneven swelling part 223 overhangs to the inside of the first sandwiching part 225, a configuration in which the swelling deformation of the membrane 231 toward the main liquid chamber 215 side is made larger than the swelling deformation of the membrane 231 toward the intermediate liquid chamber 235 side when the same pressing force is applied can be much more reliably realized.

Additionally, since the opening direction in which the first orifice passage 221 opens toward the intermediate liquid chamber 235 intersects the opening direction in which the second orifice passage 222 opens toward the intermediate liquid chamber 235, it is possible to suppress that the liquid from the main liquid chamber 215 side that has flowed into the intermediate liquid chamber 235 goes straight toward the second orifice passage 222, and this liquid can be diffused within the intermediate liquid chamber 235. As a result, the flow speed of the liquid can be reliably reduced until the liquid of the main liquid chamber 215 flows into the second orifice passage 222, and a high damping force can be generated when the bound load is input.

Additionally, since the cross-sectional area of the intermediate liquid chamber 235 is larger than the channel cross-sectional area of the second orifice passage 222, it is possible to increase the resistance generated when the liquid of the intermediate liquid chamber 235 flows into the second orifice passage 222, and the damping force generated when the bound load is input can be reliably increased.

Fourth Embodiment

Figure 7:
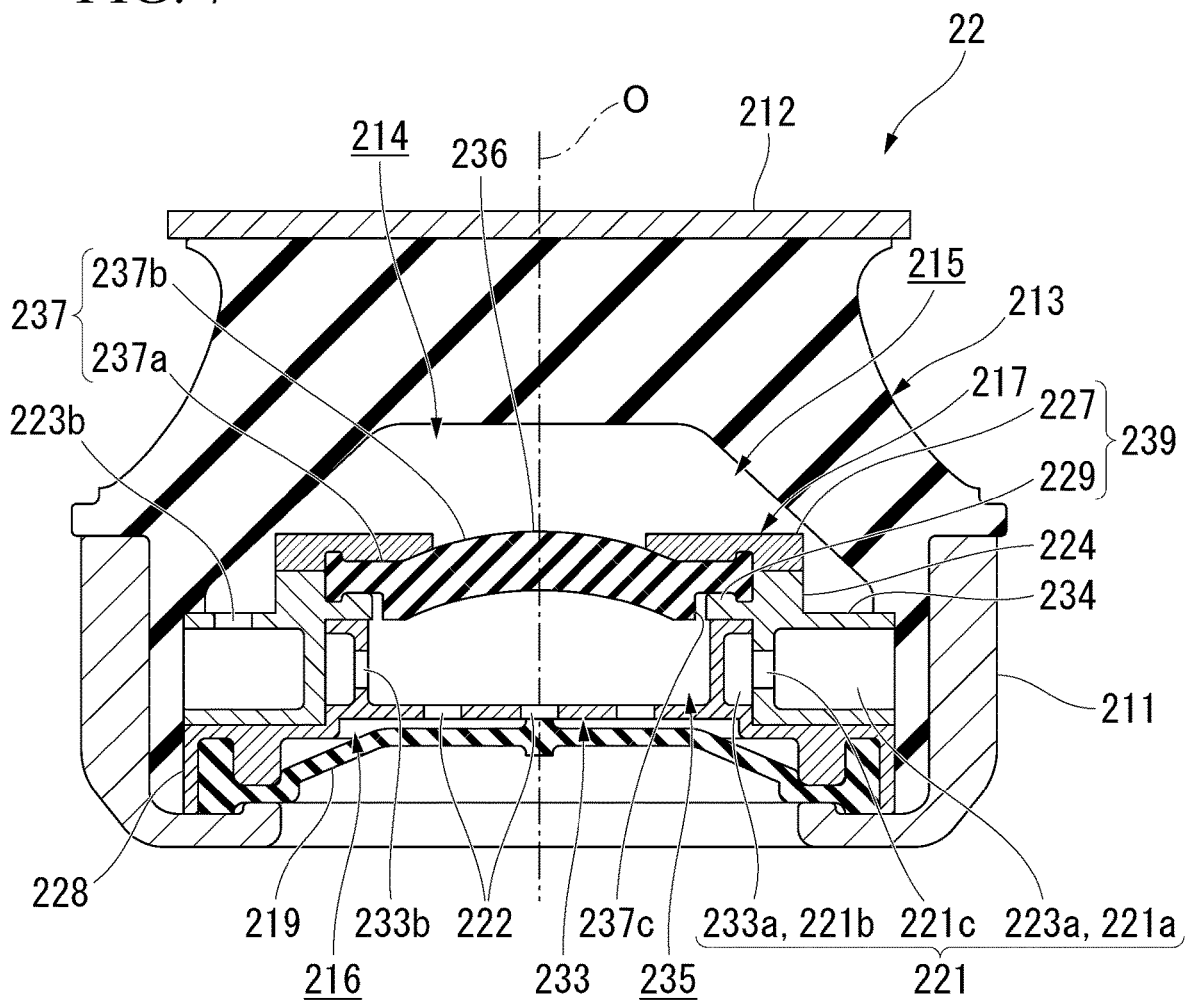
FIG. 7 is a longitudinal sectional view of a vibration-damping device related to a fourth embodiment of the invention.
Figure 8:
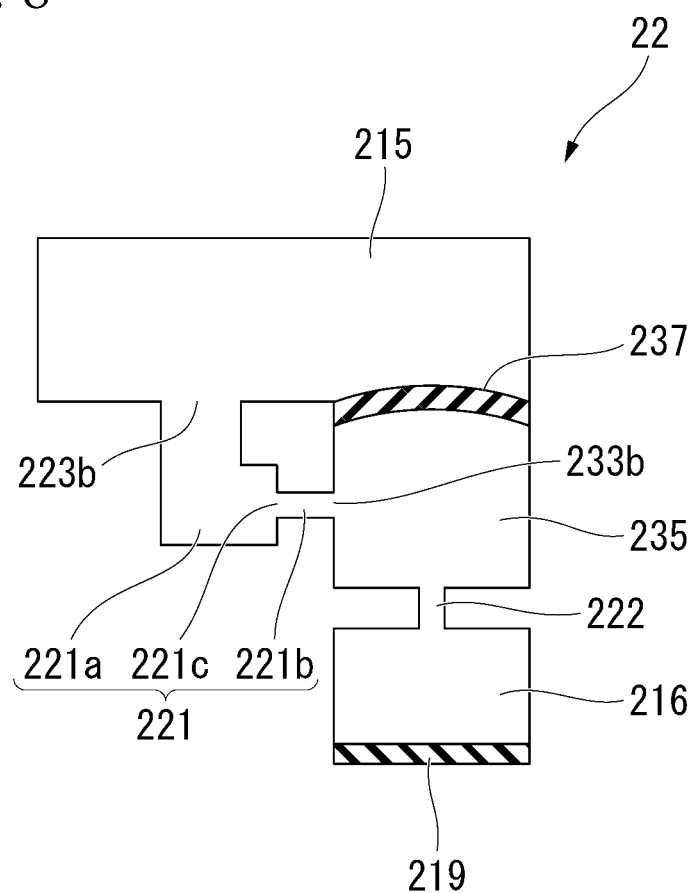
FIG. 8 is a schematic view of the vibration-damping device shown in FIG. 7.

Next, a vibration-damping device 22 related to a fourth embodiment of the invention will be described, referring to FIGS. 7 and 8. In addition, in the fourth embodiment, the same portions as the constituent elements in the above-described third embodiment will be designated by the same reference signs, and a description thereof will be omitted, and only different points will be described.

A diaphragm ring 228 protrudes outward in the radial direction from a lower end part of the lower member 233, and the lower surface of the body member 234 liquid-tightly abuts against an upper surface of the diaphragm ring 228. The diaphragm ring 228 is formed integrally with the lower member 233. The outer flange part 224 protrudes upward from an inner peripheral edge in the upper surface of the body member 234. Respective inner peripheral surfaces the outer flange part 224 and the body member 234 are flush with each other.

Moreover, in the present embodiment, the flow resistance of the liquid in the main liquid chamber-side passage 221a is lower than the flow resistance of the liquid in the intermediate liquid chamber-side passage 221b. In the example shown, the channel cross-sectional area of the intermediate liquid chamber-side passage 221b is smaller than the channel cross-sectional area of the main liquid chamber-side passage 221a. Additionally, the opening area of the connection hole 221c is smaller than the channel cross-sectional area of the intermediate liquid chamber-side passage 221b.

Here, the respective flow resistances of the intermediate liquid chamber-side passage 221b and the second communication hole 233b may be equal to each other or may be different from each other. For example, in a case where the flow resistance of the intermediate liquid chamber-side passage 221b is higher than the flow resistance of the second communication hole 233b, the flow resistance of the liquid when passing through the second communication hole 233b and entering the intermediate liquid chamber-side passage 221b is increased, and a high damping force is generated when a rebound load for causing the liquid to flow from the auxiliary liquid chamber 216 toward the main liquid chamber 215 side is input.

Additionally, the respective flow resistances of the connection hole 221c and the intermediate liquid chamber-side passage 221b may be equal to each other or may be different from each other. For example, in a case where the flow resistance of the connection hole 221c is higher than the flow resistance of the intermediate liquid chamber-side passage 221b, the flow resistance of the liquid when passing through the intermediate liquid chamber-side passage 221b and entering the connection hole 221c is increased, and a high damping force is generated when the rebound load is input.

Additionally, the respective flow resistances of the main liquid chamber-side passage 221a and the connection hole 221c may be equal to each other or may be different from each other. For example, in a case where the flow resistance of the main liquid chamber-side passage 221a is higher than the flow resistance of the connection hole 221c, the flow resistance of the liquid when passing through the connection hole 221c and entering the main liquid chamber-side passage 221a is increased, and a high damping force is generated when the rebound load is input.

Additionally, the respective flow resistances of the first communication hole 223b and the main liquid chamber-side passage 221a may be equal to each other or may be different from each other. For example, in a case where the flow resistance of the first communication hole 223b is higher than the flow resistance of the main liquid chamber-side passage 221a, the flow resistance of the liquid when passing through the main liquid chamber-side passage 221a and entering the first communication hole 223b is increased, and a high damping force is generated when the rebound load is input.

Here, in the present embodiment, the main liquid chamber 215 is located on the main liquid chamber-side passage 221a side where the flow resistance of the liquid is low out of the main liquid chamber-side passage 221a and the intermediate liquid chamber-side passage 221b in the flow direction of the liquid in the first orifice passage 221. Also, in the present embodiment, an uneven swelling part 236 is formed so as to make the swelling deformation of the membrane toward the intermediate liquid chamber 235 side larger than the swelling deformation of the membrane toward the main liquid chamber 215 side when the same pressing force is applied to the membrane 237. In the example shown, the uneven swelling part 236 is curved so as to project toward the main liquid chamber 215 side. The membrane 237 includes a disk-shaped body part 237b, and an outer peripheral edge 237a that is formed to be thinner than the body part 237b, protrudes outward in the radial direction from an upper part of the body part 237b, and continuously extends over the entire circumference.

Moreover, in the present embodiment, the first sandwiching part 227, which protrudes long inward in the radial direction, out of the first sandwiching part 227 and the second sandwiching part 229 supports the upper surface of the membrane 237, and the second sandwiching part 229 supports the lower surface of the membrane 237.

The second sandwiching part 229 is formed integrally with the outer flange part 224 and protrudes inward in the radial direction from the outer flange part 224. An upper end opening edge of the peripheral wall part of the lower member 233 abuts against a lower surface of the second sandwiching part 229. An upper surface of the second sandwiching part 229 is located below the upper surface of the outer flange part 224. In addition, a lower annular groove, which continuously extends over the entire circumference, is formed at an outer peripheral edge in the upper surface of the second sandwiching part 229.

Here, the portion of the body part 237b of the membrane 237 located below the outer peripheral edge 237a is inserted into the second sandwiching part 229. A radial gap is provided between an outer peripheral surface (hereinafter, referred to as an outer peripheral surface 237c of the body part 237b of the membrane 237) of the portion of the body part 237b of the membrane 237 located below the outer peripheral edge 237a, and an inner peripheral surface of the second sandwiching part 229. The inner peripheral surface of the second sandwiching part 229 and the outer peripheral surface 237c of the body part 237b of the membrane 237 extend in the axial direction, respectively. The inner peripheral surface of the second sandwiching part 229 and the outer peripheral surface 237c of the body part 237b of the membrane 237 are substantially parallel to each other. In addition, the inner peripheral surface of the second sandwiching part 238 and the outer peripheral surface 237c of the body part 237b of the membrane 237 may be inclined with respect to each other.

An outer peripheral part of the first sandwiching part 227 is disposed on the upper surface of the outer flange part 224 and the inner peripheral part thereof supports the upper surface of the membrane 237. An upper annular groove, which continuously extends over the entire circumference, is formed at an outer peripheral edge in a lower surface of an inner peripheral part of the first sandwiching part 227. The upper annular groove faces a lower annular groove of the second sandwiching part 229 in the axial direction. The locking projections of the outer peripheral edge 237a of the membrane 237 are separately locked to the upper annular groove and the lower annular groove.

The portion of the first sandwiching part 227 located radially inside the second sandwiching part 229 supports an outer peripheral part in an upper surface of the body part 237b of the membrane 237. A lower surface of an inner peripheral edge (hereinafter, referred to as an inner peripheral edge of the first sandwiching part 227) of the inner peripheral part of the first sandwiching part 227, which abuts against the membrane 237, is gradually inclined upward so as to be separated from the intermediate liquid chamber 235 inward in the radial direction. In the example shown, the lower surface of the inner peripheral edge of the first sandwiching part 227 is formed in a curved surface shape that projects toward the intermediate liquid chamber 235 side. In addition, the lower surface of the inner peripheral edge of the first sandwiching part 227 may be a flat surface that extends in the direction orthogonal to the central axis O.

The upper surface of the membrane 237 abuts against the lower surface of the inner peripheral edge of the first sandwiching part 227. The uneven swelling part 236 of the membrane 237 overhangs to the inside of the first sandwiching part 227. Respective axial positions of an upper end part in an upper surface of the uneven swelling part 236 and a lower surface of the first sandwiching part 227 are the same as each other. The upper surface of the membrane 237 is in non-contact with an inner peripheral surface of the inner peripheral part of the first sandwiching part 227. The membrane 237 abuts against the entire lower surface of the inner peripheral part of the first sandwiching part 227, and the entire upper surface of the second sandwiching part 229. In addition, the upper surface of the membrane 237 may be spaced apart downward from the lower surface of the inner peripheral edge of the first sandwiching part 227. The uneven swelling part 236 of the membrane 237 may be located below the inner peripheral surface of the inner peripheral part of the first sandwiching part 227. The upper surface of the membrane 237 may be brought into contact with the inner peripheral surface of the inner peripheral part of the first sandwiching part 227.

As described above, according to the vibration-damping device 22 related to the present embodiment, the uneven swelling part 236 is formed in the membrane 237. Thus, when the same pressing force is applied, the amount of swelling deformation of the membrane 237 toward the intermediate liquid chamber 235 side is larger than that toward the main liquid chamber 215 side. Hence, if the bound load is input to the vibration-damping device 22, the damping force to be generated can be suppressed to be low as the membrane 237 is largely swelled and deformed toward the intermediate liquid chamber 235 side by the uneven swelling part 236. On the other hand, if the rebound load is input to the vibration-damping device 22, the swelling deformation of the membrane 237 toward the main liquid chamber 215 side becomes smaller than the swelling deformation of the membrane toward the intermediate liquid chamber 235 side when the bound load is input, the negative pressure of the main liquid chamber 215 is not easily relieved, and the damping force to be generated becomes high. That is, the uneven swelling part 236 of the present embodiment is a damping force difference increasing part that restrains the swelling deformation of the membrane 237 toward the main liquid chamber 215 side out of the swelling deformation of the membrane toward the main liquid chamber 215 side and the swelling deformation of the membrane toward the intermediate liquid chamber (opposite liquid chamber) 235 side and that increases a difference between the damping force generated when the bound load is input and the damping force generated when the rebound load is input.

Additionally, the flow resistance of the liquid in the main liquid chamber-side passage 221a is lower than the flow resistance of the liquid in the intermediate liquid chamber-side passage 221b. Thus, when the rebound load is input and when the liquid of the auxiliary liquid chamber 216 flows into the intermediate liquid chamber-side passage 221b after flowing into the intermediate liquid chamber 235 through the second orifice passage 222, a larger resistance is applied compared to a case where the liquid directly flows into the main liquid chamber-side passage 221a. As a result, a high damping force can be generated when the rebound load is input. On the other hand, when the liquid of the main liquid chamber 215 flows through the first orifice passage 221 toward the auxiliary liquid chamber 216, even if the flow resistance is different between the main liquid chamber-side passage 221a and the intermediate liquid chamber-side passage 221b, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Additionally, since the uneven swelling part 236 is curved so as to project toward the main liquid chamber 215 side, a configuration in which the swelling deformation of the membrane toward the intermediate liquid chamber 235 side is larger than the swelling deformation of the membrane toward the main liquid chamber 215 side when the same pressing force is applied to the membrane 237 can be easily and reliably realized. Additionally, the uneven swelling part 236 is integrally formed over the entire body part 237b, which is located radially inside the outer peripheral edge 237a sandwiched in the axial direction by the sandwiching member 239, in the membrane 237. Thus, it is possible to largely swell and deform the membrane 237 toward the intermediate liquid chamber 235 side, and the damping force generated when the bound load is input and the damping force generated when the rebound load is input can be made greatly different from each other.

Additionally, in the present embodiment, the first sandwiching part 227, which protrudes longer inward in the radial direction than the second sandwiching part 229, supports the membrane 237 from the main liquid chamber 215 side. Thus, when the same pressing force is applied, the amount of swelling deformation of the membrane 237 toward the main liquid chamber 215 side is smaller than that toward the intermediate liquid chamber 235 side. That is, if the rebound load is input to the vibration-damping device 22, the swelling deformation of the membrane 237 toward the main liquid chamber 215 side is restrained by the first sandwiching part 227, the negative pressure of the main liquid chamber 215 is not easily relieved, and the damping force to be generated becomes high. On the other hand, if the bound load is input to the vibration-damping device 22, the swelling deformation of the membrane 237 toward the intermediate liquid chamber 235 side becomes larger than the swelling deformation of the membrane toward the main liquid chamber 215 side when the rebound load is input to such an extent that the second sandwiching part 229 does not protrude inward in the radial direction from the first sandwiching part 227, and the damping force to be generated can be suppressed to be low. As described above, the ratio of the damping force generated when the rebound load is input to the damping force generated when the bound load is input can be reliably increased.

Additionally, the lower surface of the inner peripheral edge of the first sandwiching part 227, which abuts against the membrane 237, is gradually inclined so as to be separated from the intermediate liquid chamber 235 inward in the radial direction. Thus, when the rebound load is input and when the membrane 237 is swelled and deformed toward the main liquid chamber 215 side, the membrane 237 can easily come into surface contact with the inner peripheral edge of the first sandwiching part 27, the generation of abnormal noise can be suppressed, and the durability of the membrane 237 can be secured. Additionally, the membrane 237 abuts against the inner peripheral edge of the first sandwiching part 227. Thus, when the rebound load is input, it is possible to inhibit the membrane 237 from colliding against the inner peripheral edge of the first sandwiching part 227, and the generation of abnormal noise can be reliably suppressed. Additionally, the membrane 237 abuts against the inner peripheral edge of the first sandwiching part 227. Thus, even with vibration of a relatively small amplitude, a high damping force can be generated when the rebound load is input.

Additionally, the radial gap is provided between the outer peripheral surface 237c of the body part 237b of the membrane 237 and the inner peripheral surface of the second sandwiching part 229. Thus, even with vibration of a relatively small amplitude, when the bound load is input, it is possible to smoothly swell and deform the membrane 237 toward the intermediate liquid chamber 235 side, and the damping force to be generated can be reliably suppressed to be low. Additionally, when the membrane 237 tends to be excessively largely swelled and deformed toward the intermediate liquid chamber 235 side at the time of the input of the bound load, the outer peripheral surface 237c of the body part 237b can be made to abut against the inner peripheral surface of the second sandwiching part 229, and a large load can be prevented from being applied to the connection portion between the outer peripheral edge 237a and the body part 237b in the membrane 237.

Additionally, since the uneven swelling part 236 overhangs to the inside of the first sandwiching part 227, a configuration in which the swelling deformation of the membrane 237 toward the intermediate liquid chamber 235 side is made larger than the swelling deformation of the membrane 237 toward the main liquid chamber 215 side when the same pressing force is applied can be much more reliably realized.

Additionally, since the cross-sectional area of the intermediate liquid chamber 235 is larger than the channel cross-sectional area of the intermediate liquid chamber-side passage 221b of the first orifice passage 221, it is possible to reliably increase the resistance generated when the liquid of the intermediate liquid chamber 235 flows into the intermediate liquid chamber-side passage 221b, and the damping force generated when the rebound load is input can be reliably increased. Additionally, since the intermediate liquid chamber-side passage 221b of the first orifice passage 221 is a passage having a longer channel length than a channel diameter, the resistance applied to the liquid from the auxiliary liquid chamber 216 side that flows into this portion can be increased, and the damping force generated when the rebound load is input can be much more reliably increased.

The vibration-damping devices 21 and 22 related to the third and fourth embodiments described above include the tubular first attachment member 211 that is coupled to one of the vibration generating part and the vibration receiving part, the second attachment member 212 that is coupled to the other thereof, the elastic body 213 that couples the first attachment member 211 and the second attachment member 212 to each other, and the partition member 217 that partitions the liquid chamber within the first attachment member 211 into the main liquid chamber 215 having the elastic body 213 in a portion of a barrier wall thereof, and the auxiliary liquid chamber 216, and the partition member 217 includes the membrane 231 or 237 that forms a portion of the barrier wall of the main liquid chamber 215, the first orifice passage 221 that allows the main liquid chamber 215 and the opposite liquid chamber, which is located opposite to the main liquid chamber 215 with the membrane 231 or 237 therebetween and has the membrane 231 or 237 in a portion of the barrier wall thereof, to communicate with each other and in which the flow resistance of the liquid in the opposite liquid chamber-side passage located on the opposite liquid chamber side is different from the flow resistance of the liquid in the main liquid chamber-side passage 221$b$ located on the main liquid chamber 215 side, and the damping force difference increasing part that restrains any one of the swelling deformation of the membrane 231 or 237 toward the main liquid chamber 215 side and the swelling deformation of the membrane 231 or 237 toward the opposite liquid chamber and increases a difference between the damping force generated when the bound load is input and the damping force generated when the rebound load is input.

As a result, since the vibration-damping device 21 or 22 includes the damping force difference increasing part, any one of the swelling deformation of the membrane 231 or 237 toward the main liquid chamber 215 side and the swelling deformation of the membrane 231 or 237 toward the opposite liquid chamber can be restrained, and the difference between the damping force generated when the bound load is input and the damping force generated when the rebound load is input can be increased.

Here, the partition member 217 may further include the intermediate liquid chamber 235 that is the opposite liquid chamber, and the second orifice passage 222 that allows the intermediate liquid chamber 235 and the auxiliary liquid chamber 216 to communicate with each other, the first orifice passage 221 may include the main liquid chamber-side passage 221$a$, and the intermediate liquid chamber-side passage 221$b$ that is located on the intermediate liquid chamber side as the opposite liquid chamber-side passage, the damping force difference increasing part may include the uneven swelling part 223 or 236 that is formed in the membrane 231 or 237 and makes, compared to the swelling deformation of the membrane toward any one liquid chamber side of the main liquid chamber 215 and the intermediate liquid chamber 235, the swelling deformation of the membrane toward the second liquid chamber side larger when the same pressing force is applied to the membrane 231 or 237, and the one liquid chamber may be located on one passage side with a liquid flow resistance smaller than on the second passage side, out of the main liquid chamber-side passage 221$a$ and the intermediate liquid chamber-side passage 221$b$, in the flow direction of the liquid in the first orifice passage 221.

In this case, the uneven swelling part 223 or 236 is formed in the membrane 231 or 237. Thus, when the same pressing force is applied, the swelling deformation of the membrane 231 237 toward the second liquid chamber side of the main liquid chamber 215 and the intermediate liquid chamber 235 becomes larger than the swelling deformation of the membrane 231 or 237 toward any one liquid chamber side. Specifically, in a case where the flow resistance of the liquid in the intermediate liquid chamber-side passage 221$b$ in the first orifice passage 221 that allows the main liquid chamber 215 and the intermediate liquid chamber 235 to communicate with each other is lower than the flow resistance of the liquid in the main liquid chamber-side passage 221$a$, when the same pressing force is applied, the amount of swelling deformation of the membrane 231 the main liquid chamber 215 side is larger than that toward the intermediate liquid chamber 235 side. Hence, if the rebound load is input to the vibration-damping device 21, the damping force to be generated can be suppressed to be low as the membrane 231 is largely swelled and deformed toward the main liquid chamber 215 side by the uneven swelling part 223. On the other hand, if the rebound load is input to the vibration-damping device 21, the swelling deformation of the membrane 231 toward the intermediate liquid chamber 235 side becomes smaller than the swelling deformation of the membrane toward the main liquid chamber 215 side when the bound load is input, the positive pressure of the main liquid chamber 215 is not easily relieved, and the damping force to be generated becomes high. Additionally, as mentioned above, in a case where the flow resistance of the liquid in the intermediate liquid chamber-side passage 221$b$ is lower than the flow resistance of the liquid in the main liquid chamber-side passage 221$a$, when the bound load is input and when the liquid of the main liquid chamber 215 flows into the main liquid chamber-side passage 221$a$, a larger resistance is applied compared to a case where the liquid directly flows into the intermediate liquid chamber-side passage 221$b$. As a result, a high damping force can be generated when the bound load is input. On the other hand, when the liquid on the auxiliary liquid chamber 216 side flows through the first orifice passage 221 toward the main liquid chamber 215, even if the flow resistance is different between the main liquid chamber-side passage 221$a$ and the intermediate liquid chamber-side passage 221$b$, both the passages constitute one orifice passage continuously with each other. Thus, it is possible to suppress the resistance generated when the liquid passes through a boundary portion therebetween, and the damping force generated when the rebound load is input can be suppressed to be low. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased. Moreover, even if the main liquid chamber 215 tends to have a negative pressure suddenly with the input of a large rebound load, the membrane 231 is largely swelled and deformed toward the main liquid chamber 215 side by the uneven swelling part 236, and thereby, the negative pressure of the main liquid chamber 215 can be suppressed. Therefore, the occurrence of cavitation can also be suppressed.

Contrary to the above, in a case where the flow resistance of the liquid in the main liquid chamber-side passage 221$a$ is lower than the flow resistance of the liquid in the intermediate liquid chamber-side passage 221$b$, the uneven swelling part 236 is formed in the membrane 237. Therefore, when the same pressing force is applied, the amount of swelling deformation of the membrane 237 toward the intermediate liquid chamber 235 side is larger than that toward the main liquid chamber 215 side. Hence, if the bound load is input to the vibration-damping device, the damping force to be generated can be suppressed to be low as the membrane 237 is largely swelled and deformed toward the intermediate liquid chamber 235 side by the uneven swelling part 236. On the other hand, if the bound load is input to the vibration-damping device, the swelling deformation of the membrane 237 toward the main liquid chamber 215 side becomes smaller than the swelling deformation of the membrane toward the intermediate liquid chamber 235 side when the rebound load is input, the negative pressure of the main liquid chamber 215 is not easily relieved, and the damping force to be generated becomes high. Additionally, as mentioned above, in a case where the flow resistance of the liquid in the main liquid chamber-side passage 221a is lower than the flow resistance of the liquid in the intermediate liquid chamber-side passage 221b, when the rebound load is input and when the liquid of the auxiliary liquid chamber 216 flows into the intermediate liquid chamber-side passage 221b after flowing into the intermediate liquid chamber 235 through the second orifice passage 222, a larger resistance is applied compared to a case where the liquid directly flows into the main liquid chamber-side passage 221a. As a result, a high damping force can be generated when the rebound load is input. On the other hand, when the liquid of the main liquid chamber 215 flows through the first orifice passage 221 toward the auxiliary liquid chamber 216, even if the flow resistance is different between the main liquid chamber-side passage 221a and the intermediate liquid chamber-side passage 221b, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Additionally, the aforementioned respective functions and effects are achieved by a configuration in which the flow resistance of the liquid in the intermediate liquid chamber-side passage 221b and the flow resistance of the liquid in the main liquid chamber-side passage 221a are different from each other and the membrane 231 or 237 has the uneven swelling parts and constitutes portions of both the barrier walls of both the main liquid chamber 215 and intermediate liquid chamber 235, as mentioned above, without adopting, for example, members that operate when the liquid pressure within the main liquid chamber 215 reaches a predetermined value. Therefore, the aforementioned functions and effects can be stably and accurately achieved even with vibration of a relatively small amplitude.

Here, the uneven swelling part 223 or 236 may be curved so as to project toward the one liquid chamber side.

In this case, a configuration in which, compared to than the swelling deformation of the membrane toward any one liquid chamber side, the swelling deformation of the membrane toward the second liquid chamber side of the main liquid chamber 215 and intermediate liquid chamber 235 is larger when the same pressing force is applied to the membrane 231 or 237 can be easily and reliably realized.

Here, the damping force difference increasing part may further include the sandwiching member 239 that sandwiches the outer peripheral edge 231a or 237a of the membrane 231 or 237 from both directions of the main liquid chamber 215 side and the intermediate liquid chamber 235 side, and the uneven swelling part 223 or 236 may be integrally formed over the entire region of the portion of the membrane 231 or 237 located radially inside the outer peripheral edge 231a or 237a.

In this case, since the uneven swelling part 223 or 236 is integrally formed over the entire region of the portion of the membrane 231 or 237 located radially inside the outer peripheral edge 231a or 237a, it is possible to largely swell and deform the membrane 231 or 237 toward the second liquid chamber side, and the damping force generated when the bound load is input and the damping force generated when the rebound load is input can be made greatly different from each other.

Here, the other passage having a larger liquid flow resistance than the one passage out of the main liquid chamber-side passage 221a and the intermediate liquid chamber-side passage 221b may be a passage having a longer channel length than a channel diameter. In this case, since the other passage is a passage having a longer channel length than a channel diameter, the resistance applied to the liquid that flows through the passage can be much more reliably increased.

In addition, the technical scope of the invention is not limited to the above embodiment, and various changes can be made without departing the spirit of the invention.

For example, in the above embodiment, the first orifice passage 221 extends in the circumferential direction, and the second orifice passage 222 extends in the axial direction. However, the invention is not limited to this. Additionally, in the above embodiment, the first sandwiching part 225 or 227 protrudes longer inward in the radial direction than the second sandwiching part 238 or 229. However, the invention is not limited to this. For example, the second sandwiching part 238 or 229 may protrude longer inward in the radial direction than the first sandwiching part 225 or 227, or the respective inner peripheral surfaces of the first sandwiching part 225 or 227 and the second sandwiching part 238 or 229 may be located at the same position in the radial direction. Additionally, in the above embodiments, the compression type vibration-damping devices 21 and 22 in which the positive pressure acts on the main liquid chamber 215 as the support load acts have been described. However, it is also applicable to a hanging-type vibration-damping device that is attached such that the main liquid chamber 215 is located on the lower side in a vertical direction and the auxiliary liquid chamber 216 is located on the upper side in the vertical direction and the negative pressure acts on the main liquid chamber 215 as the support load acts. Additionally, the vibration-damping devices 21 and 22 related to the invention are not limited to engine mounts of vehicles and are also applicable to those other than the engine mounts. For example, the vibration-damping device is also applicable to mounts of power generators loaded on construction machines or is also applicable to mounts of machines installed in factories or the like.

In addition, it is possible to appropriately substitute the constituent elements in the above-described embodiments with well-known constituent elements without departing from the spirit of the invention. Additionally, the above-described modification examples may be combined appropriately.

Fifth Embodiment

Figure 9:
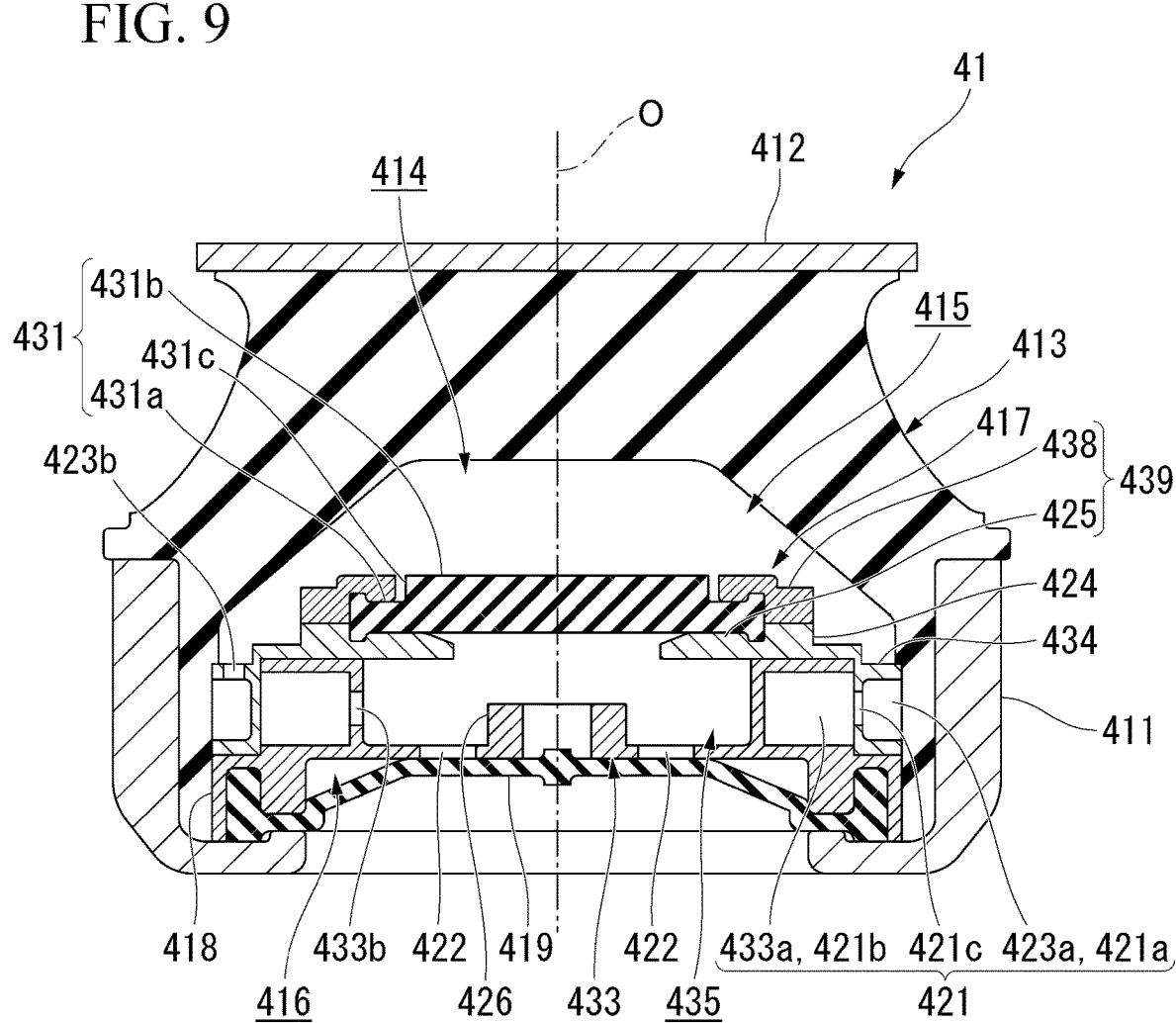
FIG. 9 is a longitudinal sectional view of a vibration-damping device related to a fifth embodiment of the invention.
Figure 10:
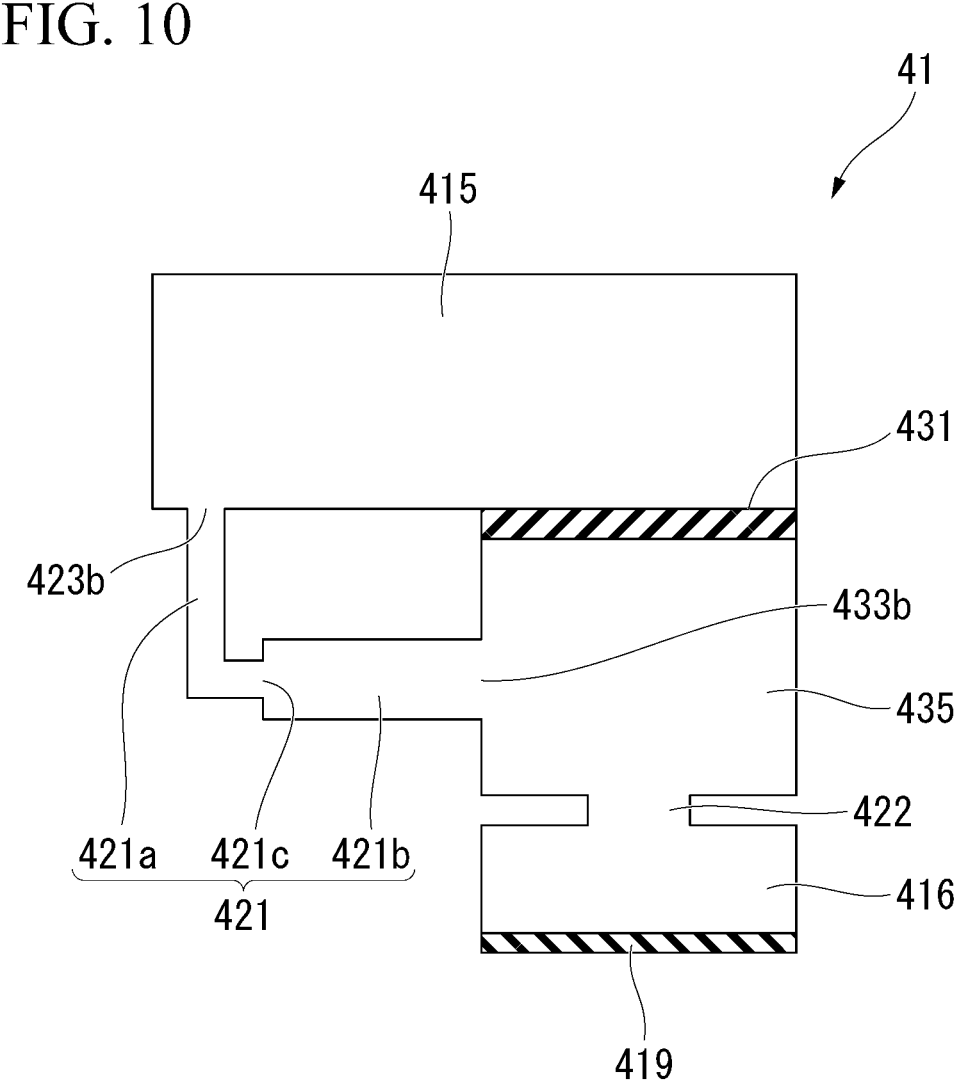
FIG. 10 is a schematic view of the vibration-damping device shown in FIG. 9.

Hereinafter, a vibration-damping device 41 related to a fifth embodiment of the invention will be described, referring to FIGS. 9 and 10. As shown in FIG. 9, the vibration-damping device 41 includes a tubular first attachment member 411 that is coupled to any one of a vibration generating part and a vibration receiving part, a second attachment member 412 that is coupled to the other thereof, an elastic body 413 that couples the first attachment member 411 and the second attachment member 412 to each other, a partition member 417 that partitions a liquid chamber 414 within the first attachment member 411 into a main liquid chamber 415 and an auxiliary liquid chamber 416 having the elastic body 413 as a portion of a barrier wall. In the example shown, the partition member 417 partitions the liquid chamber 414 in an axial direction along a central axis O of the first attachment member 411. In a case where the vibration-damping device 41 is used, for example, an engine mount of an automobile, the first attachment member 411 is coupled to a vehicle body serving as the vibration receiving part, and the second attachment member 412 is coupled to an engine serving as the vibration generating part. As a result, the transmission of the vibration of the engine to the vehicle body is suppressed. In addition, the first attachment member 411 may be coupled to the vibration generating part, and the second attachment member 412 may be coupled to the vibration receiving part.

Hereinafter, the main liquid chamber 415 side in the axial direction with respect to the partition member 417 is referred to as an upper side, and the auxiliary liquid chamber 416 side is referred to as a lower side. Additionally, in a plan view of the vibration-damping device 41 as viewed from the axial direction, a direction intersecting the central axis O is referred to as a radial direction, and a direction going around the central axis O is referred to as a circumferential direction.

The first attachment member 411 is formed in a bottomed tubular shape. A bottom part of the first attachment member 411 is formed in an annular shape and is disposed coaxially with the central axis O. An inner peripheral surface of a lower part of the first attachment member 411 is covered with a covering rubber formed integrally with the elastic body 413. The second attachment member 412 is formed in a flat plate shape having front and back surfaces orthogonal to the central axis O. The second attachment member 412 is formed, for example, in a disk shape and is disposed coaxially with the central axis O. The second attachment member 412 is disposed above the first attachment member 411. The external diameter of the second attachment member 412 is equal to the internal diameter of the first attachment member 411.

The elastic body 413 couples an inner peripheral surface of an upper part of the first attachment member 411 and a lower surface of the second attachment member 412 to each other. An upper end opening part of the first attachment member 411 is sealed with the elastic body 413. The elastic body 413 is vulcanized and bonded to the first attachment member 411 and the second attachment member 412. The elastic body 413 is formed in a topped tubular shape and is disposed coaxially with the central axis O. A top wall part of the elastic body 413 is coupled to the second attachment member 412, and a lower end part in a peripheral wall part thereof is coupled to the first attachment member 411. The peripheral wall part of the elastic body 413 gradually extends outward in the radial direction from the upper side to the lower side.

A diaphragm ring 418 is liquid-tightly fitted into the lower end part of the first attachment member 411 via the covering rubber. The diaphragm ring 418 is formed in a double tubular shape and is disposed coaxially with the central axis O. An outer peripheral part of a diaphragm 419, which is formed to be elastically deformable with rubber or the like, is vulcanized and bonded to the diaphragm ring 418. An outer peripheral part of the diaphragm 419 is vulcanized and bonded to an inner peripheral surface of an outer tube portion and an outer peripheral surface of an inner tube portion in the diaphragm ring 418. The diaphragm 419 is deformed to expand and contract with the inflow and outflow of a liquid into the auxiliary liquid chamber 416. The liquid chamber 414 in which the liquid is enclosed is defined within the first attachment member 411 by the diaphragm 419 and the elastic body 413. In addition, as the liquid enclosed in the liquid chamber 414, for example, water, ethylene glycol, or the like can be used.

The partition member 417 is formed in a disk shape having front and back surfaces orthogonal to the central axis O and is fitted into the first attachment member 411 via the covering rubber. The liquid chamber 414 within the first attachment member 411 is divided into the main liquid chamber 415 defined by the elastic body 413 and the partition member 417 and the auxiliary liquid chamber 416 defined by the diaphragm 419 and the partition member 417 by the partition member 417.

The partition member 417 includes a tubular body member 434 that is fitted into the first attachment member 411 via the covering rubber, a membrane 431 that blocks an upper end opening part of the body member 434 and forms a portion of the barrier wall of the main liquid chamber 415, a lower member 433 that blocks a lower end opening part of the body member 434, an intermediate liquid chamber 435 that is located opposite to the main liquid chamber 415 with the membrane 431 therebetween and has the membrane 431 as a portion of the barrier wall, an annular sandwiching member 439 that fixes the membrane 431 to the body member 434, a first orifice passage 421 that allows the main liquid chamber 415 and the intermediate liquid chamber 435 to communicate with each other, and a second orifice passage 422 that allows the intermediate liquid chamber 435 and the auxiliary liquid chamber 416 to communicate with each other. In addition, a liquid chamber, which is located opposite to the main liquid chamber with the membrane therebetween and has the membrane in a portion of the barrier wall thereof, is referred to as an opposite liquid chamber. The opposite liquid chamber of the present embodiment and sixth to ninth embodiments to be described below is the intermediate liquid chamber 435.

The membrane 431 is formed in a disk shape with an elastic material, such as rubber. The membrane 431 is disposed coaxially with the central axis O. The volume of the membrane 431 is smaller than the volume of the elastic body 413. The membrane 431 includes a disk-shaped body part 431b, and an outer peripheral edge 431a that is formed to be thinner than the body part 431b, protrudes outward in the radial direction from a lower part of the body part 431b, and continuously extends over the entire circumference. Upper and lower surfaces of the body part 431b extend in the direction orthogonal to the axial direction over the entire region. Locking projections, which protrude toward both sides in the axial direction, are formed on an outer end part of the outer peripheral edge 431a in the radial direction.

The body member 434 is disposed coaxially with the central axis O. A first orifice groove 423a, which opens outward in the radial direction and extends in the circumferential direction, is formed in an outer peripheral surface of the body member 434. A radially outer opening of the first orifice groove 423a is blocked by the covering rubber. A first communication hole 423b, which allows the main liquid chamber 415 and the first orifice groove 423a to communicate with each other, is formed in an upper surface of the body member 434. The first communication hole 423b allows the main liquid chamber 415 and the first orifice groove 423a to communicate with each other in the axial direction. The first orifice groove 423a extends in the circumferential direction over an angular range exceeding 180° from the first communication hole 423b toward one side in the circumferential direction with the central axis O as a center.

The sandwiching member 439 sandwiches the outer peripheral edge 431a of the membrane 431 from both directions of the main liquid chamber 415 side and the intermediate liquid chamber 435 side. The sandwiching member 439 includes a first sandwiching part 425 that supports a lower surface of the membrane 431, and a second sandwiching part 438 that supports an upper surface of the membrane 431. The first sandwiching part 425 and the second sandwiching part 438 are formed in an annular shape, respectively, and are disposed coaxially with the central axis O. As the outer peripheral edge 431a of the membrane 431 is sandwiched and fixed by the first sandwiching part 425 and the second sandwiching part 438 in the axial direction, the membrane 431 is supported to be elastically deformable in the axial direction with the outer peripheral edge 431a thereof as a fixed end.

The first sandwiching part 425 is coupled to the body member 434 via an outer flange part 424. The outer flange part 424 is formed integrally with the body member 434 and protrudes inward in the radial direction from an upper end part of the body member 434. The outer flange part 424 is disposed coaxially with the central axis O. The first sandwiching part 425 is formed integrally with the outer flange part 424 and protrudes inward in the radial direction from the outer flange part 424. Respective lower surfaces of the first sandwiching part 425 and the outer flange part 424 are flush with each other. An upper surface of the first sandwiching part 425 is located below an upper surface of the outer flange part 424. A lower annular groove, which continuously extends over the entire circumference, is formed at an outer peripheral edge in the upper surface of the first sandwiching part 425.

An outer peripheral part of the second sandwiching part 438 is disposed on the upper surface of the outer flange part 424 and the inner peripheral part thereof supports the upper surface of the membrane 431. An upper annular groove, which continuously extends over the entire circumference, is formed at an outer peripheral edge in a lower surface of an inner peripheral part of the second sandwiching part 438. The upper annular groove faces a lower annular groove of the first sandwiching part 425 in the axial direction. The locking projections of the outer peripheral edge 431a of the membrane 431 are separately locked to the upper annular groove and the lower annular groove.

Here, the portion of the body part 431b of the membrane 431 located above the outer peripheral edge 431a is inserted into the inner peripheral part of the second sandwiching part 438. A radial gap is provided between an outer peripheral surface (hereinafter, referred to as the outer peripheral surface 431c of the body part 431b of the membrane 431) of the portion of the body part 431b of the membrane 431 located above the outer peripheral edge 431a, and an inner peripheral surface of the inner peripheral part of the second sandwiching part 438. The inner peripheral surface of the inner peripheral part of the second sandwiching part 438 and the outer peripheral surface 431c of the body part 431b of the membrane 431 extend in the axial direction, respectively. The inner peripheral surface of the inner peripheral part of the second sandwiching part 438 and the outer peripheral surface 431c of the body part 431b of the membrane 431 are substantially parallel to each other. In addition, the inner peripheral surface of the inner peripheral part of the second sandwiching part 438 and the outer peripheral surface 431c of the body part 431b of the membrane 431 may be inclined with respect to each other.

The lower member 433 is formed in a bottomed tubular shape and is disposed coaxially with the central axis O. The lower member 433 is liquid-tightly fitted into the body member 434. A bottom wall part of the lower member 433 forms a barrier wall that partitions the auxiliary liquid chamber 416 and the intermediate liquid chamber 435 in the axial direction. An upper end opening edge of a peripheral wall part of the lower member 433 integrally abuts against respective lower surfaces of the first sandwiching part 425 and the outer flange part 424. An upper surface of the bottom wall part of the lower member 433 is separated downward from the lower surface of the membrane 431. The aforementioned intermediate liquid chamber 435 is defined by the upper surface of the bottom wall part and an inner peripheral surface of the peripheral wall part in the lower member 433a and the lower surface of the membrane 431. The intermediate liquid chamber 435 and the main liquid chamber 415 are partitioned in the axial direction by the membrane 431. The internal volume of the intermediate liquid chamber 435 is smaller than the internal volume of the main liquid chamber 415.

A second orifice groove 433a, which opens outward in the radial direction and extends in the circumferential direction, is formed in an outer peripheral surface of the peripheral wall part of the lower member 433. A radially outer opening of the second orifice groove 433a is blocked by an inner peripheral surface of the body member 434. A second communication hole 433b, which allows the second orifice groove 433a and the intermediate liquid chamber 435 to communicate with each other, is formed in an inner peripheral surface of the peripheral wall part of the lower member 433. The second communication hole 433b allows the second orifice groove 433a and the intermediate liquid chamber 435 to communicate with each other in the radial direction. The second orifice groove 433a extends in the circumferential direction over an angular range exceeding 180° from the second communication hole 433b toward one side in the circumferential direction with the central axis O as a center. End parts of the second orifice groove 433a and the first orifice groove 423a on one side in the circumferential direction are disposed at the same circumferential position.

The auxiliary liquid chamber 416 is defined by a lower surface of the bottom wall part in the lower member 433 and the diaphragm 419. A second orifice passage 422, which allows the auxiliary liquid chamber 416 and the intermediate liquid chamber 435 to communicate with each other, is formed in the bottom wall part of the lower member 433. The second orifice passage 422 allows the auxiliary liquid chamber 416 and the intermediate liquid chamber 435 to communicate with each other in the axial direction. An opening part of the second orifice passage 422 on the intermediate liquid chamber 435 side faces the membrane 431. The second orifice passage 422 is a through-hole formed in the bottom wall part of the lower member 433, and a plurality of the second orifice passages are formed in the bottom wall part of the lower member 433. At least some of the second orifice passages 422 face the membrane 431 in the axial direction.

A restriction projection 426, which restricts excessively large swelling deformation of the membrane 431 toward the intermediate liquid chamber 435 side, is disposed the upper surface of the bottom wall part in the lower member 433. The restriction projection 426 is formed integrally with the lower member 433. The restriction projection 426 is formed in a tubular shape and is disposed coaxially with the central axis O. In addition, the restriction projection 426 may be formed in a solid form or may not be disposed coaxially with the central axis O.

The aforementioned diaphragm ring 418 is disposed at an outer peripheral edge located radially outside the plurality of second orifice passages 422 on the lower surface of the bottom wall part in the lower member 433. The diaphragm ring 418 is formed integrally with the lower member 433. The portion of the diaphragm ring 418 located radially outside the inner tube portion is located radially outside the lower member 433, and a lower surface of the body member 434 liquid-tightly abuts against an upper surface of a connection portion between the outer tube portion and the inner tube portion.

The channel cross-sectional area and the channel length of each second orifice passage 422 are smaller than the channel cross-sectional area and the channel length of the first orifice passage 421 to be described below, respectively. The channel length of the second orifice passage 422 is smaller than the internal diameter thereof. In addition, the channel length of the second orifice passage 422 may be equal to or greater than the internal diameter. The flow resistance of the liquid in each second orifice passage 422 is smaller than the flow resistance of the liquid in the first orifice passage 421.

Here, a connection hole 421c, which allows the first orifice groove 423a and the second orifice groove 433a to communicate with each other, is formed in the inner peripheral surface of the body member 434. The connection hole 421c allows the first orifice groove 423a and the second orifice groove 433a to communicate with each other in the radial direction. Also, the first orifice passage 421, which allows the main liquid chamber 415 and the intermediate liquid chamber 435 to communicate with each other, is constituted of the first orifice groove 423a having the radially outer opening blocked by the covering rubber, the second orifice groove 433a having a radially outer opening blocked by the inner peripheral surface of the body member 434, and the connection hole 421c. Hereinafter, the portion of the first orifice passage 421, which is located on the main liquid chamber 415 side and is defined by the first orifice groove 423a, is referred to as a main liquid chamber-side passage 421a, and the portion of the first orifice passage, which is located on the intermediate liquid chamber 435 side and is defined by the second orifice groove 433a, is referred to as an intermediate liquid chamber-side passage 421b. In addition, the portion of the first orifice passage, which is located opposite to the main liquid chamber with the membrane therebetween and is located on the liquid chamber (opposite liquid chamber) having the membrane in a portion of the barrier wall thereof, is referred to as an opposite liquid chamber-side passage. The opposite liquid chamber-side passage of the present embodiment and the sixth to ninth embodiments to be described below is the intermediate liquid chamber-side passage 421b.

Here, the connection hole 421c connects an end part of the first orifice groove 423a on one side in the circumferential direction and an end part of the second orifice groove 433a on one side in the circumferential direction to each other. As a result, a liquid flows from any one of the main liquid chamber-side passage 421a and the intermediate liquid chamber-side passage 421b through the connection hole 421c to the other, and in the process in which the liquid flows through the other side, the flow direction of the liquid flowing through the one and the flow direction of the liquid flowing through the other are opposite to each other in the circumferential direction.

Moreover, in the present embodiment, the flow resistance of the liquid in the intermediate liquid chamber-side passage 421b is lower than the flow resistance of the liquid in the main liquid chamber-side passage 421a. In the example shown, the channel cross-sectional area of the main liquid chamber-side passage 421a is smaller than the channel cross-sectional area of the intermediate liquid chamber-side passage 421b. The opening area of the connection hole 421c is smaller than the channel cross-sectional area of the main liquid chamber-side passage 421a. The channel length of the connection hole 421c is shorter than the channel length of each of the main liquid chamber-side passage 421a and the intermediate liquid chamber-side passage 421b.

Here, the respective flow resistances of the main liquid chamber-side passage 421a and the first communication hole 423b may be equal to each other or may be different from each other. For example, in a case where the flow resistance of the main liquid chamber-side passage 421a is higher than the flow resistance of the first communication hole 423b, the flow resistance of the liquid when passing through the first communication hole 423b and entering the main liquid chamber-side passage 421a is increased, and a high damping force is generated when a bound load for causing the liquid to flow from the main liquid chamber 415 toward the auxiliary liquid chamber 416 side is input.

Additionally, the respective flow resistances of the connection hole 421c and the main liquid chamber-side passage 421a may be equal to each other or may be different from each other. For example, in a case where the flow resistance of the connection hole 421c is higher than the flow resistance of the main liquid chamber-side passage 421a, the flow resistance of the liquid when passing through the main liquid chamber-side passage 421a and entering the connection hole 421c is increased, and a high damping force is generated when the bound load is input.

Additionally, the respective flow resistances of the intermediate liquid chamber-side passage 421b and the connection hole 421c may be equal to each other or may be different from each other. For example, in a case where the flow resistance of the intermediate liquid chamber-side passage 421b is higher than the flow resistance of the connection hole 421c, the flow resistance of the liquid when passing through the connection hole 421c and entering the intermediate liquid chamber-side passage 421b is increased, and a high damping force is generated when the bound load is input.

Additionally, the respective flow resistances of the second communication hole 433b and the intermediate liquid chamber-side passage 421b may be equal to each other or may be different from each other. For example, in a case where the flow resistance of the second communication hole 433b is higher than the flow resistance of the intermediate liquid chamber-side passage 421b, the flow resistance of the liquid when passing through the intermediate liquid chamber-side passage 421b and entering the second communication hole 433b is increased, and a high damping force is generated when the bound load is input.

Additionally, in the present embodiment, an opening direction in which the first orifice passage 421 opens toward the intermediate liquid chamber 435, that is, an opening direction of the second communication hole 433b toward the intermediate liquid chamber 435 intersects an opening direction in which the second orifice passage 422 opens toward the intermediate liquid chamber 435. In the example shown, the second communication hole 433b opens in the radial direction toward the intermediate liquid chamber 435, and the second orifice passage 422 opens in the axial direction toward the intermediate liquid chamber 435. That is, the opening direction of the second communication hole 433b toward the intermediate liquid chamber 435 is orthogonal to the opening direction in which the second orifice passage 422 opens toward the intermediate liquid chamber 435.

Additionally, in the present embodiment, the cross-sectional area of the intermediate liquid chamber 435 in the direction orthogonal to the opening direction in which the second orifice passage 422 opens toward the intermediate liquid chamber 435 is larger than the channel cross-sectional area of the second orifice passage 422, the channel cross-sectional area of the intermediate liquid chamber-side passage 421b of the first orifice passage 421, and the channel cross-sectional area of the main liquid chamber-side passage 421a of the first orifice passage 421. Additionally, in the present embodiment, the main liquid chamber-side passage 421a and the intermediate liquid chamber-side passage 421b are passages having a longer channel length than a channel diameter. Here, in the example shown, the channel cross-sectional shape of the first orifice passage 421 is a rectangular shape. In this case, when the channel cross-sectional shape is substituted with a circular shape having the same channel cross-sectional area, the channel diameter can be represented by the diameter of the circular shape.

Here, in the present embodiment, the intermediate liquid chamber 435 is located on the intermediate liquid chamber-side passage 421b side where the flow resistance of the liquid is low out of the main liquid chamber-side passage 421a and the intermediate liquid chamber-side passage 421b in the flow direction of the liquid in the first orifice passage 421. Also, in the present embodiment, the first sandwiching part 425, which supports the membrane 431 from the intermediate liquid chamber 435 side, protrudes longer inward in the radial direction than the second sandwiching part 438 that supports the membrane 431 from the main liquid chamber 415 side. The portion of the first sandwiching part 425 located radially inside the second sandwiching part 438 supports an outer peripheral part in a lower surface of the body part 431b of the membrane 431. The upper surface of the inner peripheral edge of the first sandwiching part 425, which abuts against the membrane 431, is gradually inclined downward so as to be separated from the main liquid chamber 415 inward in the radial direction. In the example shown, the upper surface of the inner peripheral edge of the first sandwiching part 425 is formed in a curved surface shape that projects toward the main liquid chamber 415 side. The membrane 431 abuts against the entire lower surface of the second sandwiching part 438. In addition, the upper surface of the inner peripheral edge of the first sandwiching part 425 may be a flat surface that extends in the direction orthogonal to the central axis O. The membrane 431 may abut against the entire upper surface of the first sandwiching part 425.

As described above, according to the vibration-damping device 41 related to the present embodiment, the first sandwiching part 425, which protrudes longer inward in the radial direction than the second sandwiching part 438, supports the membrane 431 from the intermediate liquid chamber 435 side. Thus, when the same pressing force is applied, the amount of swelling deformation of the membrane 431 toward the intermediate liquid chamber 435 side is smaller than that toward the main liquid chamber 415 side. That is, if the bound load is input to the vibration-damping device 41, the swelling deformation of the membrane 431 toward the intermediate liquid chamber 435 side is restrained by the first sandwiching part 425, the positive pressure of the main liquid chamber 415 is not easily relieved, and the damping force to be generated becomes high. On the other hand, if the rebound load is input to the vibration-damping device 41, the swelling deformation of the membrane 431 toward the main liquid chamber 415 side becomes larger than the swelling deformation of the membrane toward the intermediate liquid chamber 435 side when the bound load is input to such an extent that the second sandwiching part 438 does not protrude inward in the radial direction from the first sandwiching part 425, and the damping force to be generated can be suppressed to be low. That is, the first sandwiching part 425 and the second sandwiching part 438 of the present embodiment are damping force difference increasing parts that restrain the swelling deformation of the membrane 431 toward the intermediate liquid chamber (opposite liquid chamber) 435 side out of the swelling deformation of the membrane toward the main liquid chamber 415 side and the swelling deformation of the membrane toward the intermediate liquid chamber (opposite liquid chamber) 435 side and increases a difference between the damping force generated when the bound load is input and the damping force generated when the rebound load is input.

Additionally, the flow resistance of the liquid in the intermediate liquid chamber-side passage 421b is lower than the flow resistance of the liquid in the main liquid chamber-side passage 421a. Thus, when the bound load is input and when the liquid of the main liquid chamber 415 flows into the main liquid chamber-side passage 421a, a larger resistance is applied compared to a case where the liquid directly flows into the intermediate liquid chamber-side passage 421b. As a result, a high damping force can be generated when the bound load is input. On the other hand, when the liquid on the auxiliary liquid chamber 416 side flows through the first orifice passage 421 toward the main liquid chamber 415, even if the flow resistance is different between the main liquid chamber-side passage 421a and the intermediate liquid chamber-side passage 421b, both the passages constitute one orifice passage continuously with each other. Thus, it is possible to suppress the resistance generated when the liquid passes through a boundary portion therebetween, and the damping force generated when the rebound load is input can be suppressed to be low. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased.

Moreover, as mentioned above, the swelling deformation of the membrane 431 is more easily swelled and deformed toward the main liquid chamber 415 side than toward the intermediate liquid chamber 435 side. Thus, even if the main liquid chamber 415 tends to have a negative pressure suddenly with the input of a large rebound load, the membrane 431 is swelled and deformed toward the main liquid chamber 415 side, and thereby, it is possible to suppress the negative pressure of the main liquid chamber 415, and the occurrence of cavitation can also be suppressed. Additionally, the aforementioned respective functions and effects are achieved by a configuration in which the flow resistance of the liquid in the intermediate liquid chamber-side passage 421b and the flow resistance of the liquid in the main liquid chamber-side passage 421a are different from each other and the membrane 431 constitutes portions of both the barrier walls of both the main liquid chamber 415 and intermediate liquid chamber 435, the sandwiching member 439 includes the first sandwiching part 425 and the second sandwiching part 438, as mentioned above, without adopting, for example, members that operate when the liquid pressure within the main liquid chamber 415 reaches a predetermined value. Therefore, the aforementioned functions and effects can be stably and accurately achieved even with vibration of a relatively small amplitude.

Additionally, the upper surface of the inner peripheral edge of the first sandwiching part 425, which abuts against the membrane 431, is gradually inclined so as to be separated from the main liquid chamber 415 inward in the radial direction. Thus, when the bound load is input and when the membrane 431 is swelled and deformed toward the intermediate liquid chamber 435 side, the membrane can easily come into surface contact with the inner peripheral edge of the first sandwiching part 425, the generation of abnormal noise can be suppressed, and the durability of the membrane 431 can be secured.

Additionally, the radial gap is provided between the outer peripheral surface 431c of the body part 431b of the membrane 431 and the inner peripheral surface of the inner peripheral part of the second sandwiching part 438. Thus, even with vibration of a relatively small amplitude, when the rebound load is input, it is possible to smoothly swell and deform the membrane 431 toward the main liquid chamber 415 side, and the damping force to be generated can be reliably suppressed to be low. Additionally, when the membrane 431 tends to be excessively largely swelled and deformed toward the main liquid chamber 415 side at the time of the input of the rebound load, the outer peripheral surface 431c of the body part 431b can be made to abut against the inner peripheral surface of the inner peripheral part of the second sandwiching part 438, and a large load can be prevented from being applied to the connection portion between the outer peripheral edge 431a and the body part 431b in the membrane 431. Additionally, since the main liquid chamber-side passage 421a of the first orifice passage 421 is a passage having a longer channel length than a channel diameter, the resistance applied to the liquid from the main liquid chamber 415 side that flows into this portion can be increased, and the damping force generated when the bound load is input can be much more reliably increased.

Additionally, since the opening direction in which the first orifice passage 421 opens toward the intermediate liquid chamber 435 intersects the opening direction in which the second orifice passage 422 opens toward the intermediate liquid chamber 435, it is possible to suppress that the liquid from the main liquid chamber 415 side that has flowed into the intermediate liquid chamber 435 goes straight toward the second orifice passage 422, and this liquid can be diffused within the intermediate liquid chamber 435. As a result, the flow speed of the liquid can be reliably reduced until the liquid of the main liquid chamber 415 flows into the second orifice passage 422, and a high damping force can be generated when the bound load is input.

Additionally, since the cross-sectional area of the intermediate liquid chamber 435 is larger than the channel cross-sectional area of the second orifice passage 422, it is possible to increase the resistance generated when the liquid of the intermediate liquid chamber 435 flows into the second orifice passage 422, and the damping force generated when the bound load is input can be reliably increased.

Sixth Embodiment

Figure 11:
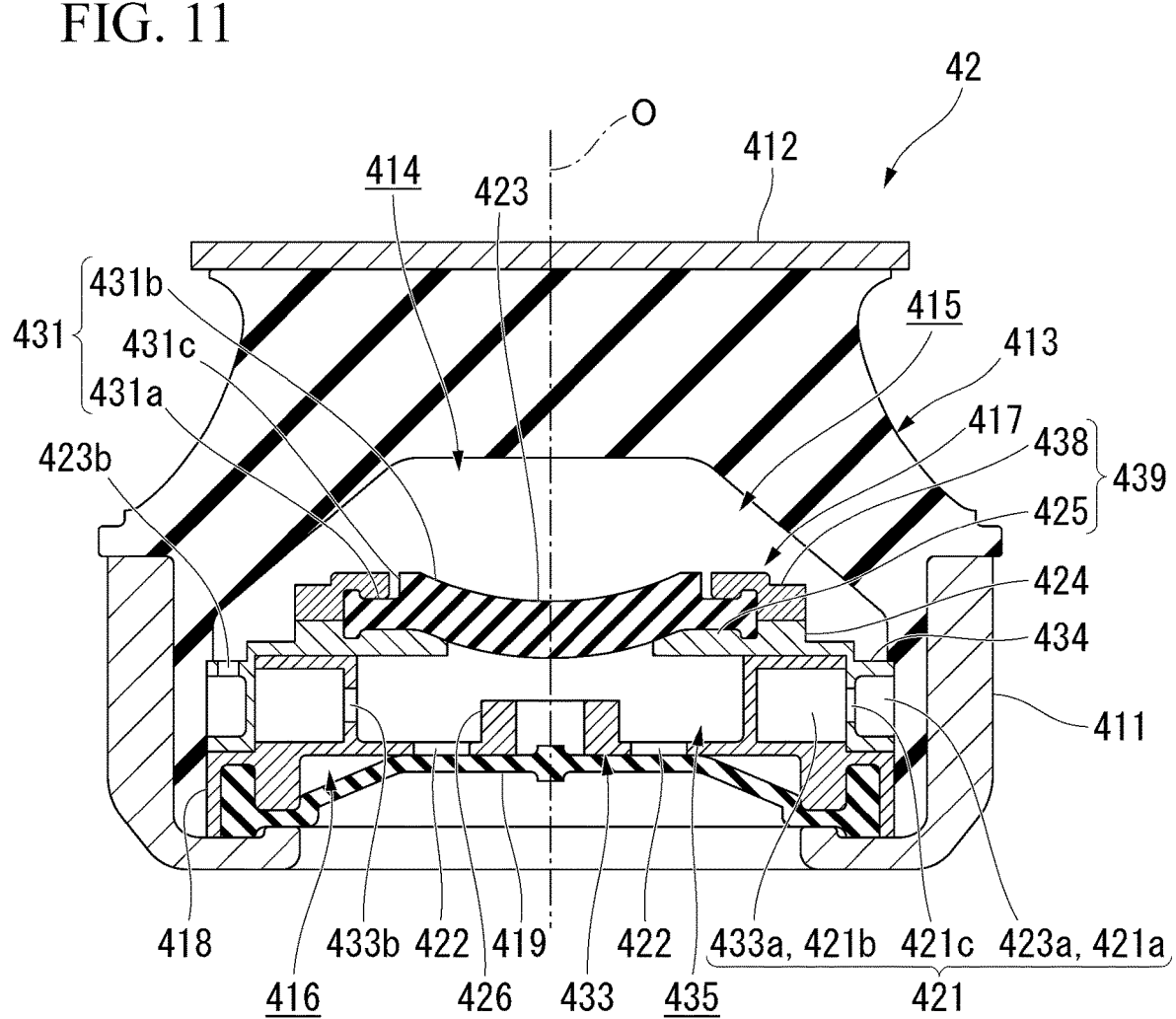
FIG. 11 is a longitudinal sectional view of a vibration-damping device related to a sixth embodiment of the invention.
Figure 12:
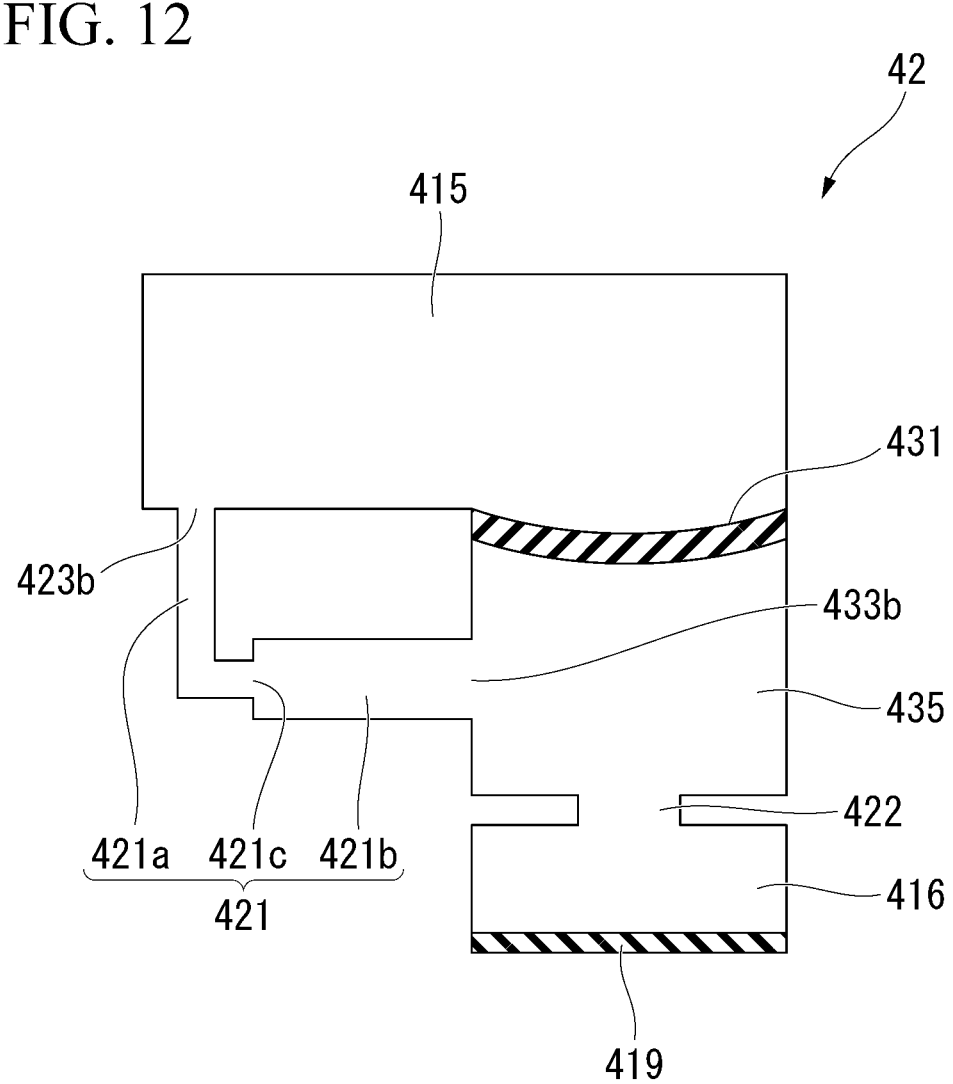
FIG. 12 is a schematic view of the vibration-damping device shown in FIG. 11.

Next, a vibration-damping device 42 related to a sixth embodiment of the invention will be described, referring to FIGS. 11 and 12. In addition, in the sixth embodiment, the same portions as the constituent elements in the above-described fifth embodiment will be designated by the same reference signs, and a description thereof will be omitted, and only different points will be described.

Also, in the present embodiment, an uneven swelling part 423 is formed that makes the swelling deformation of the membrane toward the main liquid chamber 415 side larger than the swelling deformation of the membrane toward the intermediate liquid chamber 435 side when the same pressing force is applied to the membrane 431. The uneven swelling part 423 is curved so as to project toward the intermediate liquid chamber 435 side. The uneven swelling part 423 is integrally formed over the entire body part 431b, which is located radially inside the outer peripheral edge 431a sandwiched in the axial direction by the sandwiching member 439, in the membrane 431. In addition, the uneven swelling part 423 is not limited to the aforementioned curved shape and may be appropriately changed, for example, by making the sizes of grooves formed in the upper and lower surfaces of the membrane 431 different from each other.

The lower surface of the membrane 431 abuts against the upper surface of the inner peripheral edge of the first sandwiching part 425. The uneven swelling part 423 of the membrane 431 overhangs to the inside of the first sandwiching part 425. Respective axial positions of a lower end part in a lower surface of the uneven swelling part 423 and a lower surface of the first sandwiching part 425 are the same as each other. The lower surface of the membrane 431 is in non-contact with an inner peripheral surface of the first sandwiching part 425. The membrane 431 abuts against the entire upper surface of the first sandwiching part 425, and the entire lower surface of the inner peripheral part of the second sandwiching part 438. In addition, the lower surface of the membrane 431 may be spaced apart upward from the upper surface of the inner peripheral edge of the first sandwiching part 425. The uneven swelling part 423 of the membrane 431 may be located above the inner peripheral surface of the first sandwiching part 425. The lower surface of the membrane 431 may be brought into contact with the inner peripheral surface of the first sandwiching part 425.

As described above, according to the vibration-damping device 42 related to the present embodiment, the uneven swelling part 423 is formed in the membrane 431. Thus, when the same pressing force is applied, the amount of swelling deformation of the membrane 431 toward the main liquid chamber 415 side is larger than that toward the intermediate liquid chamber 435 side. Hence, if the rebound load is input to the vibration-damping device 42, the damping force to be generated can be suppressed to be low as the membrane 431 is largely swelled and deformed toward the main liquid chamber 415 side by the uneven swelling part 423. On the other hand, if the bound load is input to the vibration-damping device 42, the swelling deformation of the membrane 431 toward the intermediate liquid chamber 435 side becomes smaller than the swelling deformation of the membrane toward the main liquid chamber 415 side when the rebound load is input, the positive pressure of the main liquid chamber 415 is not easily relieved, and the damping force to be generated becomes high. As described above, the ratio of the damping force generated when the bound load is input to the damping force generated when the rebound load is input can be reliably increased. That is, the uneven swelling part 423 of the present embodiment is a damping force difference increasing part that restrains the swelling deformation of the membrane 431 toward the intermediate liquid chamber (opposite liquid chamber) 435 side out of the swelling deformation of the membrane toward the main liquid chamber 415 side and the swelling deformation of the membrane toward the intermediate liquid chamber (opposite liquid chamber) 435 side and increases a difference between the damping force generated when the bound load is input and the damping force generated when the rebound load is input.

Additionally, since the uneven swelling part 423 is curved so as to project toward the intermediate liquid chamber 435 side, a configuration in which the swelling deformation of the membrane toward the main liquid chamber 415 side is larger than the swelling deformation of the membrane toward the intermediate liquid chamber 435 side when the same pressing force is applied to the membrane 431 can be easily and reliably realized. Additionally, since the uneven swelling part 423 overhangs to the inside of the first sandwiching part 425, a configuration in which the swelling deformation of the membrane 431 toward the main liquid chamber 415 side is made larger than the swelling deformation of the membrane 431 toward the intermediate liquid chamber 435 side when the same pressing force is applied can be much more reliably realized.

Additionally, the uneven swelling part 423 is integrally formed over the entire body part 431b, which is located radially inside the outer peripheral edge 431a sandwiched in the axial direction by the sandwiching member 439, in the membrane 431. Thus, it is possible to largely swell and deform the membrane 431 toward the main liquid chamber 415 side, and the damping force generated when the bound load is input and the damping force generated when the rebound load is input can be made greatly different from each other. Additionally, the membrane 431 abuts against the inner peripheral edge of the first sandwiching part 425. Thus, when the bound load is input, it is possible to inhibit the membrane 431 from colliding against the inner peripheral edge of the first sandwiching part 425, and the generation of abnormal noise can be reliably suppressed. Additionally, the membrane 431 abuts against the inner peripheral edge of the first sandwiching part 425. Thus, even with vibration of a relatively small amplitude, a high damping force can be generated when the bound load is input.

Seventh Embodiment

Figure 13:
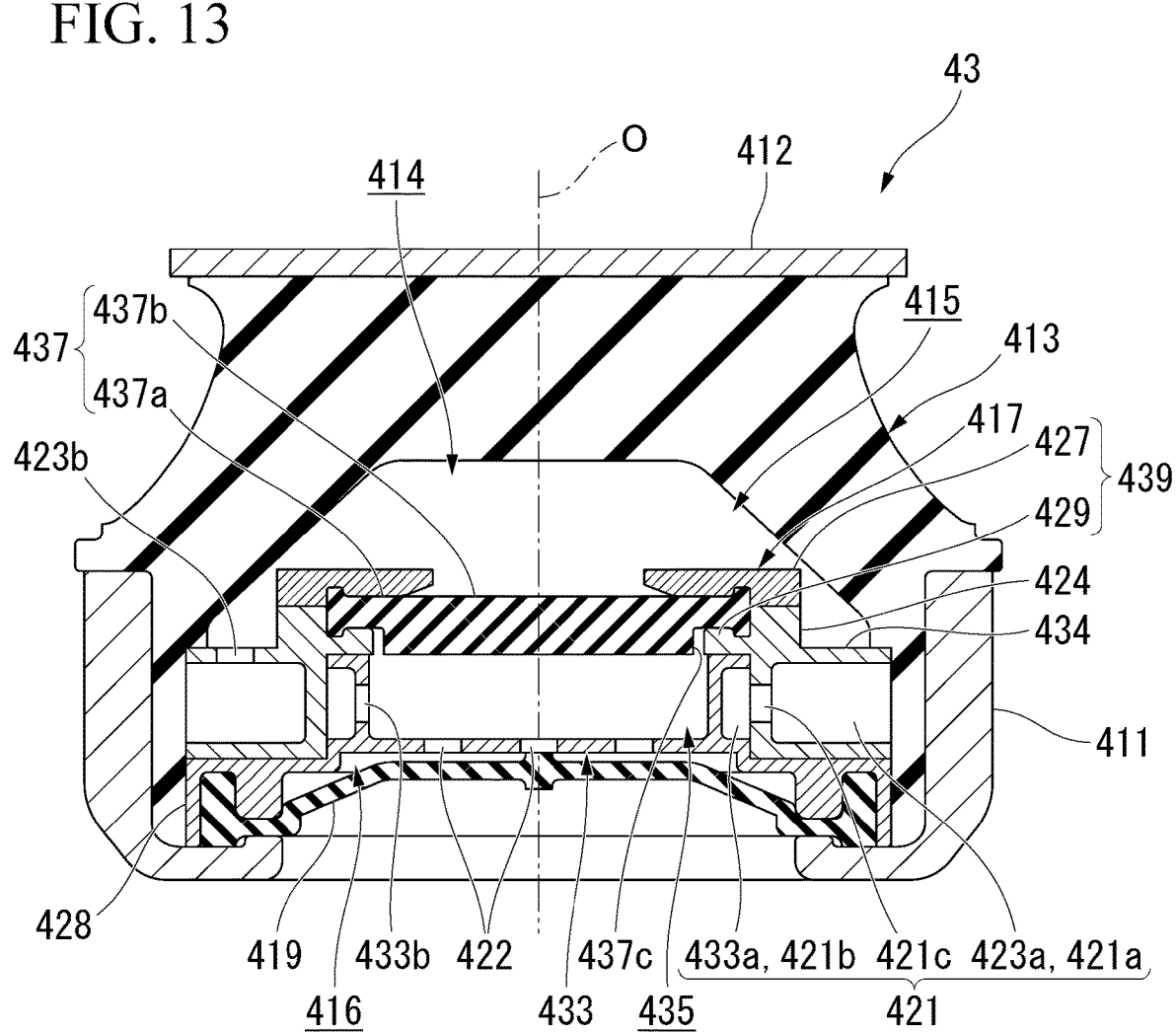
FIG. 13 is a longitudinal sectional view of a vibration-damping device related to a seventh embodiment of the invention.
Figure 14:
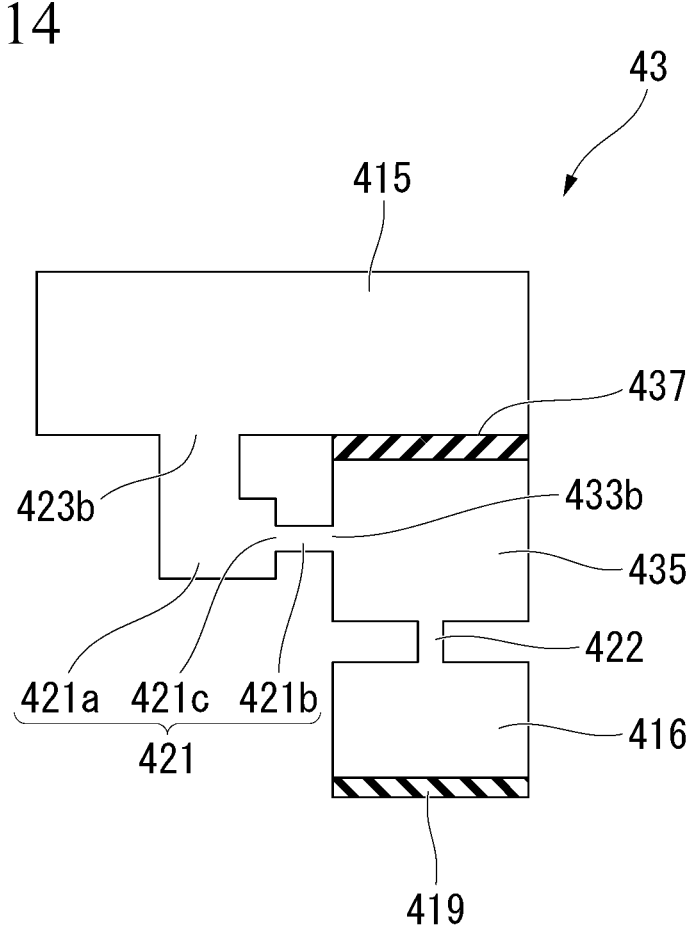
FIG. 14 is a schematic view of the vibration-damping device shown in FIG. 13.

Next, a vibration-damping device 43 related to a seventh embodiment of the invention will be described, referring to FIGS. 13 and 14. In addition, in the seventh embodiment, the same portions as the constituent elements in the above-described fifth embodiment will be designated by the same reference signs, and a description thereof will be omitted, and only different points will be described.

A diaphragm ring 428 protrudes outward in the radial direction from a lower end part of the lower member 433, and the lower surface of the body member 434 liquid-tightly abuts against an upper surface of the diaphragm ring 428. The diaphragm ring 428 is formed integrally with the lower member 433. The outer flange part 424 protrudes upward from an inner peripheral edge in the upper surface of the body member 434. Respective inner peripheral surfaces the outer flange part 424 and the body member 434 are flush with each other.

Moreover, in the present embodiment, the flow resistance of the liquid in the main liquid chamber-side passage 421a is lower than the flow resistance of the liquid in the intermediate liquid chamber-side passage 421b. In the example shown, the channel cross-sectional area of the intermediate liquid chamber-side passage 421b is smaller than the channel cross-sectional area of the main liquid chamber-side passage 421a. Additionally, the opening area of the connection hole 421c is smaller than the channel cross-sectional area of the intermediate liquid chamber-side passage 421b.

Here, the respective flow resistances of the intermediate liquid chamber-side passage 421b and the second communication hole 433b may be equal to each other or may be different from each other. For example, in a case where the flow resistance of the intermediate liquid chamber-side passage 421b is higher than the flow resistance of the second communication hole 433b, the flow resistance of the liquid when passing through the second communication hole 433b and entering the intermediate liquid chamber-side passage 421b is increased, and a high damping force is generated when a rebound load for causing the liquid to flow from the auxiliary liquid chamber 416 toward the main liquid chamber 415 side is input.

Additionally, the respective flow resistances of the connection hole 421c and the intermediate liquid chamber-side passage 421b may be equal to each other or may be different from each other. For example, in a case where the flow resistance of the connection hole 421c is higher than the flow resistance of the intermediate liquid chamber-side passage 421b, the flow resistance of the liquid when passing through the intermediate liquid chamber-side passage 421b and entering the connection hole 421c is increased, and a high damping force is generated when the rebound load is input.

Additionally, the respective flow resistances of the main liquid chamber-side passage 421a and the connection hole 421c may be equal to each other or may be different from each other. For example, in a case where the flow resistance of the main liquid chamber-side passage 421a is higher than the flow resistance of the connection hole 421c, the flow resistance of the liquid when passing through the connection hole 421c and entering the main liquid chamber-side passage 421a is increased, and a high damping force is generated when the rebound load is input.

Additionally, the respective flow resistances of the first communication hole 423b and the main liquid chamber-side passage 421a may be equal to each other or may be different from each other. For example, in a case where the flow resistance of the first communication hole 423b is higher than the flow resistance of the main liquid chamber-side passage 421a, the flow resistance of the liquid when passing through the main liquid chamber-side passage 421a and entering the first communication hole 423b is increased, and a high damping force is generated when the rebound load is input.

Here, in the present embodiment, the main liquid chamber 415 is located on the main liquid chamber-side passage 421a side where the flow resistance of the liquid is low out of the main liquid chamber-side passage 421a and the intermediate liquid chamber-side passage 421b in the flow direction of the liquid in the first orifice passage 421. Also, in the present embodiment, the first sandwiching part 427, which protrudes longer inward in the radial direction than the second sandwiching part 429, supports the membrane 437 from the main liquid chamber 415 side, and the second sandwiching part 429 supports the membrane 437 from the intermediate liquid chamber 435 side.

The second sandwiching part 429 is formed integrally with the outer flange part 424 and protrudes inward in the radial direction from the outer flange part 424. An upper end opening edge of the peripheral wall part of the lower member 433 abuts against a lower surface of the second sandwiching part 429. An upper surface of the second sandwiching part 429 is located below an upper surface of the outer flange part 424. In addition, a lower annular groove, which continuously extends over the entire circumference, is formed at an outer peripheral edge in the upper surface of the second sandwiching part 429.

Here, the membrane 437 includes a disk-shaped body part 437b, and an outer peripheral edge 437a that is formed to be thinner than the body part 437b, protrudes outward in the radial direction from an upper part of the body part 437b, and continuously extends over the entire circumference. Here, the portion of the body part 437b of the membrane 437 located below the outer peripheral edge 437a is inserted into the second sandwiching part 429. A radial gap is provided between an outer peripheral surface (hereinafter, referred to as the outer peripheral surface 437c of the body part 437b of the membrane 437) of the portion of the body part 437b of the membrane 437 located below the outer peripheral edge 437a, and an inner peripheral surface of the second sandwiching part 429. The inner peripheral surface of the second sandwiching part 429 and the outer peripheral surface 437c of the body part 437b of the membrane 437 extend in the axial direction, respectively. The inner peripheral surface of the second sandwiching part 429 and the outer peripheral surface 437c of the body part 437b of the membrane 437 are substantially parallel to each other. In addition, the inner peripheral surface of the second sandwiching part 438 and the outer peripheral surface 437c of the body part 437b of the membrane 437 may be inclined with respect to each other.

An outer peripheral part of the first sandwiching part 427 is disposed on the upper surface of the outer flange part 424 and the inner peripheral part thereof supports the upper surface of the membrane 437. An upper annular groove, which continuously extends over the entire circumference, is formed at an outer peripheral edge in a lower surface of an inner peripheral part of the first sandwiching part 427. The upper annular groove faces a lower annular groove of the second sandwiching part 429 in the axial direction. The locking projections of the outer peripheral edge 437a of the membrane 437 are separately locked to the upper annular groove and the lower annular groove.

The portion of the first sandwiching part 427 located radially inside the second sandwiching part 429 supports an outer peripheral part in an upper surface of the body part 437b of the membrane 437. A lower surface of an inner peripheral edge (hereinafter, referred to as an inner peripheral edge of the first sandwiching part 427) of the inner peripheral part of the first sandwiching part 427, which abuts against the membrane 437, is gradually inclined upward so as to be separated from the intermediate liquid chamber 435 inward in the radial direction. In the example shown, the lower surface of the inner peripheral edge of the first sandwiching part 427 is formed in a curved surface shape that projects toward the intermediate liquid chamber 435 side. The membrane 437 abuts against the entire upper surface of the second sandwiching part 429. In addition, the lower surface of the inner peripheral edge of the first sandwiching part 427 may be a flat surface that extends in the direction orthogonal to the central axis O. The membrane 437 may abut against the entire lower surface of the first sandwiching part 427.

As described above, according to the vibration-damping device 43 related to the present embodiment, the first sandwiching part 427, which protrudes longer inward in the radial direction than the second sandwiching part 429, supports the membrane 437 from the main liquid chamber 415 side. Thus, when the same pressing force is applied, the amount of swelling deformation of the membrane 437 toward the main liquid chamber 415 side is smaller than that toward the intermediate liquid chamber 435 side. That is, if the rebound load is input to the vibration-damping device 43, the swelling deformation of the membrane 437 toward the main liquid chamber 415 side is restrained by the first sandwiching part 427, the negative pressure of the main liquid chamber 415 is not easily relieved, and the damping force to be generated becomes high. On the other hand, if the bound load is input to the vibration-damping device 43, the swelling deformation of the membrane 437 toward the intermediate liquid chamber 435 side becomes larger than the swelling deformation of the membrane toward the main liquid chamber 415 side when the rebound load is input to such an extent that the second sandwiching part 429 does not protrude inward in the radial direction from the first sandwiching part 427, and the damping force to be generated can be suppressed to be low. That is, the first sandwiching part 427 and the second sandwiching part 429 of the present embodiment are damping force difference increasing parts that restrain the swelling deformation of the membrane 437 toward the intermediate liquid chamber (opposite liquid chamber) 435 side out of the swelling deformation of the membrane toward the main liquid chamber 415 side and the swelling deformation of the membrane toward the intermediate liquid chamber (opposite liquid chamber) 435 side and increases a difference between the damping force generated when the bound load is input and the damping force generated when the rebound load is input.

Additionally, the flow resistance of the liquid in the main liquid chamber-side passage 421a is lower than the flow resistance of the liquid in the intermediate liquid chamber-side passage 421b. Thus, when the rebound load is input and when the liquid of the auxiliary liquid chamber 416 flows into the intermediate liquid chamber-side passage 421b after flowing into the intermediate liquid chamber 435 through the second orifice passage 422, a larger resistance is applied compared to a case where the liquid directly flows into the main liquid chamber-side passage 421a. As a result, a high damping force can be generated when the rebound load is input. On the other hand, when the liquid of the main liquid chamber 415 flows through the first orifice passage 421 toward the auxiliary liquid chamber 416, even if the flow resistance is different between the main liquid chamber-side passage 421a and the intermediate liquid chamber-side passage 421b, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Additionally, the lower surface of the inner peripheral edge of the first sandwiching part 427, which abuts against the membrane 437, is gradually inclined so as to be separated from the intermediate liquid chamber 435 inward in the radial direction. Thus, when the rebound load is input and when the membrane 437 is swelled and deformed toward the main liquid chamber 415 side, the membrane 437 can easily come into surface contact with the inner peripheral edge of the first sandwiching part 427, the generation of abnormal noise can be suppressed, and the durability of the membrane 437 can be secured.

Additionally, the radial gap is provided between the outer peripheral surface 437*c* of the body part 437*b* of the membrane 437 and the inner peripheral surface of the second sandwiching part 429. Thus, even with vibration of a relatively small amplitude, when the bound load is input, it is possible to smoothly swell and deform the membrane 437 toward the intermediate liquid chamber 435 side, and the damping force to be generated can be reliably suppressed to be low. Additionally, when the membrane 437 tends to be excessively largely swelled and deformed toward the intermediate liquid chamber 435 side at the time of the input of the bound load, the outer peripheral surface 437*c* of the body part 437*b* can be made to abut against the inner peripheral surface of the second sandwiching part 429, and a large load can be prevented from being applied to the connection portion between the outer peripheral edge 437*a* and the body part 437*b* in the membrane 437.

Additionally, since the cross-sectional area of the intermediate liquid chamber 435 is larger than the channel cross-sectional area of the intermediate liquid chamber-side passage 421*b* of the first orifice passage 421, it is possible to reliably increase the resistance generated when the liquid of the intermediate liquid chamber 435 flows into the intermediate liquid chamber-side passage 421*b*, and the damping force generated when the rebound load is input can be reliably increased. Additionally, since the intermediate liquid chamber-side passage 421*b* of the first orifice passage 421 is a passage having a longer channel length than a channel diameter, the resistance applied to the liquid from the auxiliary liquid chamber 416 side that flows into this passage can be increased, and the damping force generated when the rebound load is input can be much more reliably increased.

Eighth Embodiment

Figure 15:
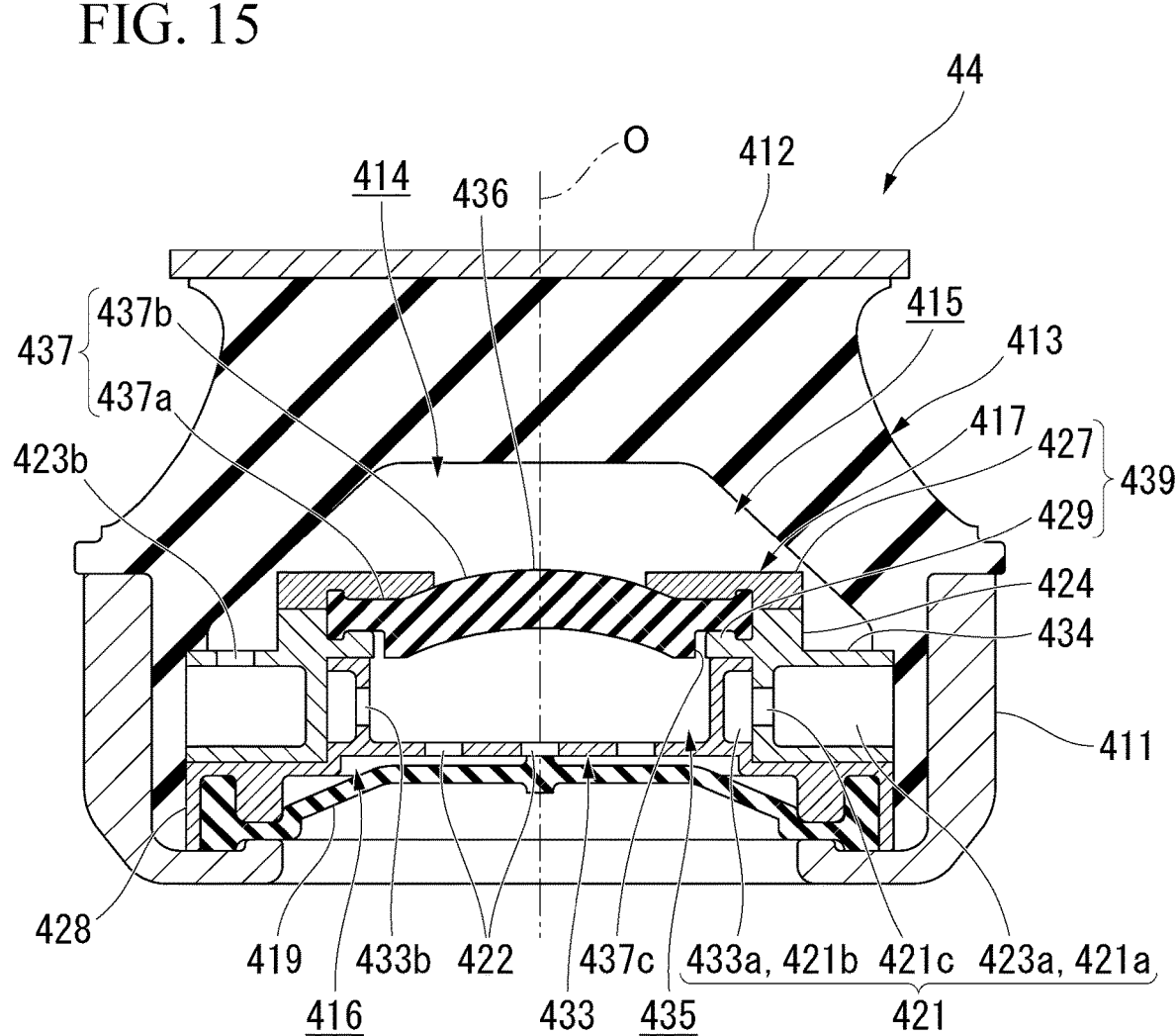
FIG. 15 is a longitudinal sectional view of a vibration-damping device related to an eighth embodiment of the invention.
Figure 16:
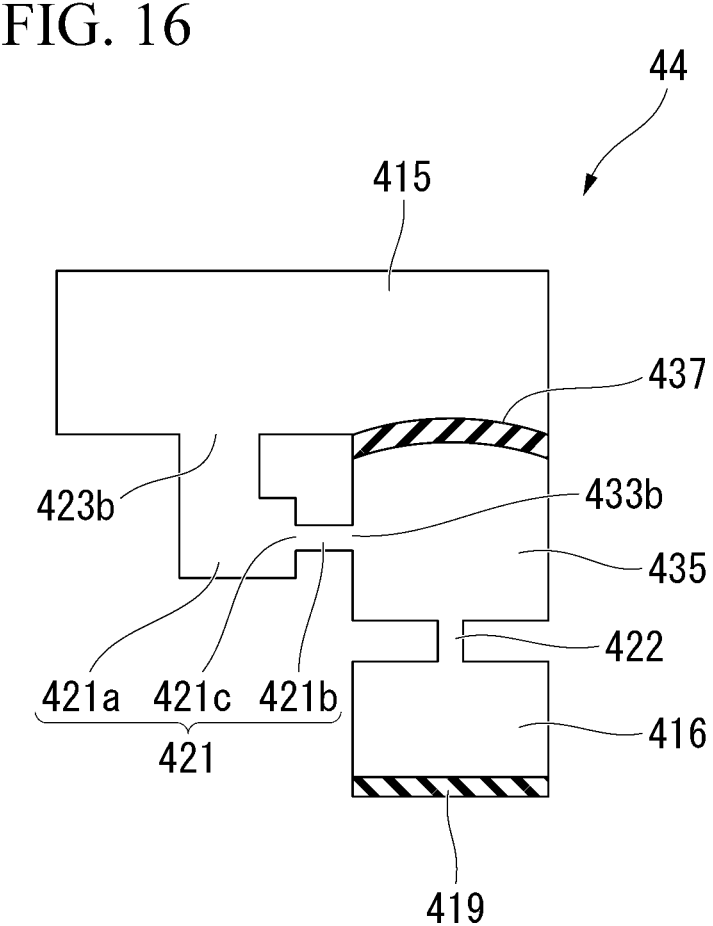
FIG. 16 is a schematic view of the vibration-damping device shown in FIG. 15.

Next, a vibration-damping device 44 related to an eighth embodiment of the invention will be described, referring to FIGS. 15 and 16. In addition, in the eighth embodiment, the same portions as the constituent elements in the above-described seventh embodiment will be designated by the same reference signs, and a description thereof will be omitted, and only different points will be described.

Also, in the present embodiment, an uneven swelling part 436 is formed so as to make the swelling deformation of the membrane toward the intermediate liquid chamber 435 side larger than the swelling deformation of the membrane toward the main liquid chamber 415 side when the same pressing force is applied to the membrane 437. In the example shown, the uneven swelling part 436 is curved so as to project toward the main liquid chamber 415 side.

The upper surface of the membrane 437 abuts against the lower surface of the inner peripheral edge (hereinafter referred to as the inner peripheral edge of the first sandwiching part 427) of the inner peripheral part of the first sandwiching part 427. The uneven swelling part 436 of the membrane 437 overhangs to the inside of the first sandwiching part 427. Respective axial positions of an upper end part in an upper surface of the uneven swelling part 436 and an upper surface of the first sandwiching part 427 are the same as each other. The upper surface of the membrane 437 is in non-contact with an inner peripheral surface of the inner peripheral part of the first sandwiching part 427. The membrane 437 abuts against the entire lower surface of the inner peripheral part of the first sandwiching part 427, and the entire upper surface of the second sandwiching part 429. In addition, the upper surface of the membrane 437 may be spaced apart downward from the lower surface of the inner peripheral edge of the first sandwiching part 427. The uneven swelling part 436 of the membrane 437 may be located below the inner peripheral surface of the inner peripheral part of the first sandwiching part 427. The upper surface of the membrane 437 may be brought into contact with the inner peripheral surface of the inner peripheral part of the first sandwiching part 427.

As described above, according to the vibration-damping device 44 related to the present embodiment, the uneven swelling part 436 is formed in the membrane 437. Thus, when the same pressing force is applied, the amount of swelling deformation of the membrane 437 toward the intermediate liquid chamber 435 side is larger than that toward the main liquid chamber 415 side. Hence, if the bound load is input to the vibration-damping device 44, the damping force to be generated can be suppressed to be low as the membrane 437 is largely swelled and deformed toward the intermediate liquid chamber 435 side by the uneven swelling part 436. On the other hand, if the rebound load is input to the vibration-damping device 44, the swelling deformation of the membrane 437 toward the main liquid chamber 415 side becomes smaller than the swelling deformation of the membrane toward the intermediate liquid chamber 435 side when the bound load is input, the negative pressure of the main liquid chamber 415 is not easily relieved, and the damping force to be generated becomes high. As described above, the ratio of the damping force generated when the rebound load is input to the damping force generated when the bound load is input can be reliably increased. That is, the uneven swelling part 436 of the present embodiment is a damping force difference increasing part that restrains the swelling deformation of the membrane 437 toward the main liquid chamber 415 side out of the swelling deformation of the membrane toward the main liquid chamber 415 side and the swelling deformation of the membrane toward the intermediate liquid chamber (opposite liquid chamber) 435 side and that increases a difference between the damping force generated when the bound load is input and the damping force generated when the rebound load is input.

Additionally, since the uneven swelling part 436 is curved so as to project toward the main liquid chamber 415 side, a configuration in which the swelling deformation of the membrane toward the intermediate liquid chamber 435 side is larger than the swelling deformation of the membrane toward the main liquid chamber 415 side when the same pressing force is applied to the membrane 437 can be easily and reliably realized. Additionally, since the uneven swelling part 436 overhangs to the inside of the first sandwiching part 427, a configuration in which the swelling deformation of the membrane 437 toward the intermediate liquid chamber 435 side is made larger than the swelling deformation of the membrane 437 toward the main liquid chamber 415 side when the same pressing force is applied can be much more reliably realized.

Additionally, the uneven swelling part 436 is integrally formed over the entire body part 437b, which is located radially inside the outer peripheral edge 437a sandwiched in the axial direction by the sandwiching member 439, in the membrane 437. Thus, it is possible to largely swell and deform the membrane 437 toward the intermediate liquid chamber 435 side, and the damping force generated when the bound load is input and the damping force generated when the rebound load is input can be made greatly different from each other. Additionally, the membrane 437 abuts against the inner peripheral edge of the first sandwiching part 427. Thus, when the rebound load is input, it is possible to inhibit the membrane 437 from colliding against the inner peripheral edge of the first sandwiching part 427, and the generation of abnormal noise can be reliably suppressed. Additionally, the membrane 437 abuts against the inner peripheral edge of the first sandwiching part 427. Thus, even with vibration of a relatively small amplitude, a high damping force can be generated when the rebound load is input.

Ninth Embodiment

Figure 17:
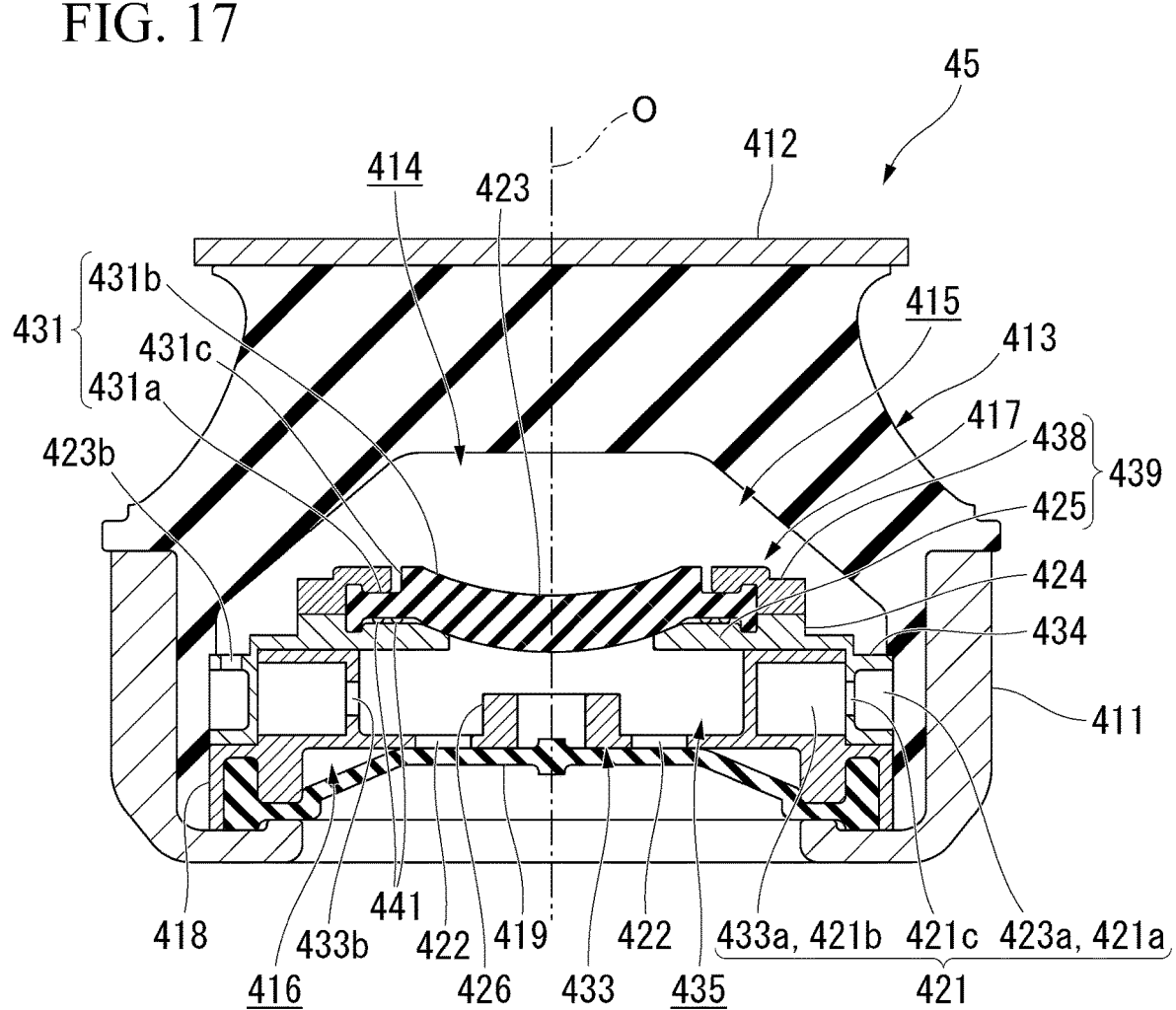
FIG. 17 is a longitudinal sectional view of a vibration-damping device related to a ninth embodiment of the invention.

Next, a vibration-damping device 45 related to a ninth embodiment of the invention will be described, referring to FIG. 17. In addition, in the ninth embodiment, the same portions as the constituent elements in the above-described sixth embodiment will be designated by the same reference signs, and a description thereof will be omitted, and only different points will be described.

In the present embodiment, at least one of the first sandwiching part 425 and the outer peripheral edge 431a of the membrane 431 is provided with a plurality of support projections 441 that protrude toward and abuts against the other. In the example shown, the support projections 441 are formed on a lower surface of the outer peripheral edge 431a of the membrane 431. The support projections 441 is formed in a portion, which is capable of being spaced apart upward from the upper surface of the first sandwiching part 425 when a load is input to the vibration-damping device 45 and the membrane 431 is deformed or displaced toward the main liquid chamber 415 side, in the lower surface of the membrane 431 abutting against the upper surface of the first sandwiching part 425. The support projections 441 are formed in a curved surface shape that projects downward. The plurality of support projections 441 are disposed at regular intervals in the radial direction and the circumferential direction in the membrane 431.

Figure 18:
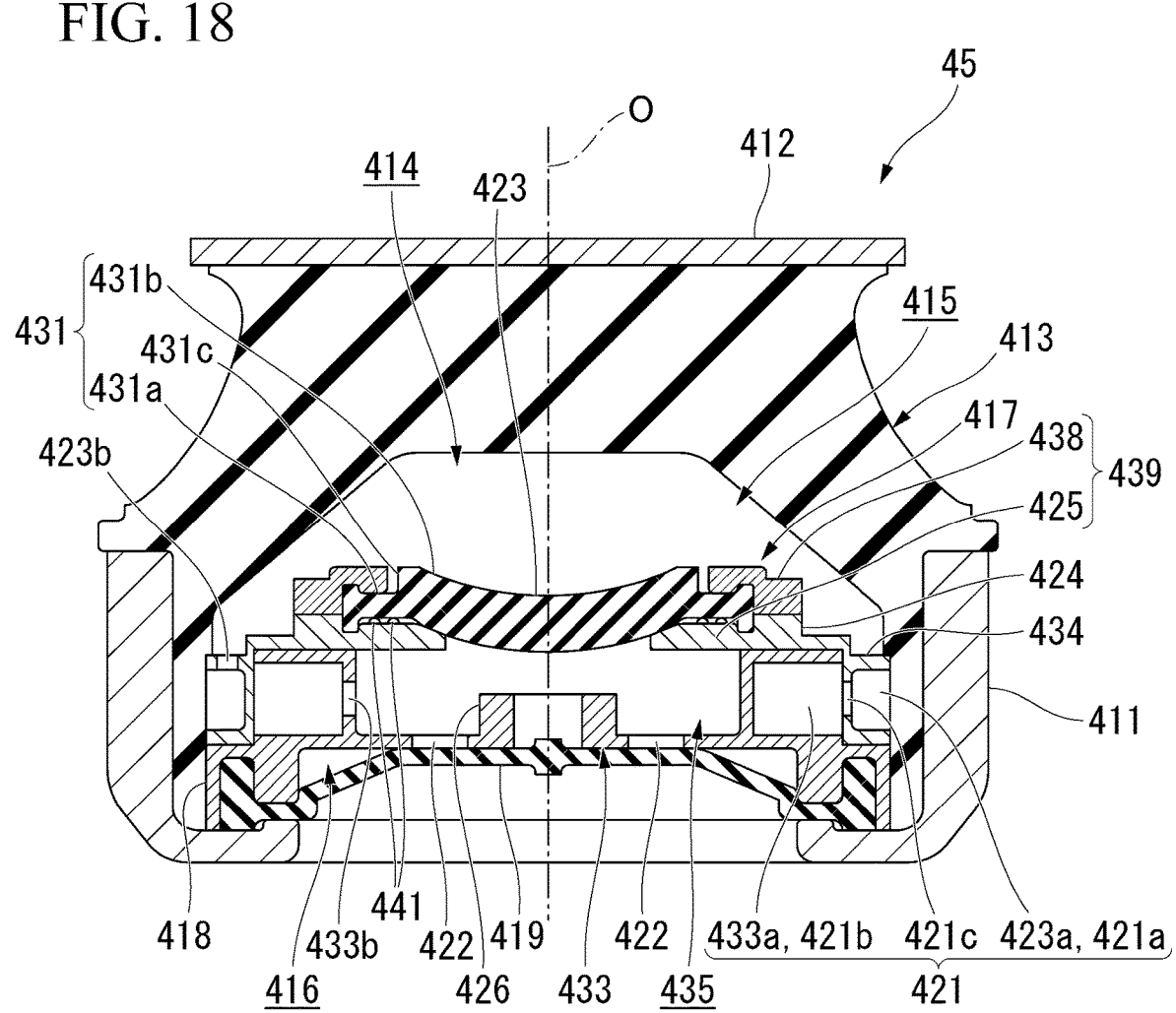
FIG. 18 is a longitudinal sectional view showing a modification example of the vibration-damping device related to the ninth embodiment of the invention.

In addition, as shown in FIG. 18, the support projections 441 may be formed on the upper surface of the first sandwiching part 425. Additionally, the support projections 441 may be formed in a portion where the lower surface of the membrane 431 is capable of being spaced apart upward when a load is input to the vibration-damping device 45 in the upper surface of the first sandwiching part 425 abutting against the lower surface of the membrane 431 and the membrane 431 is deformed and displaced toward the main liquid chamber 415 side. Additionally, the support projections 441 may be formed on both the first sandwiching part 425 and the outer peripheral edge 431a of the membrane 431.

As described above, according to the vibration-damping device 45 related to the present embodiment, at least one of the first sandwiching part 425 and the outer peripheral edge 431a of the membrane 431 is formed with the plurality of support projections 441 that protrude toward and abuts against the other. Thus, when a load is input to the vibration-damping device 45 and the membrane 431 is deformed or displaced toward the intermediate liquid chamber 435 side, it is possible to inhibit the outer peripheral edge 431a of the membrane 431 from colliding against the first sandwiching part 425 all at once over a wide range, and the striking sound to be generated can be suppressed to be small.

The vibration-damping devices 41 to 45 related to the fifth to ninth embodiments described above include the tubular first attachment member 411 that is coupled to one of the vibration generating part and the vibration receiving part, the second attachment member 412 that is coupled to the other thereof, the elastic body 413 that couples the first attachment member 411 and the second attachment member 412 to each other, and the partition member 417 that partitions the liquid chamber within the first attachment member 411 into the main liquid chamber 415 having the elastic body 413 in a portion of a barrier wall thereof, and the auxiliary liquid chamber 416, and the partition member 417 includes the membrane 431 or 437 that forms a portion of the barrier wall of the main liquid chamber 415, the first orifice passage 421 that allows the main liquid chamber 415 and the opposite liquid chamber, which is located opposite to the main liquid chamber 415 with the membrane 431 or 437 therebetween and has the membrane 431 or 437 in a portion of the barrier wall thereof, to communicate with each other and in which the flow resistance of the liquid in the opposite liquid chamber-side passage located on the opposite liquid chamber side is different from the flow resistance of the liquid in the main liquid chamber-side passage 421a located on the main liquid chamber 415 side, and the damping force difference increasing part that restrains any one of the swelling deformation of the membrane 431 or 437 toward the main liquid chamber 415 side and the swelling deformation of the membrane 431 or 437 toward the opposite liquid chamber side and increases a difference between the damping force generated when the bound load is input and the damping force generated when the rebound load is input.

As a result, since the vibration-damping devices 41 to 45 include the damping force difference increasing part, any one of the swelling deformation of the membrane 431 or 437 toward the main liquid chamber 415 side and the swelling deformation of the membrane 431 or 437 toward the opposite liquid chamber is restrained, and the difference between the damping force generated when the bound load is input and the damping force generated when the rebound load is input is increased.

Here, the partition member 417 may further include the intermediate liquid chamber 435 that is the opposite liquid chamber, and the second orifice passage 422 that allows the intermediate liquid chamber 435 and the auxiliary liquid chamber 416 to communicate with each other, the first orifice passage 421 may include the main liquid chamber-side passage 421a, and the intermediate liquid chamber-side passage 421b that is located on the intermediate liquid chamber 435 side as the opposite liquid chamber-side passage, the flow resistance of the liquid in any one passage of the main liquid chamber-side passage 421a and the intermediate liquid chamber-side passage 421b may be lower than the flow resistance of the liquid in the other passage, the damping force difference increasing part may include the sandwiching member 439 that sandwiches the outer peripheral edge 431a or 437a of the membrane 431 or 437 from both directions of the main liquid chamber 415 side and the intermediate liquid chamber 435 side, and the sandwiching member 439 may include the first sandwiching part 425 or 427 that supports the membrane 431 or 437 from one liquid chamber side, which is located on the one passage side in the flow direction of the liquid in the first orifice passage 421, out of the main liquid chamber 415 and the intermediate liquid chamber 435, and the second sandwiching part 438 or 429 that supports the membrane 431 or 437 from the second liquid chamber side located on the second passage side in the flow direction of the liquid in the first orifice passage, and the first sandwiching part 425 or 427 may protrude longer inward in the radial direction than the second sandwiching part 438 or 429.

In this case, the first sandwiching part 425 or 427, which protrudes long inward in the radial direction, out of the first sandwiching part 425 or 427 and the second sandwiching part 438 or 429 supports the membrane 431 or 437 from one liquid chamber side, and the second sandwiching part 438 or 429 supports the membrane 431 or 437 from the second liquid chamber side. Thus, when the same pressing force is applied, the amount of swelling deformation of the membrane 431 or 437 toward the one liquid chamber side is smaller than that toward the second liquid chamber side. Specifically, in a case where the flow resistance of the liquid in the intermediate liquid chamber-side passage 421*b* in the first orifice passage 421 that allows the main liquid chamber 415 and the intermediate liquid chamber 435 to communicate with each other is lower than the flow resistance of the liquid in the main liquid chamber-side passage 421*a*, the first sandwiching part 425, which protrudes longer inward in the radial direction than the second sandwiching part 438, supports the membrane 431 from the intermediate liquid chamber 435 side. Thus, when the same pressing force is applied, the amount of swelling deformation of the membrane 431 toward the intermediate liquid chamber 435 side is smaller than that toward the main liquid chamber 415 side. That is, if the bound load is input to the vibration-damping device 41, 42, or 45, the swelling deformation of the membrane 431 toward the intermediate liquid chamber 435 side is restrained by the first sandwiching part 425, the positive pressure of the main liquid chamber 415 is not easily relieved, and the damping force to be generated becomes high. On the other hand, if the rebound load is input to the vibration-damping device 41, 42, or 45, the swelling deformation of the membrane 431 toward the main liquid chamber 415 side becomes larger than the swelling deformation of the membrane toward the intermediate liquid chamber 435 side when the bound load is input to such an extent that the second sandwiching part 438 does not protrude inward in the radial direction from the first sandwiching part 425, and the damping force to be generated can be suppressed to be low. Additionally, as mentioned above, in a case where the flow resistance of the liquid in the intermediate liquid chamber-side passage 421*b* is lower than the flow resistance of the liquid in the main liquid chamber-side passage 421*a*, when the bound load is input and when the liquid of the main liquid chamber 415 flows into the main liquid chamber-side passage 421*a*, a larger resistance is applied compared to a case where the liquid directly flows into the intermediate liquid chamber-side passage 421*b*. As a result, a high damping force can be generated when the bound load is input. On the other hand, when the liquid on the auxiliary liquid chamber 416 side flows through the first orifice passage 421 toward the main liquid chamber 415, even if the flow resistance is different between the main liquid chamber-side passage 421*a* and the intermediate liquid chamber-side passage 421*b*, both the passages constitute one orifice passage continuously with each other. Thus, it is possible to suppress the resistance generated when the liquid passes through a boundary portion therebetween, and the damping force generated when the rebound load is input can be suppressed to be low. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased. Moreover, as mentioned above, the swelling deformation of the membrane 431 is more easily swelled and deformed toward the main liquid chamber 415 side than toward the intermediate liquid chamber 435 side. Thus, even if the main liquid chamber 415 tends to have a negative pressure suddenly with the input of a large rebound load, the membrane 431 is swelled and deformed toward the main liquid chamber 415 side, and thereby, it is possible to suppress the negative pressure of the main liquid chamber 415, and the occurrence of cavitation can also be suppressed.

Contrary to the above, in a case where the flow resistance of the liquid in the main liquid chamber-side passage 421*a* is lower than the flow resistance of the liquid in the intermediate liquid chamber-side passage 421*b*, the first sandwiching part 427, which protrudes longer inward in the radial direction than the second sandwiching part 429, supports the membrane 437 from the main liquid chamber 415 side. Thus, when the same pressing force is applied, the amount of swelling deformation of the membrane 437 toward the main liquid chamber 415 side is smaller than that toward the intermediate liquid chamber 435 side. That is, if the rebound load is input to the vibration-damping device 43 or 44, the swelling deformation of the membrane 437 toward the main liquid chamber 415 side is restrained by the first sandwiching part 427, the negative pressure of the main liquid chamber 415 is not easily relieved, and the damping force to be generated becomes high. On the other hand, if the bound load is input to the vibration-damping device 43 or 44, the swelling deformation of the membrane 437 toward the intermediate liquid chamber 435 side becomes larger than the swelling deformation of the membrane toward the main liquid chamber 415 side when the rebound load is input to such an extent that the second sandwiching part 429 does not protrude inward in the radial direction from the first sandwiching part 427, and the damping force to be generated can be suppressed to be low. Additionally, as mentioned above, in a case where the flow resistance of the liquid in the main liquid chamber-side passage 421*a* is lower than the flow resistance of the liquid in the intermediate liquid chamber-side passage 421*b*, when the rebound load is input and when the liquid of the auxiliary liquid chamber 416 flows into the intermediate liquid chamber-side passage 421*b* after flowing into the intermediate liquid chamber 435 through the second orifice passage 422, a larger resistance is applied compared to a case where the liquid directly flows into the main liquid chamber-side passage 421*a*. As a result, a high damping force can be generated when the rebound load is input. On the other hand, when the liquid of the main liquid chamber 415 flows through the first orifice passage 421 toward the auxiliary liquid chamber 416, even if the flow resistance is different between the main liquid chamber-side passage 421*a* and the intermediate liquid chamber-side passage 421*b*, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Additionally, the aforementioned respective functions and effects are achieved by a configuration in which the flow resistance of the liquid in the intermediate liquid chamber-side passage 421b and the flow resistance of the liquid in the main liquid chamber-side passage 421a are different from each other and the membrane 431 or 437 constitutes portions of both the barrier walls of both the main liquid chamber 415 and intermediate liquid chamber 435, the sandwiching member 439 includes the first sandwiching part 425 or 427 and the second sandwiching part 438 or 429, as mentioned above, without adopting, for example, members that operate when the liquid pressure within the main liquid chamber 415 reaches a predetermined value. Therefore, the aforementioned functions and effects can be stably and accurately achieved even with vibration of a relatively small amplitude.

Here, the portion of the inner peripheral edge of the first sandwiching part 425 or 427, which abuts against the membrane 431 or 437, may be gradually inclined so as to be spaced away from the second liquid chamber as going inward in the radial direction.

In this case, the portion of the inner peripheral edge of the first sandwiching part 425 or 427, which abuts against the membrane 431 or 437, is gradually inclined so as to be spaced away from the second liquid chamber as going inward in the radial direction. Thus, when the vibration is input and when the membrane 431 or 437 is swelled and deformed toward the one liquid chamber side, the membrane 431 or 437 can easily come into surface contact with the inner peripheral edge of the first sandwiching part 425 or 427, the generation of abnormal noise can be suppressed, and the durability of the membrane 431 or 437 can be secured.

Here, the membrane 431 or 437 may abut against the inner peripheral edge of the first sandwiching part 425 or 427. In this case, the membrane 431 or 437 abuts against the inner peripheral edge of the first sandwiching part 425 or 427. Thus, when the vibration is input, it is possible to inhibit the membrane 431 or 437 from colliding against the inner peripheral edge of the first sandwiching part 425 or 427, and the generation of abnormal noise can be reliably suppressed. Additionally, the membrane 431 or 437 abuts against the inner peripheral edge of the first sandwiching part 425 or 427. Thus, even with vibration of a relatively small amplitude, a high damping force can be generated when the load that swells and deforms the membrane 431 or 437 is input toward the one liquid chamber side.

Here, the membrane 431 or 437 may include the outer peripheral edge 431a or 437a that is sandwiched by the sandwiching member 439, and the body part 431b or 437b that is located radially inside the outer peripheral edge 431a or 437a and is formed to be thick, and a gap may be provided in the radial direction between an outer peripheral surface of the portion of the body part 431b or 437b located closer to the second liquid chamber side than the outer peripheral edge 431a or 437a, and an inner peripheral surface of the second sandwiching part 438 or 429.

In this case, the radial gap is provided between the outer peripheral surface of the body part 431b or 437b of the membrane 431 or 437 and the inner peripheral surface of the second sandwiching part 438 or 429. Thus, even with vibration of a relatively small amplitude, it is possible to smoothly swell and deform the membrane 431 or 437 toward the second liquid chamber side, and the damping force to be generated can be reliably suppressed to be low. Additionally, when the membrane 431 or 437 tends to be excessively largely swelled and deformed toward the second liquid chamber side, the outer peripheral surface of the body part 431b or 437b can be made to abut against the inner peripheral surface of the second sandwiching part 438 or 429, and a large load can be prevented from being applied to the connection portion between the outer peripheral edge 431a or 437a and the body part 431b or 437b in the membrane 431 or 437.

Here, the damping force difference increasing part may further include the uneven swelling part 423 or 436 that is formed in the membrane 431 or 437 and makes the swelling deformation of the membrane toward the second liquid chamber side larger than the swelling deformation of the membrane toward the one liquid chamber side when the same pressing force is applied to the membrane 431 or 437.

In this case, the uneven swelling part 423 or 436 is formed in the membrane 431 or 437. Thus, in combination with the sandwiching member 439 having the first sandwiching part 425 or 427 and the second sandwiching part 438 or 419, it is possible to make the swelling deformation of the membrane 431 or 437 toward the one liquid chamber side smaller than the swelling deformation of the membrane 431 or 437 toward the second liquid chamber side when the same pressing force is applied can be much more reliably realized, and the damping force generated when the bound load is input and the damping force generated when the rebound load is input can be made greatly different from each other. Specifically, in a case where the flow resistance of the liquid in the intermediate liquid chamber-side passage 421b is lower than the flow resistance of the liquid in the main liquid chamber-side passage 421a, when the same pressing force is applied, the amount of swelling deformation of the membrane 431 toward the main liquid chamber 415 side is larger than that toward the intermediate liquid chamber 435 side. Hence, if the rebound load is input to the vibration-damping device 42 or 45, the damping force to be generated can be suppressed to be low as the membrane 431 is largely swelled and deformed toward the main liquid chamber 415 side by the uneven swelling part 423. On the other hand, if the bound load is input to the vibration-damping device 42 or 45, the swelling deformation of the membrane 431 toward the intermediate liquid chamber 435 side becomes smaller than the swelling deformation of the membrane toward the main liquid chamber 415 side when the rebound load is input, the positive pressure of the main liquid chamber 415 is not easily relieved, and the damping force to be generated becomes high. Contrary to the above, in a case where the flow resistance of the liquid in the main liquid chamber-side passage 421a is lower than the flow resistance of the liquid in the intermediate liquid chamber-side passage 421b, when the same pressing force is applied, the amount of swelling deformation of the membrane 437 toward the intermediate liquid chamber 435 side is larger than that toward the main liquid chamber 415 side. Hence, if the bound load is input to the vibration-damping device 44, the damping force to be generated can be suppressed to be low as the membrane 437 is largely swelled and deformed toward the intermediate liquid chamber 435 side by the uneven swelling part 436. On the other hand, if the rebound load is input to the vibration-damping device 44, the swelling deformation of the membrane 437 toward the main liquid chamber 415 side becomes smaller than the swelling deformation of the membrane toward the intermediate liquid chamber 435 side when the bound load is input, the negative pressure of the main liquid chamber 415 is not easily relieved, and the damping force to be generated becomes high.

Here, the uneven swelling part 423 or 436 may be formed in a curved surface shape that projects toward the one liquid chamber side.

In this case, a configuration in which the swelling deformation of the membrane 431 or 437 toward the one liquid chamber side is made larger than the swelling deformation of the membrane 431 or 437 toward the second liquid chamber side when the same pressing force is applied to the membrane 431 or 437 can be easily and reliably realized.

Here, the uneven swelling part 423 or 436 may overhang to the inside of the first sandwiching part 425 or 427.

In this case, since the uneven swelling part 423 or 436 overhangs to the inside of the first sandwiching part 425 or 427, a configuration in which the swelling deformation of the membrane 431 or 437 toward the one liquid chamber side is made larger than the swelling deformation of the membrane 431 or 437 toward the second liquid chamber side when the same pressing force is applied can be much more reliably realized.

Here, a plurality of support projections 441, which are formed in at least one of the first sandwiching part 425 or 427 and the outer peripheral edge 431a or 437a of the membrane 431 or 437 and protrude toward and abuts against the other, may be formed.

In this case, at least one of the first sandwiching part 425 or 427 and the outer peripheral edge 431a or 437a of the membrane 431 or 437 is formed with the plurality of support projections 441 that protrude toward and abuts against the other. Thus, when a load is input to the vibration-damping device 45 and the membrane 431 or 437 is deformed or displaced toward the one liquid chamber side, it is possible to inhibit the outer peripheral edge 431a or 437a of the membrane 431 or 437 from colliding against the first sandwiching part 425 or 427 all at once over a wide range, and the striking sound to be generated can be suppressed to be small.

In addition, the technical scope of the invention is not limited to the above embodiment, and various changes can be made without departing the spirit of the invention.

For example, in the above embodiment, the first orifice passage 421 extends in the circumferential direction, and the second orifice passage 422 extends in the axial direction. However, the invention is not limited to this. Additionally, in the above embodiments, the compression type vibration-damping devices 41 to 45 in which the positive pressure acts on the main liquid chamber 415 as the support load acts have been described. However, it is also applicable to a hanging-type vibration-damping device that is attached such that the main liquid chamber 415 is located on the lower side in a vertical direction and the auxiliary liquid chamber 416 is located on the upper side in the vertical direction and the negative pressure acts on the main liquid chamber 415 as the support load acts. Additionally, the vibration-damping devices 41 to 45 related to the invention are not limited to engine mounts of vehicles and is also applicable to those other than the engine mounts. For example, the vibration-damping device is also applicable to mounts of power generators loaded on construction machines or is also applicable to mounts of machines installed in factories or the like.

In addition, it is possible to appropriately substitute the constituent elements in the above-described embodiments with well-known constituent elements without departing from the spirit of the invention. Additionally, the above-described modification examples may be combined appropriately.

Tenth Embodiment

Figure 19:
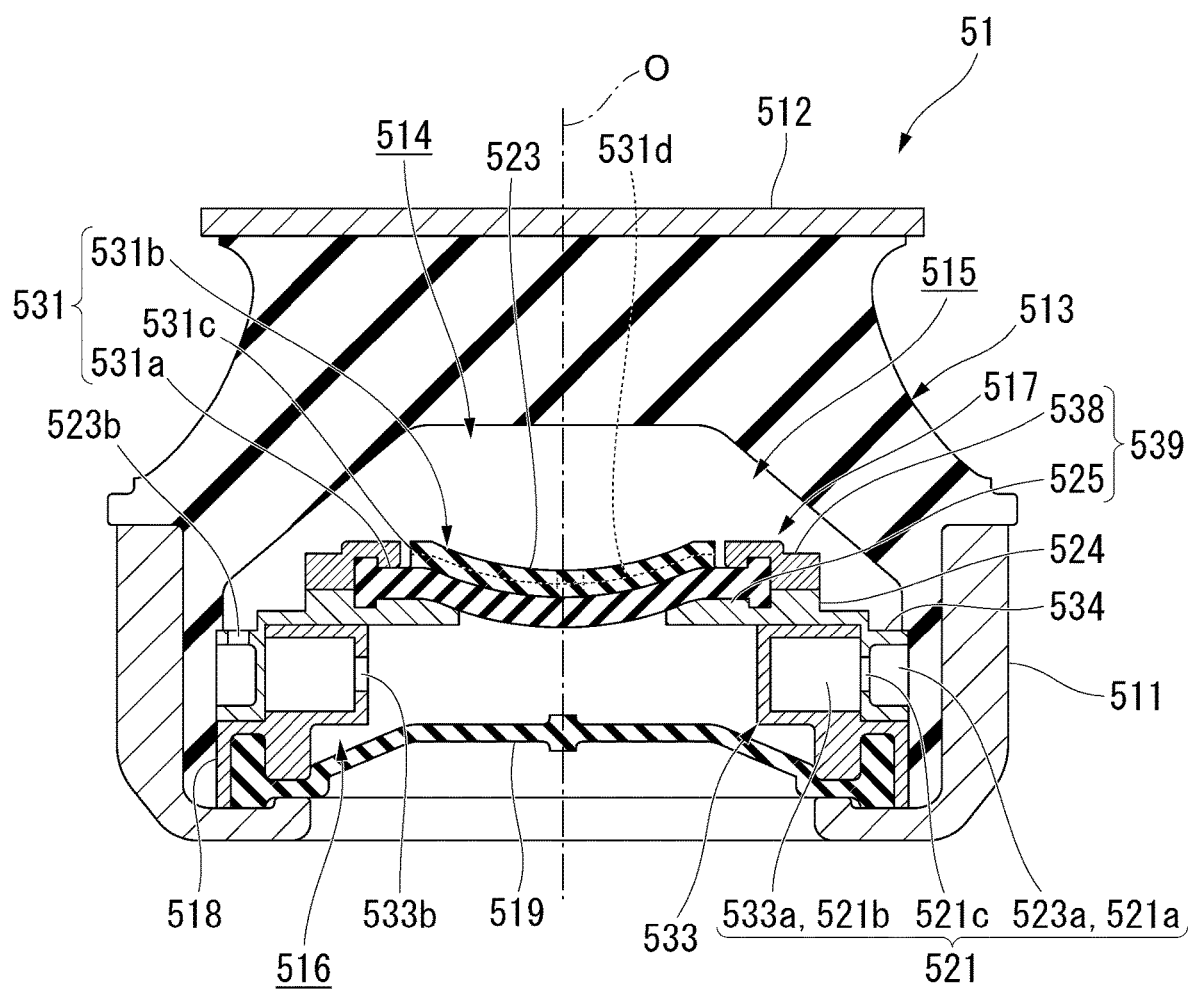
FIG. 19 is a longitudinal sectional view of a vibration-damping device related to a tenth embodiment of the invention.
Figure 20:
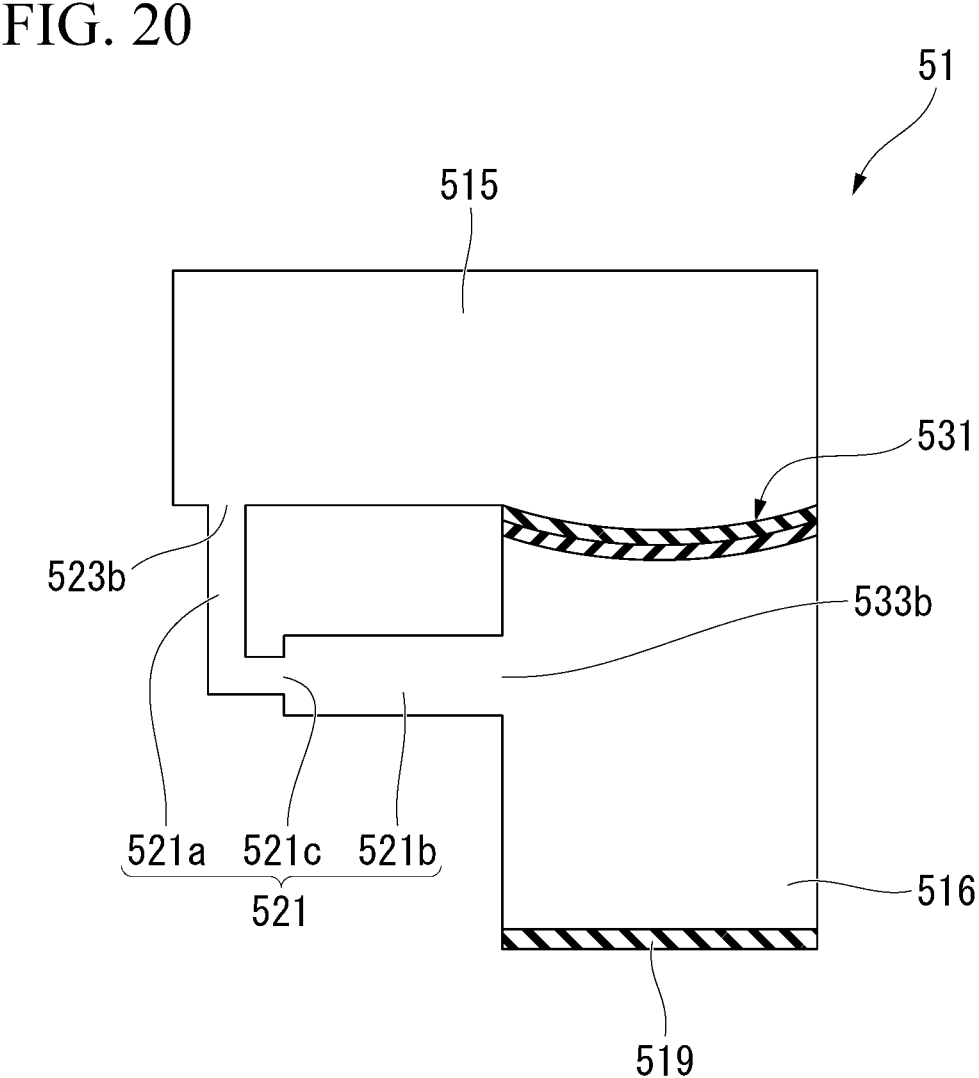
FIG. 20 is a schematic view of the vibration-damping device shown in FIG. 19.

Hereinafter, a vibration-damping device related to a tenth embodiment of the invention will be described, referring to FIGS. 19 and 20. The vibration-damping device 51 includes a tubular first attachment member 511 that is coupled to any one of a vibration generating part and a vibration receiving part, and a second attachment member 512 that is coupled to the other thereof, an elastic body 513 that couples the first attachment member 511 and the second attachment member 512 to each other, a partition member 517 that partitions a liquid chamber 514 within the first attachment member 511 into a main liquid chamber 515 and an auxiliary liquid chamber 516 having the elastic body 513 as a portion of a barrier wall. In the example shown, the partition member 517 partitions the liquid chamber 514 in an axial direction along a central axis O of the first attachment member 511. In a case where the vibration-damping device 51 is used, for example, an engine mount of an automobile, the first attachment member 511 is coupled to a vehicle body serving as the vibration receiving part, and the second attachment member 512 is coupled to an engine serving as the vibration generating part. As a result, the transmission of the vibration of the engine to the vehicle body is suppressed. In addition, the first attachment member 511 may be coupled to the vibration generating part, and the second attachment member 512 may be coupled to the vibration receiving part.

Hereinafter, the main liquid chamber 515 side in the axial direction with respect to the partition member 517 is referred to as an upper side, and the auxiliary liquid chamber 516 side is referred to as a lower side. Additionally, in a plan view of the vibration-damping device 51 as viewed from the axial direction, a direction intersecting the central axis O is referred to as a radial direction, and a direction going around the central axis O is referred to as a circumferential direction.

The first attachment member 511 is formed in a bottomed tubular shape. A bottom part of the first attachment member 511 is formed in an annular shape and is disposed coaxially with the central axis O. An inner peripheral surface of a lower part of the first attachment member 511 is covered with a covering rubber formed integrally with the elastic body 513. The second attachment member 512 is formed in a flat plate shape having front and back surfaces orthogonal to the central axis O. The second attachment member 512 is formed, for example, in a disk shape and is disposed coaxially with the central axis O. The second attachment member 512 is disposed above the first attachment member 511. The external diameter of the second attachment member 512 is equal to the internal diameter of the first attachment member 511.

The elastic body 513 couples an inner peripheral surface of an upper part of the first attachment member 511 and a lower surface of the second attachment member 512 to each other. An upper end opening part of the first attachment member 511 is sealed with the elastic body 513. The elastic body 513 is vulcanized and bonded to the first attachment member 511 and the second attachment member 512. The elastic body 513 is formed in a topped tubular shape and is disposed coaxially with the central axis O. A top wall part of the elastic body 513 is coupled to the second attachment member 512, and a lower end part in a peripheral wall part thereof is coupled to the first attachment member 511. The peripheral wall part of the elastic body 513 gradually extends outward in the radial direction from the upper side to the lower side.

A diaphragm ring 518 is liquid-tightly fitted into the lower end part of the first attachment member 511 via the covering rubber. The diaphragm ring 518 is formed in a double tubular shape and is disposed coaxially with the central axis O. An outer peripheral part of a diaphragm 519, which is formed to be elastically deformable with rubber or the like, is vulcanized and bonded to the diaphragm ring 518. An outer peripheral part of the diaphragm 519 is vulcanized and bonded to an inner peripheral surface of an outer tube portion and an outer peripheral surface of an inner tube portion in the diaphragm ring 518. The diaphragm 519 is deformed to expand and contract with the inflow and outflow of a liquid into the auxiliary liquid chamber 516. The liquid chamber 514 in which the liquid is enclosed is defined within the first attachment member 511 by the diaphragm 519 and the elastic body 513. In addition, as the liquid enclosed in the liquid chamber 514, for example, water, ethylene glycol, or the like can be used.

The partition member 517 is formed in a disk shape having front and back surfaces orthogonal to the central axis O and is fitted into the first attachment member 511 via the covering rubber. The liquid chamber 514 within the first attachment member 511 is divided into the main liquid chamber 515 defined by the elastic body 513 and the partition member 517 and the auxiliary liquid chamber 516 defined by the diaphragm 519 and the partition member 517 by the partition member 517.

The partition member 517 includes a tubular body member 534 that is fitted into the first attachment member 511 via the covering rubber, a membrane 531 that blocks an upper end opening part of the body member 534 and forms a portion of the barrier wall of the main liquid chamber 515, a tubular lower member 533 that is fitted into a lower end part of the body member 534, an annular sandwiching member 539 that fixed the membrane 531 to the body member 534, and a first orifice passage (orifice passage) 521 that extends from the main liquid chamber 515 toward the auxiliary liquid chamber 516 side.

The membrane 531 is formed in a disk shape with an elastic material, such as rubber. The membrane 531 is disposed coaxially with the central axis O. The volume of the membrane 531 is smaller than the volume of the elastic body 513. The membrane 531 includes a disk-shaped body part 531*b*, and an outer peripheral edge 531*a* that is formed to be thinner than the body part 531*b*, protrudes outward in the radial direction from a lower part of the body part 531*b*, and continuously extends over the entire circumference. Locking projections, which protrude toward both sides in the axial direction, are formed on an outer end part of the outer peripheral edge 531*a* in the radial direction.

The body member 534 is disposed coaxially with the central axis O. A first orifice groove 523*a*, which opens outward in the radial direction and extends in the circumferential direction, is formed in an outer peripheral surface of the body member 534. A radially outer opening of the first orifice groove 523*a* is blocked by the covering rubber. A first communication hole 523*b*, which allows the main liquid chamber 515 and the first orifice groove 523*a* to communicate with each other, is formed in an upper surface of the body member 534. The first communication hole 523*b* allows the main liquid chamber 515 and the first orifice groove 523*a* to communicate with each other in the axial direction. The first orifice groove 523*a* extends in the circumferential direction over an angular range exceeding 180° from the first communication hole 523*b* toward one side in the circumferential direction with the central axis O as a center.

The sandwiching member 539 sandwiches the outer peripheral edge 531*a* of the membrane 531 from both directions of the main liquid chamber 515 side and the auxiliary liquid chamber 516 side. The sandwiching member 539 includes a first sandwiching part 525 that supports a lower surface of the membrane 531, and a second sandwiching part 538 that supports an upper surface of the membrane 531. The first sandwiching part 525 and the second sandwiching part 538 are formed in an annular shape, respectively, and are disposed coaxially with the central axis O. As the outer peripheral edge 531*a* of the membrane 531 is sandwiched and fixed by the first sandwiching part 525 and the second sandwiching part 538 in the axial direction, the membrane 531 is supported to be elastically deformable in the axial direction with the outer peripheral edge 531*a* thereof as a fixed end.

The first sandwiching part 525 is coupled to the body member 534 via an outer flange part 524. The outer flange part 524 is formed integrally with the body member 534 and protrudes inward in the radial direction from an upper end part of the body member 534. The outer flange part 524 is disposed coaxially with the central axis O. The first sandwiching part 525 is formed integrally with the outer flange part 524 and protrudes inward in the radial direction from the outer flange part 524. Respective lower surfaces of the first sandwiching part 525 and the outer flange part 524 are flush with each other. An upper surface of the first sandwiching part 525 is located below the upper surface of the outer flange part 524. A lower annular groove, which continuously extends over the entire circumference, is formed at an outer peripheral edge in the upper surface of the first sandwiching part 525.

An outer peripheral part of the second sandwiching part 538 is disposed on the upper surface of the outer flange part 524 and the inner peripheral part thereof supports the upper surface of the membrane 531. An upper annular groove, which continuously extends over the entire circumference, is formed at an outer peripheral edge in a lower surface of an inner peripheral part of the second sandwiching part 538. The upper annular groove faces a lower annular groove of the first sandwiching part 525 in the axial direction. The locking projections of the outer peripheral edge 531*a* of the membrane 531 are separately locked to the upper annular groove and the lower annular groove.

Here, the portion of the body part 531*b* of the membrane 531 located above the outer peripheral edge 531*a* is inserted into the inner peripheral part of the second sandwiching part 538. A radial gap is provided between an outer peripheral surface (hereinafter, referred to as the outer peripheral surface 531*c* of the body part 531*b* of the membrane 531) of the portion of the body part 531*b* of the membrane 531 located above the outer peripheral edge 531*a*, and an inner peripheral surface of the inner peripheral part of the second sandwiching part 538. The inner peripheral surface of the inner peripheral part of the second sandwiching part 538 and the outer peripheral surface 531*c* of the body part 531*b* of the membrane 531 extend in the axial direction, respectively. The inner peripheral surface of the inner peripheral part of the second sandwiching part 538 and the outer peripheral surface 531*c* of the body part 531*b* of the membrane 531 are substantially parallel to each other. In addition, the inner peripheral surface of the inner peripheral part of the second sandwiching part 538 and the outer peripheral surface 531c of the body part 531b of the membrane 531 may be inclined with respect to each other.

The lower member 533 is formed in a tubular shape and is disposed coaxially with the central axis O. The lower member 533 is liquid-tightly fitted into the body member 534. An upper end opening edge of a peripheral wall part of the lower member 533 integrally abuts against respective lower surfaces of the first sandwiching part 525 and the outer flange part 524. Here, the membrane 531 and the diaphragm 519 face each other in the axial direction through the lower member 533 and through the first sandwiching part 525. As a result, the auxiliary liquid chamber 516 is defined by the lower surface of the membrane 531, an inner peripheral surface of the lower member 533, and the diaphragm 519. The auxiliary liquid chamber 516 is disposed opposite to the main liquid chamber 515 with the membrane 531 therebetween. That is, the auxiliary liquid chamber 516 and the main liquid chamber 515 are partitioned in the axial direction by the membrane 531. In addition, a liquid chamber, which is located opposite to the main liquid chamber with the membrane therebetween and has the membrane in a portion of the barrier wall thereof, is referred to as an opposite liquid chamber. The opposite liquid chamber of the present embodiment and a twelfth embodiment to be described below is the auxiliary liquid chamber 516.

A second orifice groove 533a, which opens outward in the radial direction and extends in the circumferential direction, is formed in an outer peripheral surface of the peripheral wall part of the lower member 533. A radially outer opening of the second orifice groove 533a is blocked by an inner peripheral surface of the body member 534. A second communication hole 533b, which allows the second orifice groove 533a and the auxiliary liquid chamber 516 to communicate with each other, is formed in an inner peripheral surface of the peripheral wall part of the lower member 533. The second communication hole 533b allows the second orifice groove 533a and the auxiliary liquid chamber 516 to communicate with each other in the radial direction. The second orifice groove 533a extends in the circumferential direction over an angular range exceeding 180° from the second communication hole 533b toward one side in the circumferential direction with the central axis O as a center. End parts of the second orifice groove 533a and the first orifice groove 523a on one side in the circumferential direction are disposed at the same circumferential position.

The aforementioned diaphragm ring 518 is disposed at a lower end opening edge of the lower member 533. The diaphragm ring 518 is formed integrally with the lower member 533. The portion of the diaphragm ring 518 located radially outside the inner tube portion is located radially outside the lower member 533, and a lower surface of the body member 534 liquid-tightly abuts against an upper surface of a connection portion between the outer tube portion and the inner tube portion.

Here, a connection hole 521c, which allows the first orifice groove 523a and the second orifice groove 533a to communicate with each other, is formed in the inner peripheral surface of the body member 534. The connection hole 521c allows the first orifice groove 523a and the second orifice groove 533a to communicate with each other in the radial direction. Also, the first orifice passage 521, which extends from the main liquid chamber 515 toward the auxiliary liquid chamber 516 side, is constituted of the first orifice groove 523a having the radially outer opening blocked by the covering rubber, the second orifice groove 533a having a radially outer opening blocked by the inner peripheral surface of the body member 534, and the connection hole 521c. Hereinafter, the portion of the first orifice passage 521, which is located on the main liquid chamber 515 side and is defined by the first orifice groove 523a, is referred to as a main liquid chamber-side passage 521a, and the portion of the first orifice passage 521, which extends from the main liquid chamber-side passage 521a through the connection hole 521c toward the auxiliary liquid chamber 516 side and is defined by the second orifice groove 533a, is referred to as an auxiliary liquid chamber-side passage 521b. In addition, the portion of the first orifice passage, which is located opposite to the main liquid chamber with the membrane therebetween and is located on the liquid chamber (opposite liquid chamber) having the membrane in a portion of the barrier wall thereof, is referred to as an opposite liquid chamber-side passage. The opposite liquid chamber-side passage of the present embodiment and the twelfth embodiment to be described below is the auxiliary liquid chamber-side passage 521b.

Here, the connection hole 521c connects an end part of the first orifice groove 523a on one side in the circumferential direction and an end part of the second orifice groove 533a on one side in the circumferential direction to each other. As a result, the liquid flows from any one of the main liquid chamber-side passage 521a and the auxiliary liquid chamber-side passage 521b through the connection hole 521c into the other, and in the process in which the liquid flows through the other side, the flow direction of the liquid flowing through the one and the flow direction of the liquid flowing through the other are opposite to each other in the circumferential direction.

Moreover, in the present embodiment, the flow resistance of the liquid in the auxiliary liquid chamber-side passage 521b is lower than the flow resistance of the liquid in the main liquid chamber-side passage 521a. In the example shown, the channel cross-sectional area of the main liquid chamber-side passage 521a is smaller than the channel cross-sectional area of the auxiliary liquid chamber-side passage 521b. The opening area of the connection hole 521c is smaller than the channel cross-sectional area of the main liquid chamber-side passage 521a. The channel length of the connection hole 521c is shorter than the channel length of each of the main liquid chamber-side passage 521a and the auxiliary liquid chamber-side passage 521b.

Here, the respective flow resistances of the main liquid chamber-side passage 521a and the first communication hole 523b may be equal to each other or may be different from each other. For example, in a case where the flow resistance of the main liquid chamber-side passage 521a is higher than the flow resistance of the first communication hole 523b, the flow resistance of the liquid when passing through the first communication hole 523b and entering the main liquid chamber-side passage 521a is increased, and a high damping force is generated when a bound load for causing the liquid to flow from the main liquid chamber 515 toward the auxiliary liquid chamber 516 side is input.

Additionally, the respective flow resistances of the connection hole 521c and the main liquid chamber-side passage 521a may be equal to each other or may be different from each other. For example, in a case where the flow resistance of the connection hole 521c is higher than the flow resistance of the main liquid chamber-side passage 521a, the flow resistance of the liquid when passing through the main liquid chamber-side passage 521a and entering the connection hole 521c is increased, and a high damping force is generated when the bound load is input.

Additionally, the respective flow resistances of the auxiliary liquid chamber-side passage 521*b* and the connection hole 521*c* may be equal to each other or may be different from each other. For example, in a case where the flow resistance of the auxiliary liquid chamber-side passage 521*b* is higher than the flow resistance of the connection hole 521*c*, the flow resistance of the liquid when passing through the connection hole 521*c* and entering the auxiliary liquid chamber-side passage 521*b* is increased, and a high damping force is generated when the bound load is input.

Additionally, the respective flow resistances of the second communication hole 533*b* and the auxiliary liquid chamber-side passage 521*b* may be equal to each other or may be different from each other. For example, in a case where the flow resistance of the second communication hole 533*b* is higher than the flow resistance of the auxiliary liquid chamber-side passage 521*b*, the flow resistance of the liquid when passing through the auxiliary liquid chamber-side passage 521*b* and entering the second communication hole 533*b* is increased, and a high damping force is generated when the bound load is input.

Additionally, in the present embodiment, the main liquid chamber-side passage 521*a* and the auxiliary liquid chamber-side passage 521*b* are passages having a longer channel length than a channel diameter. Here, in the example shown, the channel cross-sectional shape of the first orifice passage 521 is a rectangular shape. In this case, when the channel cross-sectional shape is substituted with a circular shape having the same channel cross-sectional area, the channel diameter can be represented by the diameter of the circular shape.

Additionally, an uneven swelling part 523 is formed that makes the swelling deformation of the membrane 531 toward the main liquid chamber 515 side larger than the swelling deformation of the membrane 531 toward the auxiliary liquid chamber 516 side when the same pressing force is applied to the membrane 531. The uneven swelling part 523 is curved so as to project toward the auxiliary liquid chamber 516 side. The uneven swelling part 523 is integrally formed over the entire body part 531*b*, which is located radially inside the outer peripheral edge 531*a* sandwiched in the axial direction by the sandwiching member 539, in the membrane 531. In addition, the uneven swelling part 523 is not limited to the aforementioned curved shape and may be appropriately changed, for example, by changing the size of grooves formed in the upper and lower surfaces of the membrane 531.

Moreover, in the present embodiment, the first sandwiching part 525, which supports the membrane 531 from the auxiliary liquid chamber 516 side, protrudes longer inward in the radial direction than the second sandwiching part 538 that supports the membrane 531 from the main liquid chamber 515 side. The portion of the first sandwiching part 525 located radially inside the second sandwiching part 538 supports an outer peripheral part in a lower surface of the body part 531*b* of the membrane 531. The upper surface of the inner peripheral edge of the first sandwiching part 525, which abuts against the membrane 531, is gradually inclined downward so as to be separated from the main liquid chamber 515 inward in the radial direction. In the example shown, the upper surface of the inner peripheral edge of the first sandwiching part 525 is formed in a curved surface shape that projects toward the upper side that is the main liquid chamber 515 side. In addition, the upper surface of the inner peripheral edge of the first sandwiching part 525 may be a flat surface that extends in the direction orthogonal to the central axis O.

The lower surface of the membrane 531 abuts against the upper surface of the inner peripheral edge of the first sandwiching part 525. The uneven swelling part 523 of the membrane 531 overhangs to the inside of the first sandwiching part 525. Respective axial positions of a lower end part in a lower surface of the uneven swelling part 523 and a lower surface of the first sandwiching part 525 are the same as each other. A lower end part in the lower surface of the uneven swelling part 523 is located at a central part of the membrane 531 in the radial direction. The lower surface of the membrane 531 is in non-contact with an inner peripheral surface of the first sandwiching part 525. The membrane 531 abuts against the entire upper surface of the first sandwiching part 525, and the entire lower surface of the inner peripheral part of the second sandwiching part 538. In addition, the lower surface of the membrane 531 may be spaced apart upward from the upper surface of the inner peripheral edge of the first sandwiching part 525. The uneven swelling part 523 of the membrane 531 may be located above the inner peripheral surface of the first sandwiching part 525. The lower surface of the membrane 531 may be brought into contact with the inner peripheral surface of the first sandwiching part 525.

Here, in the present embodiment, the main liquid chamber 515 is located on the main liquid chamber-side passage 521*a* side where the flow resistance of the liquid is high out of the main liquid chamber-side passage 521*a* and the auxiliary liquid chamber-side passage 521*b* in the flow direction of the liquid in the first orifice passage 521. Also, the rigidity of an upper part of the membrane 531, which forms a portion of the barrier wall of the main liquid chamber 515, is higher than the rigidity of a lower part of the membrane 531, which forms a portion of the barrier wall of the auxiliary liquid chamber 516.

In the membrane 531, the rigidity of an upper part of the body part 531*b* is higher than the rigidity of each of a lower part of the body part 531*b* and the outer peripheral edge 531*a* except for the upper part. For example, a reinforcing member 531*d*, such as a canvas, is buried at the upper part of the body part 531*b*. The level of the rigidity of each of an upper part and a lower part of the membrane 531 can be specified depending on the magnitude of a reaction force measured when the upper part and the lower part of the membrane 531 are separately pushed and elastically deformed with the same amount of displacement in the axial direction. In addition, the upper part of the body part 531*b* may be formed of a material having rigidity higher than that of a material that forms the lower part of the body part 531*b* and the outer peripheral edge 531*a* without burying the reinforcing member 531*d* in the upper part of the body part 531*b*. The membrane 531 may be formed by, for example, two-color molding or the like.

As described above, according to the vibration-damping device 51 related to the present embodiment, the rigidity of the upper part of the membrane 531, which forms a portion of the barrier wall of the main liquid chamber 515, is higher than the rigidity of the lower part of the membrane 531, which forms a portion of the barrier wall of the auxiliary liquid chamber 516. Thus, when the same pressing force is applied, the swelling deformation of the membrane 531 toward the main liquid chamber 515 side is larger than the swelling deformation of the membrane 531 toward the auxiliary liquid chamber 516 side. Hence, if the rebound load is input to the vibration-damping device 51, the damping force to be generated can be suppressed to be low as the membrane 531 is largely swelled and deformed toward the main liquid chamber 515 side. On the other hand, if the bound load is input to the vibration-damping device 51, the swelling deformation of the membrane 531 toward the auxiliary liquid chamber 516 side becomes smaller than the swelling deformation of the membrane 531 toward the main liquid chamber 515 side when the rebound load is input, the positive pressure of the main liquid chamber 515 is not easily relieved, and the damping force to be generated becomes high. That is, the membrane 531 of the present embodiment is a damping force difference increasing part that restrains the swelling deformation of the membrane 531 toward the auxiliary liquid chamber (opposite liquid chamber) 516 side out of the swelling deformation of the membrane 531 toward the main liquid chamber 515 side and the swelling deformation of the membrane 531 toward the auxiliary liquid chamber (opposite liquid chamber) 516 side and that increases a difference between the damping force generated when the bound load is input and the damping force generated when the rebound load is input.

Additionally, the flow resistance of the liquid in the main liquid chamber-side passage 521a is higher than the flow resistance of the liquid in the auxiliary liquid chamber-side passage 521b. Thus, when the bound load is input and when the liquid of the main liquid chamber 515 flows into the main liquid chamber-side passage 521a, a larger resistance is applied compared to a case where the liquid directly flows into the auxiliary liquid chamber-side passage 521b. As a result, a high damping force can be generated when the bound load is input. On the other hand, when the liquid on the auxiliary liquid chamber 516 side flows through the first orifice passage 521 toward the main liquid chamber 515, even if the flow resistance is different between the main liquid chamber-side passage 521a and the auxiliary liquid chamber-side passage 521b, both the passages constitute one orifice passage continuously with each other. Thus, it is possible to suppress the resistance generated when the liquid passes through a boundary portion therebetween, and the damping force generated when the rebound load is input can be suppressed to be low. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased.

Moreover, the rigidity of the portion of the membrane 531, which forms a portion of the barrier wall of the auxiliary liquid chamber 516, is lower than the rigidity of the portion of the membrane 531 that forms a portion of the barrier wall of the main liquid chamber 515. Therefore, when the main liquid chamber 515 tends to have a negative pressure suddenly with the input of a large rebound load, it is possible to smoothly swell and deform the membrane 531 toward the main liquid chamber 515 side, and the negative pressure of the main liquid chamber 515 can be suppressed, and occurrence of cavitation can be suppressed.

Additionally, the aforementioned respective functions and effects are achieved by a configuration in which the flow resistance of the liquid in the auxiliary liquid chamber-side passage 521b and the flow resistance of the liquid in the main liquid chamber-side passage 521a are different from each other and the rigidity of the portion of the membrane 531, which forms a portion of the barrier wall of the main liquid chamber 515 and the rigidity of the portion of the membrane 531, which forms a portion of the barrier wall of the auxiliary liquid chamber 516, are different from each other, as mentioned above, without adopting, for example, members that operate when the liquid pressure within the main liquid chamber 515 reaches a predetermined value. Therefore, the aforementioned functions and effects can be stably and accurately achieved even with vibration of a relatively small amplitude.

Additionally, since the reinforcing member 531d is buried in the portion of the membrane 531 that forms a portion of the barrier wall of the main liquid chamber 515, even if the thickness of the membrane 531 is not excessively increased, the membrane 531 can be easily provided with the aforementioned difference in rigidity.

Since the uneven swelling part 523 is formed in the membrane 531, when the same pressing force is applied, the amount of swelling deformation of the membrane 531 toward the main liquid chamber 515 side is larger than that toward the auxiliary liquid chamber 516 side. Hence, if the rebound load is input to the vibration-damping device 51, the damping force to be generated can be suppressed to be low as the membrane 531 is largely swelled and deformed toward the main liquid chamber 515 side by the uneven swelling part 523. On the other hand, if the bound load is input to the vibration-damping device 51, the swelling deformation of the membrane 531 toward the auxiliary liquid chamber 516 side becomes smaller than the swelling deformation of the membrane 531 toward the main liquid chamber 515 side when the rebound load is input, the positive pressure of the main liquid chamber 515 is not easily relieved, and the damping force to be generated becomes high. As described above, the damping force generated when the bound load is input can be reliably made higher than the damping force generated when the rebound load is input, and the difference between both these damping forces can be increased, and the ratio of the damping force generated when the bound load is input to the damping force generated when the rebound load is input can be reliably increased.

Moreover, even if the main liquid chamber 515 tends to have a negative pressure suddenly with the input of a large rebound load, the membrane 531 is largely swelled and deformed toward the main liquid chamber 515 side by the uneven swelling part 523, and thereby, the negative pressure of the main liquid chamber 515 can be suppressed. Therefore, the occurrence of cavitation can also be suppressed.

Additionally, since the uneven swelling part 523 is curved so as to project toward the auxiliary liquid chamber 516 side, a configuration in which the swelling deformation of the membrane 531 toward the main liquid chamber 515 side is larger than the swelling deformation of the membrane 531 toward the auxiliary liquid chamber 516 side when the same pressing force is applied to the membrane 531 can be easily and reliably realized. Additionally, the uneven swelling part 523 is integrally formed over the entire body part 531b, which is located radially inside the outer peripheral edge 531a sandwiched in the axial direction by the sandwiching member 539, in the membrane 531. Thus, it is possible to largely swell and deform the membrane 531 toward the main liquid chamber 515 side, and the damping force generated when the bound load is input and the damping force generated when the rebound load is input can be made greatly different from each other. Additionally, since the main liquid chamber-side passage 521a of the first orifice passage 521 is a passage having a longer channel length than a channel diameter, the resistance applied to the liquid from the main liquid chamber 515 side that flows into this passage can be increased, and the damping force generated when the bound load is input can be much more reliably increased.

Additionally, in the present embodiment, the first sandwiching part 525, which protrudes longer inward in the radial direction than the second sandwiching part 538, supports the membrane 531 from the auxiliary liquid chamber 516 side. Thus, when the same pressing force is applied, the amount of swelling deformation of the membrane 531 toward the auxiliary liquid chamber 516 side is smaller than that toward the main liquid chamber 515 side. That is, if the bound load is input to the vibration-damping device 51, the swelling deformation of the membrane 531 toward the auxiliary liquid chamber 516 side is restrained by the first sandwiching part 525, the positive pressure of the main liquid chamber 515 is not easily relieved, and the damping force to be generated becomes high. On the other hand, if the rebound load is input to the vibration-damping device 51, the swelling deformation of the membrane 531 toward the main liquid chamber 515 side becomes larger than the swelling deformation of the membrane 531 toward the auxiliary liquid chamber 516 side when the bound load is input to such an extent that the second sandwiching part 538 does not protrude inward in the radial direction from the first sandwiching part 525, and the damping force to be generated can be suppressed to be low. As described above, the ratio of the damping force generated when the bound load is input to the damping force generated when the rebound load is input can be much more reliably increased.

Additionally, the upper surface of the inner peripheral edge of the first sandwiching part 525, which abuts against the membrane 531, is gradually inclined so as to be separated from the main liquid chamber 515 inward in the radial direction. Thus, when the bound load is input and when the membrane 531 is swelled and deformed toward the auxiliary liquid chamber 516 side, the membrane 531 can easily come into surface contact with the inner peripheral edge of the first sandwiching part 525, the generation of abnormal noise can be suppressed, and the durability of the membrane 531 can be secured. Additionally, the membrane 531 abuts against the inner peripheral edge of the first sandwiching part 525. Thus, when the bound load is input, it is possible to inhibit the membrane 531 from colliding against the inner peripheral edge of the first sandwiching part 525, and the generation of abnormal noise can be reliably suppressed. Additionally, the membrane 531 abuts against the inner peripheral edge of the first sandwiching part 525. Thus, even with vibration of a relatively small amplitude, a high damping force can be generated when the bound load is input.

Additionally, the radial gap is provided between the outer peripheral surface 531c of the body part 531b of the membrane 531 and the inner peripheral surface of the inner peripheral part of the second sandwiching part 538. Thus, even with vibration of a relatively small amplitude, when the rebound load is input, it is possible to smoothly swell and deform the membrane 531 toward the main liquid chamber 515 side, and the damping force to be generated can be reliably suppressed to be low. Additionally, when the membrane 531 tends to be excessively largely swelled and deformed toward the main liquid chamber 515 side at the time of the input of the rebound load, the outer peripheral surface 531c of the body part 531b can be made to abut against the inner peripheral surface of the inner peripheral part of the second sandwiching part 538, and a large load can be prevented from being applied to the connection portion between the outer peripheral edge 531a and the body part 531b in the membrane 531.

Additionally, since the uneven swelling part 523 overhangs to the inside of the first sandwiching part 525, a configuration in which the swelling deformation of the membrane 531 toward the main liquid chamber 515 side is made larger than the swelling deformation of the membrane 531 toward the auxiliary liquid chamber 516 side when the same pressing force is applied can be much more reliably realized.

Eleventh Embodiment

Figure 21:
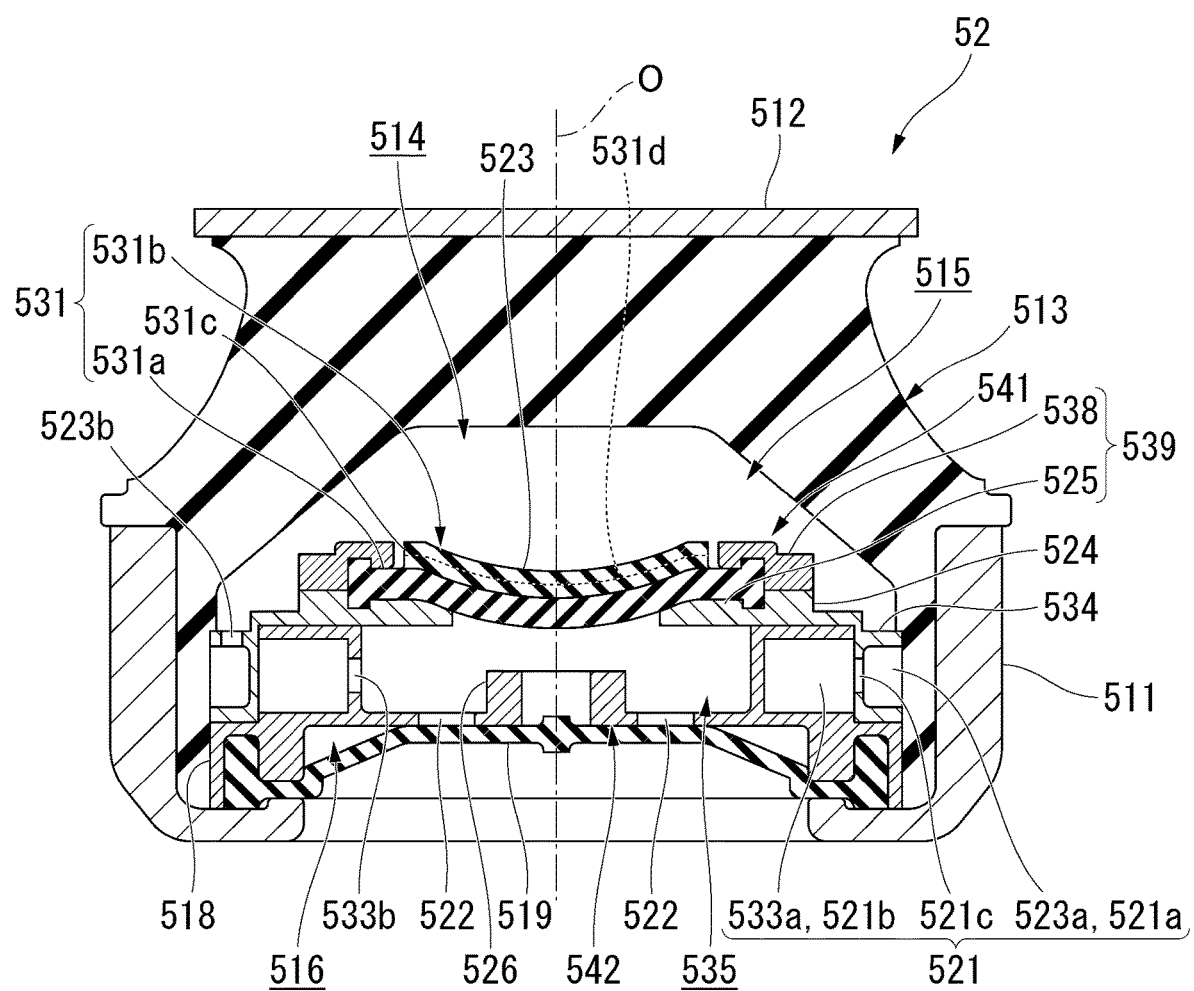
FIG. 21 is a longitudinal sectional view of a vibration-damping device related to an eleventh embodiment of the invention.
Figure 22:
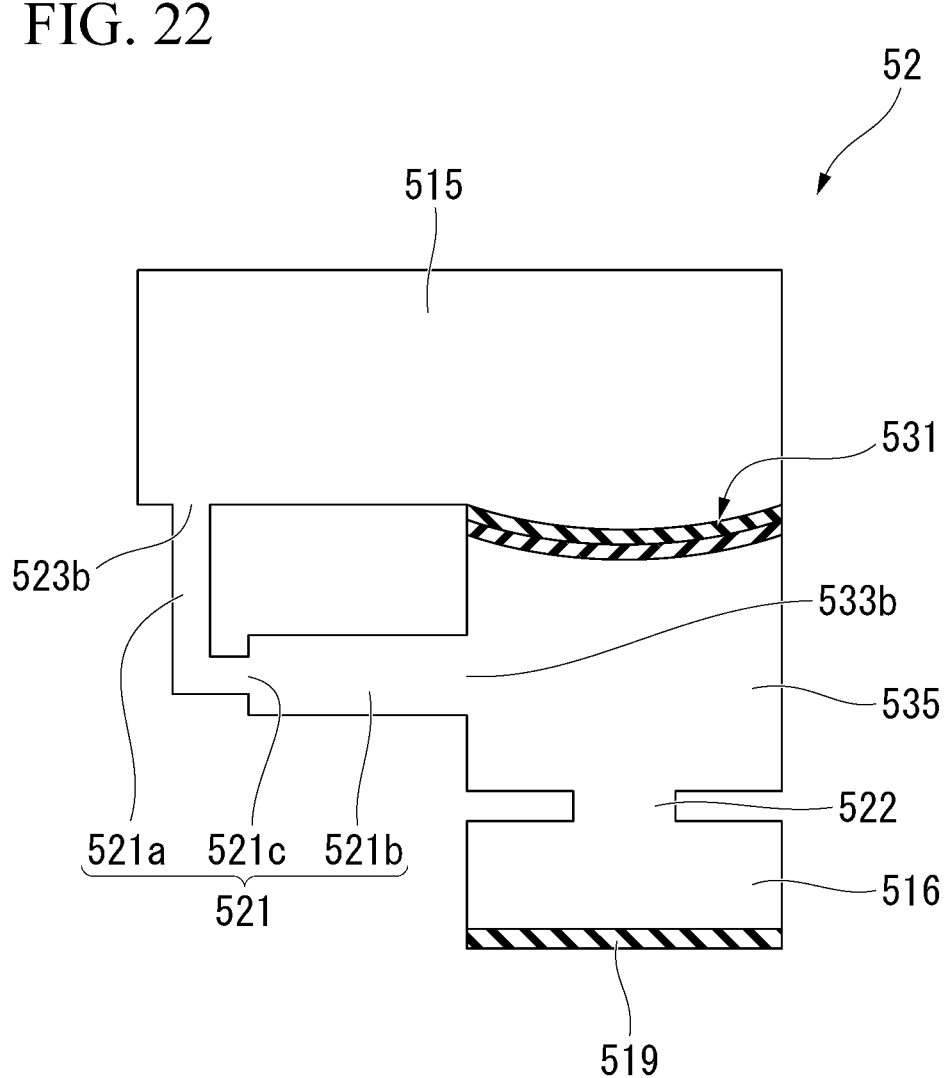
FIG. 22 is a schematic view of the vibration-damping device shown in FIG. 21.

Next, a vibration-damping device 52 related to an eleventh embodiment of the invention will be described, referring to FIGS. 21 and 22. In addition, in the eleventh embodiment, the same portions as the constituent elements in the above-described tenth embodiment will be designated by the same reference signs, and a description thereof will be omitted, and only different points will be described.

As mentioned above, the portion of the first orifice passage, which is located opposite to the main liquid chamber with the membrane therebetween and is located on the liquid chamber (opposite liquid chamber) having the membrane in a portion of the barrier wall thereof, is referred to as an opposite liquid chamber-side passage. In the present embodiment, the partition member 541 includes an intermediate liquid chamber 535 that is located opposite to the main liquid chamber 515 with the membrane 531 therebetween and allows the opposite liquid chamber-side passage 521b of the first orifice passage 521 and the auxiliary liquid chamber 516 to communicate with each other, and the first orifice passage 521 allows the main liquid chamber 515 and the intermediate liquid chamber 535 to communicate with each other. That is, the opposite liquid chamber of the present embodiment is the intermediate liquid chamber 535, and the opposite liquid chamber-side passage 521b may be referred to as an intermediate liquid chamber-side passage. The intermediate liquid chamber 535 is located on the intermediate liquid chamber-side passage 521b side where the flow resistance of the liquid is low out of the main liquid chamber-side passage 521a and the intermediate liquid chamber-side passage 521b in the flow direction of the liquid in the first orifice passage 521.

Here, the lower member 542 is formed in a bottomed tubular shape, is disposed coaxially with the central axis O and blocks a lower end opening part of the body member 534. An upper surface of the bottom wall part of the lower member 542 is separated downward from the lower surface of the membrane 531. The aforementioned intermediate liquid chamber 535 is defined by the upper surface of the bottom wall part and an inner peripheral surface of the peripheral wall part in the lower member 542a and the lower surface of the membrane 531. That is, the intermediate liquid chamber 535 has the membrane 531 as a portion of a barrier wall thereof, and the intermediate liquid chamber 535 and the main liquid chamber 515 are partitioned in the axial direction by the membrane 531. The internal volume of the intermediate liquid chamber 535 is smaller than the internal volume of the main liquid chamber 515. A second communication hole 533b formed in an inner peripheral surface of a peripheral wall part of the lower member 542 allows the second orifice groove 533a and the intermediate liquid chamber 535 to communicate with each other in the radial direction.

The auxiliary liquid chamber 516 is defined by a lower surface of the bottom wall part in the lower member 542 and the diaphragm 519. A bottom wall part of the lower member 542 forms a barrier wall that partitions the auxiliary liquid chamber 516 and the intermediate liquid chamber 535 in the axial direction. A second orifice passage 522, which allows the auxiliary liquid chamber 516 and the intermediate liquid chamber 535 to communicate with each other, is formed in the bottom wall part of the lower member 542. The second orifice passage 522 allows the auxiliary liquid chamber 516 and the intermediate liquid chamber 535 to communicate with each other in the axial direction. An opening part of the second orifice passage 522 on the intermediate liquid chamber 535 side faces the membrane 531. The second orifice passage 522 is a through-hole formed in the bottom wall part of the lower member 542, and a plurality of the second orifice passages 522 are formed in the bottom wall part of the lower member 542. At least some of the second orifice passages 522 face the membrane 531 in the axial direction.

The channel cross-sectional area and the channel length of each second orifice passage 522 are smaller than the channel cross-sectional area and the channel length of the first orifice passage 521 to be described below, respectively. The channel length of the second orifice passage 522 is smaller than the internal diameter thereof. In addition, the channel length of the second orifice passage 522 may be equal to or greater than the internal diameter. The flow resistance of the liquid in each second orifice passage 522 is smaller than the flow resistance of the liquid in the first orifice passage 521.

A restriction projection 526, which restricts excessively large swelling deformation of the membrane 531 toward the intermediate liquid chamber 535 side, is disposed the upper surface of the bottom wall part in the lower member 542. The restriction projection 526 is formed integrally with the lower member 542. The restriction projection 526 is formed in a tubular shape and is disposed coaxially with the central axis O. In addition, the restriction projection 526 may be formed in a solid form or may not be disposed coaxially with the central axis O.

Additionally, in the present embodiment, an opening direction in which the first orifice passage 521 opens toward the intermediate liquid chamber 535, that is, an opening direction of the second communication hole 533b toward the intermediate liquid chamber 535 intersects an opening direction in which the second orifice passage 522 opens toward the intermediate liquid chamber 535. In the example shown, the second communication hole 533b opens in the radial direction toward the intermediate liquid chamber 535, and the second orifice passage 522 opens in the axial direction toward the intermediate liquid chamber 535. That is, the opening direction of the second communication hole 533b toward the intermediate liquid chamber 535 is orthogonal to the opening direction in which the second orifice passage 522 opens toward the intermediate liquid chamber 535.

Additionally, in the present embodiment, the cross-sectional area of the intermediate liquid chamber 535 in the direction orthogonal to the opening direction in which the second orifice passage 522 opens toward the intermediate liquid chamber 535 is larger than the channel cross-sectional area of the second orifice passage 522, the channel cross-sectional area of the intermediate liquid chamber-side passage 521b of the first orifice passage 521, and the channel cross-sectional area of the main liquid chamber-side passage 521a of the first orifice passage 521.

As described above, according to the vibration-damping device 52 related to the present embodiment, the partition member 541 includes the intermediate liquid chamber 535 in addition to the functions and effects achieved by the vibration-damping device 51 of the tenth embodiment. Thus, a high damping force can be generated.

Additionally, since the opening direction in which the first orifice passage 521 opens toward the intermediate liquid chamber 535 intersects the opening direction in which the second orifice passage 522 opens toward the intermediate liquid chamber 535, it is possible to suppress that the liquid from the main liquid chamber 515 side that has flowed into the intermediate liquid chamber 535 goes straight toward the second orifice passage 522, and this liquid can be diffused within the intermediate liquid chamber 535. As a result, the flow speed of the liquid can be reliably reduced until the liquid of the main liquid chamber 515 flows into the second orifice passage 522, and a high damping force can be generated when the bound load is input.

Additionally, since the cross-sectional area of the intermediate liquid chamber 535 is larger than the channel cross-sectional area of the second orifice passage 522, it is possible to increase the resistance generated when the liquid of the intermediate liquid chamber 535 flows into the second orifice passage 522, and the damping force generated when the bound load is input can be reliably increased.

Twelfth Embodiment

Figure 23:
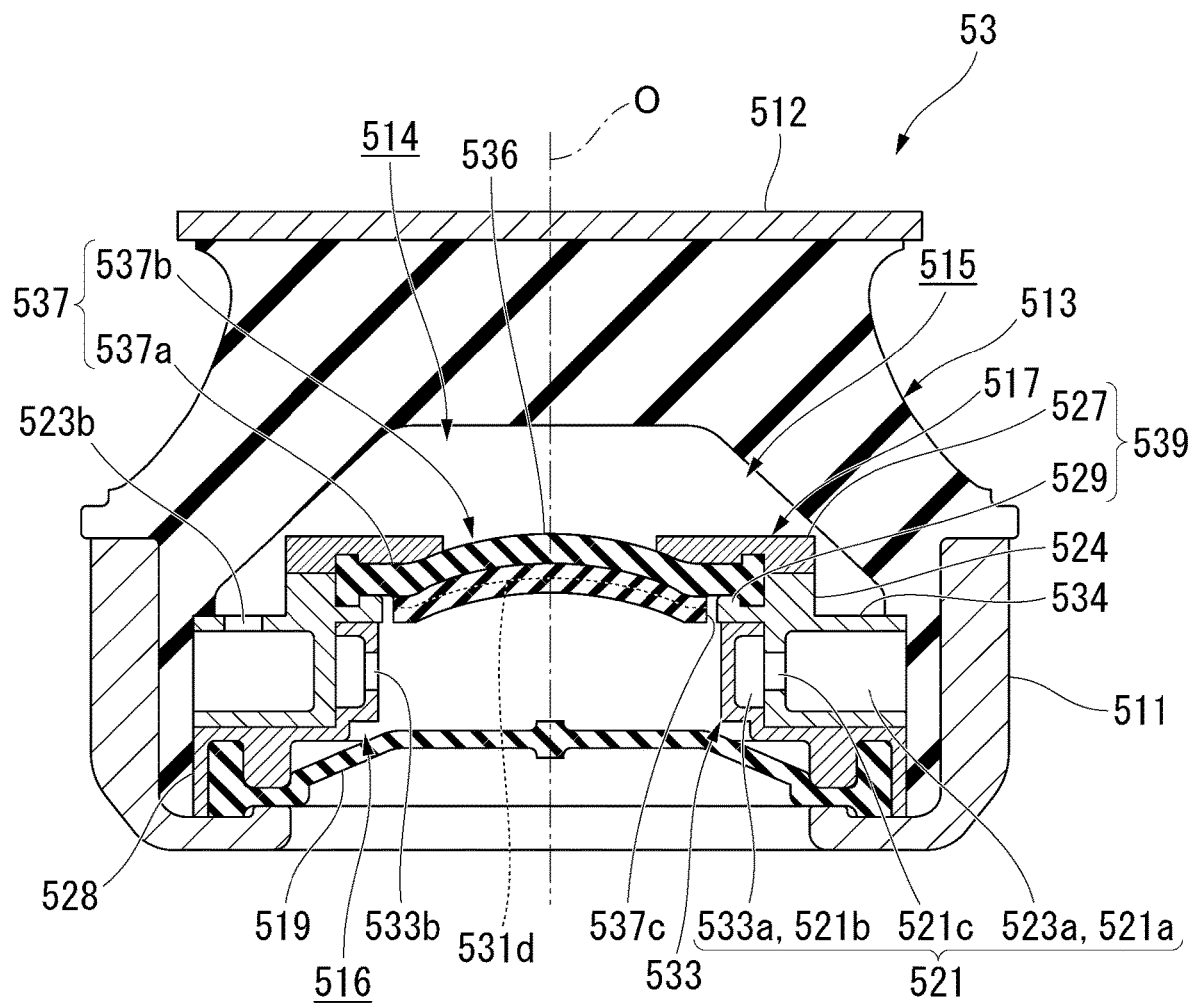
FIG. 23 is a longitudinal sectional view of a vibration-damping device related to a twelfth embodiment of the invention.
Figure 24:
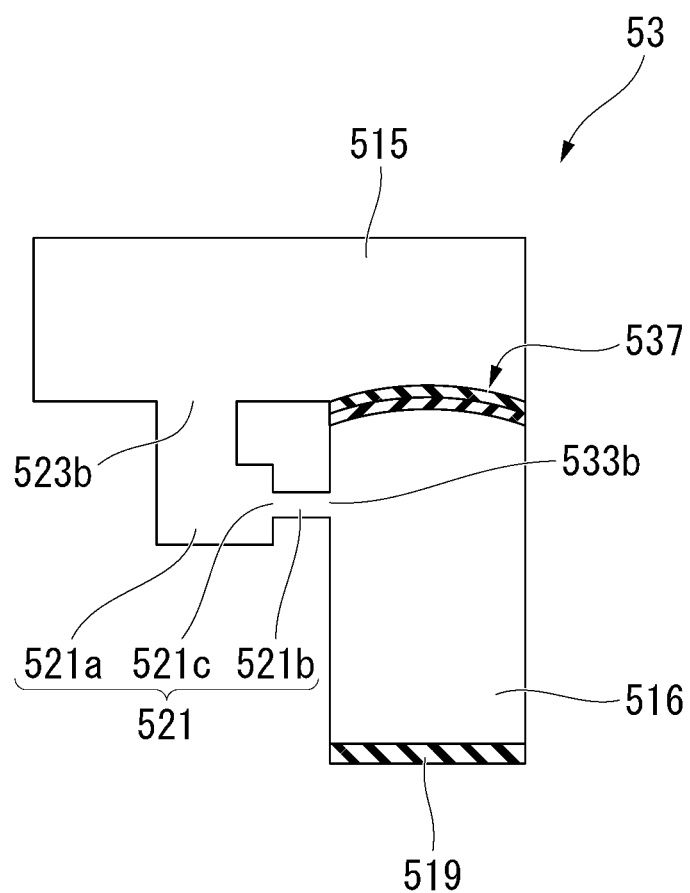
FIG. 24 is a schematic view of the vibration-damping device shown in FIG. 23.

Next, a vibration-damping device 53 related to a twelfth embodiment of the invention will be described, referring to FIGS. 23 and 24. In addition, in the twelfth embodiment, the same portions as the constituent elements in the above-described tenth embodiment will be designated by the same reference signs, and a description thereof will be omitted, and only different points will be described.

A diaphragm ring 528 protrudes outward in the radial direction from a lower end part of the lower member 533, and the lower surface of the body member 534 liquid-tightly abuts against an upper surface of the diaphragm ring 528. The diaphragm ring 528 is formed integrally with the lower member 533. The outer flange part 524 protrudes upward from an inner peripheral edge in the upper surface of the body member 534. Respective inner peripheral surfaces the outer flange part 524 and the body member 534 are flush with each other.

Moreover, in the present embodiment, the flow resistance of the liquid in the main liquid chamber-side passage 521a is lower than the flow resistance of the liquid in the auxiliary liquid chamber-side passage 521b. In the example shown, the channel cross-sectional area of the auxiliary liquid chamber-side passage 521b is smaller than the channel cross-sectional area of the main liquid chamber-side passage 521a. Additionally, the opening area of the connection hole 521c is smaller than the channel cross-sectional area of the auxiliary liquid chamber-side passage 521b.

Here, the respective flow resistances of the auxiliary liquid chamber-side passage 521b and the second communication hole 533b may be equal to each other or may be different from each other. For example, in a case where the flow resistance of the auxiliary liquid chamber-side passage 521b is higher than the flow resistance of the second communication hole 533b, the flow resistance of the liquid when passing through the second communication hole 533b and entering the auxiliary liquid chamber-side passage 521b is increased, and a high damping force is generated when a rebound load for causing the liquid to flow from the auxiliary liquid chamber 516 toward the main liquid chamber 515 side is input.

Additionally, the respective flow resistances of the connection hole 521c and the auxiliary liquid chamber-side passage 521b may be equal to each other or may be different from each other. For example, in a case where the flow resistance of the connection hole 521c is higher than the flow resistance of the auxiliary liquid chamber-side passage 521b, the flow resistance of the liquid when passing through the auxiliary liquid chamber-side passage 521b and entering the connection hole 521c is increased, and a high damping force is generated when the rebound load is input.

Additionally, the respective flow resistances of the main liquid chamber-side passage 521a and the connection hole 521c may be equal to each other or may be different from each other. For example, in a case where the flow resistance of the main liquid chamber-side passage 521a is higher than the flow resistance of the connection hole 521c, the flow resistance of the liquid when passing through the connection hole 521c and entering the main liquid chamber-side passage 521a is increased, and a high damping force is generated when the rebound load is input.

Additionally, the respective flow resistances of the first communication hole 523b and the main liquid chamber-side passage 521a may be equal to each other or may be different from each other. For example, in a case where the flow resistance of the first communication hole 523b is higher than the flow resistance of the main liquid chamber-side passage 521a, the flow resistance of the liquid when passing through the main liquid chamber-side passage 521a and entering the first communication hole 523b is increased, and a high damping force is generated when the rebound load is input.

Also, in the present embodiment, an uneven swelling part 536 is formed so as to make the swelling deformation of the membrane 537 toward the auxiliary liquid chamber 516 side larger than the swelling deformation of the membrane 537 toward the main liquid chamber 515 side when the same pressing force is applied to the membrane 537. In the example shown, the uneven swelling part 536 is curved so as to project toward the main liquid chamber 515 side. The membrane 537 includes a disk-shaped body part 537b, and an outer peripheral edge 537a that is formed to be thinner than the body part 537b, protrudes outward in the radial direction from an upper part of the body part 537b, and continuously extends over the entire circumference. Locking projections, which protrude toward both sides in the axial direction, are formed on an outer end part of the outer peripheral edge 537a in the radial direction.

Moreover, in the present embodiment, the first sandwiching part 527, which protrudes long inward in the radial direction, out of the first sandwiching part 527 and the second sandwiching part 529 supports the upper surface of the membrane 537, and the second sandwiching part 529 supports the lower surface of the membrane 537.

The second sandwiching part 529 is formed integrally with the outer flange part 524 and protrudes inward in the radial direction from the outer flange part 524. An upper end opening edge of the peripheral wall part of the lower member 533 abuts against a lower surface of the second sandwiching part 529. An upper surface of the second sandwiching part 529 is located below the upper surface of the outer flange part 524. In addition, a lower annular groove, which continuously extends over the entire circumference, is formed at an outer peripheral edge in the upper surface of the second sandwiching part 529.

Here, the portion of the body part 537b of the membrane 537 located below the outer peripheral edge 537a is inserted into the second sandwiching part 529. A radial gap is provided between an outer peripheral surface (hereinafter, referred to as the outer peripheral surface 537c of the body part 537b of the membrane 537) of the portion of the body part 537b of the membrane 537 located below the outer peripheral edge 537a, and an inner peripheral surface of the second sandwiching part 529. The inner peripheral surface of the second sandwiching part 529 and the outer peripheral surface 537c of the body part 537b of the membrane 537 extend in the axial direction, respectively. The inner peripheral surface of the second sandwiching part 529 and the outer peripheral surface 537c of the body part 537b of the membrane 537 are substantially parallel to each other. In addition, the inner peripheral surface of the second sandwiching part 529 and the outer peripheral surface 537c of the body part 537b of the membrane 537 may be inclined with respect to each other.

An outer peripheral part of the first sandwiching part 527 is disposed on the upper surface of the outer flange part 524 and the inner peripheral part thereof supports the upper surface of the membrane 537. An upper annular groove, which continuously extends over the entire circumference, is formed at an outer peripheral edge in a lower surface of an inner peripheral part of the first sandwiching part 527. The upper annular groove faces a lower annular groove of the second sandwiching part 529 in the axial direction. The locking projections of the outer peripheral edge 537a of the membrane 537 are separately locked to the upper annular groove and the lower annular groove.

The portion of the first sandwiching part 527 located radially inside the second sandwiching part 529 supports an outer peripheral part in an upper surface of the body part 537b of the membrane 537. A lower surface of an inner peripheral edge (hereinafter, referred to as an inner peripheral edge of the first sandwiching part 527) of the inner peripheral part of the first sandwiching part 527, which abuts against the membrane 537, is gradually inclined upward so as to be separated from the auxiliary liquid chamber 516 inward in the radial direction. In the example shown, the lower surface of the inner peripheral edge of the first sandwiching part 527 is formed in a curved surface shape that projects toward the lower side that is the auxiliary liquid chamber 516 side. In addition, the lower surface of the inner peripheral edge of the first sandwiching part 527 may be a flat surface that extends in the direction orthogonal to the central axis O.

The upper surface of the membrane 537 abuts against the lower surface of the inner peripheral edge of the first sandwiching part 527. The uneven swelling part 536 of the membrane 537 overhangs to the inside of the first sandwiching part 527. Respective axial positions of an upper end part in an upper surface of the uneven swelling part 536 and an upper surface of the first sandwiching part 527 are the same as each other. An upper end part in the upper surface of the uneven swelling part 536 is located at a central part of the membrane 537 in the radial direction. The upper surface of the membrane 537 is in non-contact with an inner peripheral surface of the inner peripheral part of the first sandwiching part 527. The membrane 537 abuts against the entire lower surface of the inner peripheral part of the first sandwiching part 527, and the entire upper surface of the second sandwiching part 529. In addition, the upper surface of the membrane 537 may be spaced apart downward from the lower surface of the inner peripheral edge of the first sandwiching part 527. The uneven swelling part 536 of the membrane 537 may be located below the inner peripheral surface of the inner peripheral part of the first sandwiching part 527. The upper surface of the membrane 537 may be brought into contact with the inner peripheral surface of the inner peripheral part of the first sandwiching part 527.

Here, in the present embodiment, the auxiliary liquid chamber 516 is located on the auxiliary liquid chamber-side passage 521b side where the flow resistance of the liquid is high out of the main liquid chamber-side passage 521a and the auxiliary liquid chamber-side passage 521b in the flow direction of the liquid in the first orifice passage 521. Also, the rigidity of a lower part of the membrane 537, which forms a portion of the barrier wall of the auxiliary liquid chamber 516, is higher than the rigidity of an upper part of the membrane 537, which forms a portion of the barrier wall of the main liquid chamber 515. In the membrane 537, the rigidity of a lower part of the body part 537b is higher than the rigidity of each of an upper part of the body part 537b and the outer peripheral edge 537a except for the lower part. The reinforcing member 531d is buried at a lower part of the body part 537b.

As described above, according to the vibration-damping device 53 related to the present embodiment, the rigidity of a lower part of the membrane 537, which forms a portion of the barrier wall of the auxiliary liquid chamber 516, is higher than the rigidity of an upper part of the membrane 537, which forms a portion of the barrier wall of the main liquid chamber 515. Thus, when the same pressing force is applied, the amount of swelling deformation of the membrane 537 toward the auxiliary liquid chamber 516 side is larger than that toward the main liquid chamber 515 side. Hence, if the bound load is input to the vibration-damping device 53, the damping force to be generated can be suppressed to be low as the membrane 537 is largely swelled and deformed toward the auxiliary liquid chamber 516 side. On the other hand, if the rebound load is input to the vibration-damping device 53, the swelling deformation of the membrane 537 toward the main liquid chamber 515 side becomes smaller than the swelling deformation of the membrane 537 toward the auxiliary liquid chamber 516 side when the bound load is input, the negative pressure of the main liquid chamber 515 is not easily relieved, and the damping force to be generated becomes high.

Additionally, the flow resistance of the liquid in the main liquid chamber-side passage 521a is lower than the flow resistance of the liquid in the auxiliary liquid chamber-side passage 521b. Thus, when the rebound load is input and when the liquid on the auxiliary liquid chamber 516 side flows into the auxiliary liquid chamber-side passage 521b, a larger resistance is applied compared to a case where the liquid directly flows into the main liquid chamber-side passage 521a. As a result, a high damping force can be generated when the rebound load is input. On the other hand, when the liquid of the main liquid chamber 515 flows through the first orifice passage 521 toward the auxiliary liquid chamber 516, even if the flow resistance is different between the main liquid chamber-side passage 521a and the auxiliary liquid chamber-side passage 521b, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Since the uneven swelling part 536 is formed in the membrane 537, when the same pressing force is applied, the amount of swelling deformation of the membrane 537 toward the auxiliary liquid chamber 516 side is larger than that toward the main liquid chamber 515 side. Hence, if the bound load is input to the vibration-damping device 53, the damping force to be generated can be suppressed to be low as the membrane 537 is largely swelled and deformed toward the auxiliary liquid chamber 516 side by the uneven swelling part 536. On the other hand, if the rebound load is input to the vibration-damping device 53, the swelling deformation of the membrane 537 toward the main liquid chamber 515 side becomes smaller than the swelling deformation of the membrane 537 toward the auxiliary liquid chamber 516 side when the bound load is input, the negative pressure of the main liquid chamber 515 is not easily relieved, and the damping force to be generated becomes high.

As described above, the damping force generated when the rebound load is input can be reliably made higher than the damping force generated when the bound load is input, and the difference between both these damping forces can be increased, and the ratio of the damping force generated when the rebound load is input to the damping force generated when the bound load is input can be reliably increased.

Additionally, since the uneven swelling part 536 is curved so as to project toward the main liquid chamber 515 side, a configuration in which the swelling deformation of the membrane 537 toward the auxiliary liquid chamber 516 side is larger than the swelling deformation of the membrane 537 toward the main liquid chamber 515 side when the same pressing force is applied to the membrane 537 can be easily and reliably realized. Additionally, the uneven swelling part 536 is integrally formed over the entire body part 537b, which is located radially inside the outer peripheral edge 537a sandwiched in the axial direction by the sandwiching member 539, in the membrane 537. Thus, it is possible to largely swell and deform the membrane 537 toward the auxiliary liquid chamber 516 side, and the damping force generated when the bound load is input and the damping force generated when the rebound load is input can be made greatly different from each other.

Additionally, in the present embodiment, the first sandwiching part 527, which protrudes longer inward in the radial direction than the second sandwiching part 529, supports the membrane 537 from the main liquid chamber 515 side. Thus, when the same pressing force is applied, the amount of swelling deformation of the membrane 537 toward the main liquid chamber 515 side is smaller than that toward the auxiliary liquid chamber 516 side. That is, if the rebound load is input to the vibration-damping device 53, the swelling deformation of the membrane 537 toward the main liquid chamber 515 side is restrained by the first sandwiching part 527, the negative pressure of the main liquid chamber 515 is not easily relieved, and the damping force to be generated becomes high. On the other hand, if the bound load is input to the vibration-damping device 53, the swelling deformation of the membrane 537 toward the auxiliary liquid chamber 516 side becomes larger than the swelling deformation of the membrane 537 toward the main liquid chamber 515 side when the rebound load is input to such an extent that the second sandwiching part 529 does not protrude inward in the radial direction from the first sandwiching part 527, and the damping force to be generated can be suppressed to be low. As described above, the ratio of the damping force generated when the rebound load is input to the damping force generated when the bound load is input can be much more reliably increased.

Additionally, the lower surface of the inner peripheral edge of the first sandwiching part 527, which abuts against the membrane 537, is gradually inclined so as to be separated from the auxiliary liquid chamber 516 inward in the radial direction. Thus, when the rebound load is input and when the membrane 537 is swelled and deformed toward the main liquid chamber 515 side, the membrane 537 can easily come into surface contact with the inner peripheral edge of the first sandwiching part 527, the generation of abnormal noise can be suppressed, and the durability of the membrane 537 can be secured. Additionally, the membrane 537 abuts against the inner peripheral edge of the first sandwiching part 527. Thus, when the rebound load is input, it is possible to inhibit the membrane 537 from colliding against the inner peripheral edge of the first sandwiching part 527, and the generation of abnormal noise can be reliably suppressed. Additionally, the membrane 537 abuts against the inner peripheral edge of the first sandwiching part 527. Thus, even with vibration of a relatively small amplitude, a high damping force can be generated when the rebound load is input.

Additionally, the radial gap is provided between the outer peripheral surface 537c of the body part 537b of the membrane 537 and the inner peripheral surface of the second sandwiching part 529. Thus, even with vibration of a relatively small amplitude, when the bound load is input, it is possible to smoothly swell and deform the membrane 537 toward the auxiliary liquid chamber 516 side, and the damping force to be generated can be reliably suppressed to be low. Additionally, when the membrane 537 tends to be excessively largely swelled and deformed toward the auxiliary liquid chamber 516 side at the time of the input of the bound load, the outer peripheral surface 537c of the body part 537b can be made to abut against the inner peripheral surface of the second sandwiching part 529, and a large load can be prevented from being applied to the connection portion between the outer peripheral edge 537a and the body part 537b in the membrane 537.

Additionally, since the uneven swelling part 536 overhangs to the inside of the first sandwiching part 527, a configuration in which the swelling deformation of the membrane 537 toward the auxiliary liquid chamber 516 side is made larger than the swelling deformation of the membrane 537 toward the main liquid chamber 515 side when the same pressing force is applied can be much more reliably realized.

Thirteenth Embodiment

Figure 25:
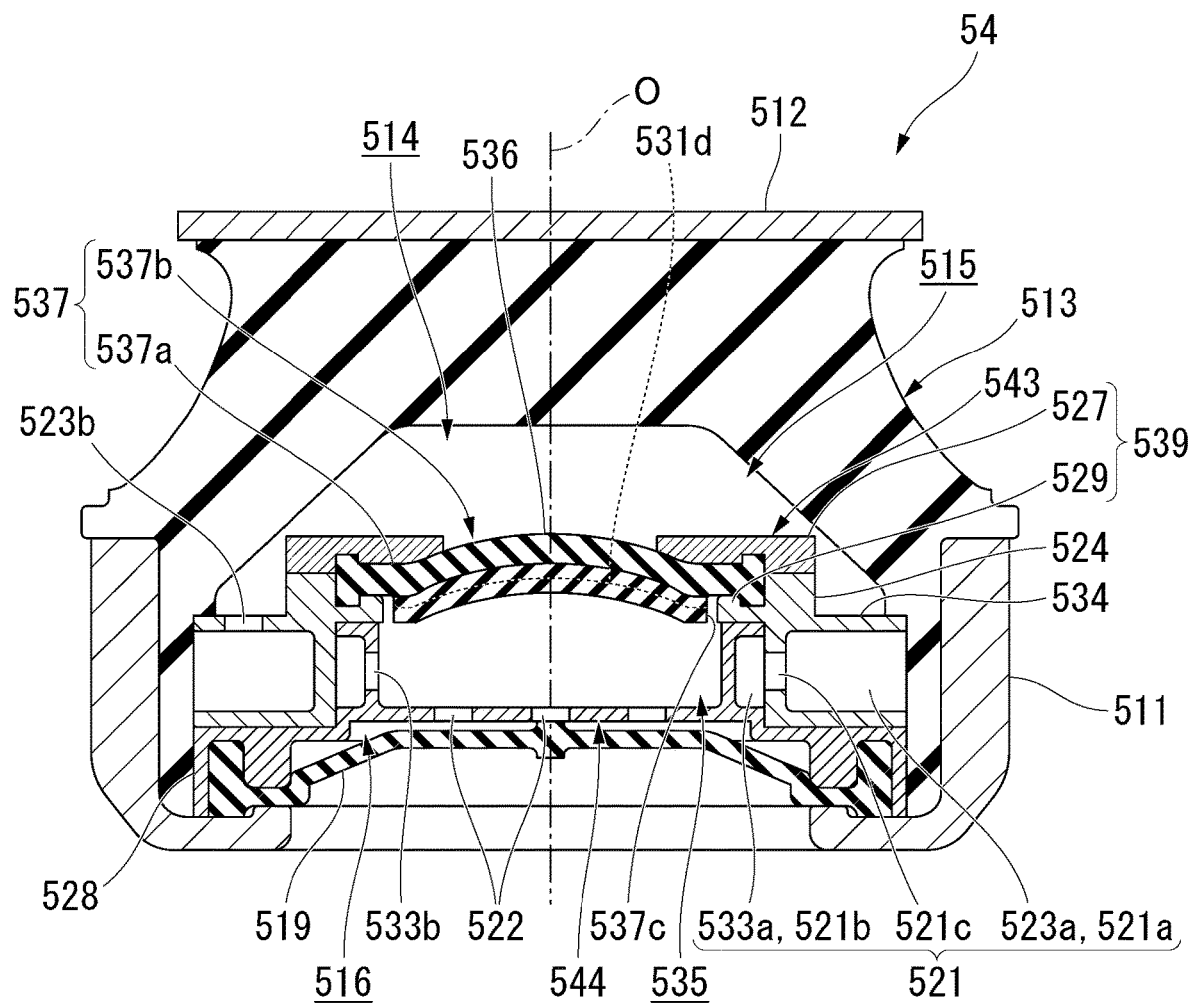
FIG. 25 is a longitudinal sectional view of a vibration-damping device related to a thirteenth embodiment of the invention.
Figure 26:
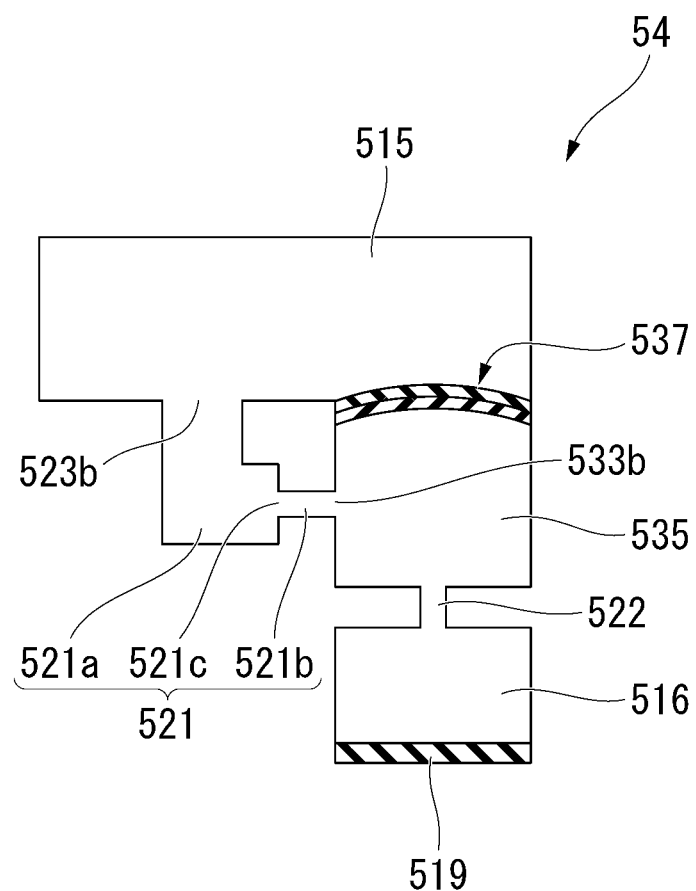
FIG. 26 is a schematic view of the vibration-damping device shown in FIG. 25.

Next, a vibration-damping device 54 related to a thirteenth embodiment of the invention will be described, referring to FIGS. 25 and 26. In addition, in the thirteenth embodiment, the same portions as the constituent elements in the above-described twelfth embodiment will be designated by the same reference signs, and a description thereof will be omitted, and only different points will be described.

As mentioned above, the portion of the first orifice passage, which is located opposite to the main liquid chamber with the membrane therebetween and is located on the liquid chamber (opposite liquid chamber) having the membrane in a portion of a barrier wall thereof, is referred to as an opposite liquid chamber-side passage. In the present embodiment, the partition member 543 includes an intermediate liquid chamber 535 that is located opposite to the main liquid chamber 515 with the membrane 537 therebetween, has the membrane as a portion of a barrier wall thereof, and allows the opposite liquid chamber-side passage 521b of the first orifice passage 521 and the auxiliary liquid chamber 516 to communicate with each other, and the first orifice passage 521 allows the main liquid chamber 515 and the intermediate liquid chamber 535 to communicate with each other. That is, the opposite liquid chamber of the present embodiment is the intermediate liquid chamber 535, and the opposite liquid chamber-side passage 521b may be referred to as an intermediate liquid chamber-side passage.

The intermediate liquid chamber 535 is located on the intermediate liquid chamber-side passage 521b side where the flow resistance of the liquid is high out of the main liquid chamber-side passage 521a and the intermediate liquid chamber-side passage 521b in the flow direction of the liquid in the first orifice passage 521.

Here, the lower member 544 is formed in a bottomed tubular shape, is disposed coaxially with the central axis O and blocks a lower end opening part of the body member 534. An upper surface of the bottom wall part of the lower member 544 is separated downward from the lower surface of the membrane 537. The aforementioned intermediate liquid chamber 535 is defined by the upper surface of the bottom wall part and an inner peripheral surface of the peripheral wall part in the lower member 544a and the lower surface of the membrane 537. That is, the intermediate liquid chamber 535 has the membrane 537 as a portion of a barrier wall thereof, and the intermediate liquid chamber 535 and the main liquid chamber 515 are partitioned in the axial direction by the membrane 537. The internal volume of the intermediate liquid chamber 535 is smaller than the internal volume of the main liquid chamber 515. A second communication hole 533b formed in an inner peripheral surface of a peripheral wall part of the lower member 544 allows the second orifice groove 533a and the intermediate liquid chamber 535 to communicate with each other in the radial direction.

The auxiliary liquid chamber 516 is defined by a lower surface of the bottom wall part in the lower member 544 and the diaphragm 519. A bottom wall part of the lower member 544 forms a barrier wall that partitions the auxiliary liquid chamber 516 and the intermediate liquid chamber 535 in the axial direction. A second orifice passage 522, which allows the auxiliary liquid chamber 516 and the intermediate liquid chamber 535 to communicate with each other, is formed in the bottom wall part of the lower member 544. The second orifice passage 522 allows the auxiliary liquid chamber 516 and the intermediate liquid chamber 535 to communicate with each other in the axial direction. An opening part of the second orifice passage 522 on the intermediate liquid chamber 535 side faces the membrane 537. The second orifice passage 522 is a through-hole formed in the bottom wall part of the lower member 544, and a plurality of the second orifice passages 522 are formed in the bottom wall part of the lower member 544. At least some of the second orifice passages 522 face the membrane 537 in the axial direction.

The channel cross-sectional area and the channel length of each second orifice passage 522 are smaller than the channel cross-sectional area and the channel length of the first orifice passage 521. The channel length of the second orifice passage 522 is smaller than the internal diameter thereof. In addition, the channel length of the second orifice passage 522 may be equal to or greater than the internal diameter. The flow resistance of the liquid in each second orifice passage 522 is smaller than the flow resistance of the liquid in the first orifice passage 521.

Additionally, in the present embodiment, an opening direction in which the first orifice passage 521 opens toward the intermediate liquid chamber 535, that is, an opening direction of the second communication hole 533b toward the intermediate liquid chamber 535 intersects an opening direction in which the second orifice passage 522 opens toward the intermediate liquid chamber 535. In the example shown, the second communication hole 533b opens in the radial direction toward the intermediate liquid chamber 535, and the second orifice passage 522 opens in the axial direction toward the intermediate liquid chamber 535. That is, the opening direction of the second communication hole 533b toward the intermediate liquid chamber 535 is orthogonal to the opening direction in which the second orifice passage 522 opens toward the intermediate liquid chamber 535.

Additionally, in the present embodiment, the cross-sectional area of the intermediate liquid chamber 535 in the direction orthogonal to the opening direction in which the second orifice passage 522 opens toward the intermediate liquid chamber 535 is larger than the channel cross-sectional area of the second orifice passage 522, the channel cross-sectional area of the intermediate liquid chamber-side passage 521b of the first orifice passage 521, and the channel cross-sectional area of the main liquid chamber-side passage 521a of the first orifice passage 521.

As described above, according to the vibration-damping device 54 related to the present embodiment, the partition member 543 includes the intermediate liquid chamber 535 in addition to the functions and effects achieved by the vibration-damping device 53 of the twelfth embodiment. Thus, a high damping force can be generated.

Additionally, since the cross-sectional area of the intermediate liquid chamber 535 is larger than the channel cross-sectional area of the intermediate liquid chamber-side passage 521b of the first orifice passage 521, it is possible to reliably increase the resistance generated when the liquid of the intermediate liquid chamber 535 flows into the intermediate liquid chamber-side passage 521b, and the damping force generated when the rebound load is input can be reliably increased. Additionally, since the intermediate liquid chamber-side passage 521b of the first orifice passage 521 is a passage having a longer channel length than a channel diameter, the resistance applied to the liquid from the auxiliary liquid chamber 516 side that flows into this passage can be increased, and the damping force generated when the rebound load is input can be much more reliably increased.

The vibration-damping devices 51 to 54 related to the tenth to thirteenth embodiments described above include the tubular first attachment member 511 that is coupled to any one of the vibration generating part and the vibration receiving part, the second attachment member 512 that is coupled to the other thereof, the elastic body 513 that couples the first attachment member 511 and the second attachment member 512 to each other, and the partition member 517 that partitions the liquid chamber within the first attachment member 511 into the main liquid chamber 515 having the elastic body 513 in a portion of a barrier wall thereof and the auxiliary liquid chamber 516, and the partition member 517, 541, or 543 includes the membrane 531 or 537 that forms a portion of the barrier wall of the main liquid chamber 515, the first orifice passage 521 that allows the main liquid chamber 515 and the opposite liquid chamber, which is located opposite to the main liquid chamber 515 with the membrane 531 or 537 therebetween and has the membrane 531 or 537 in a portion of the barrier wall thereof, to communicate with each other and in which the flow resistance of the liquid in the opposite liquid chamber-side passage located on the opposite liquid chamber side is different from the flow resistance of the liquid in the main liquid chamber-side passage 521a located on the main liquid chamber 515 side, and the damping force difference increasing part that restrains any one of the swelling deformation of the membrane 531 or 537 toward the main liquid chamber 515 side and the swelling deformation of the membrane 531 or 537 toward the opposite liquid chamber and increases a difference between the damping force generated when the bound load is input and the damping force generated when the rebound load is input.

As a result, since the vibration-damping devices 51 to 54 include the damping force difference increasing part, any one of the swelling deformation of the membrane 531 or 537 toward the main liquid chamber 515 side and the swelling deformation of the membrane 531 or 537 toward the opposite liquid chamber is restrained, and the difference between the damping force generated when the bound load is input and the damping force generated when the rebound load is input is increased.

Here, the partition member 541 or 543 may further include the intermediate liquid chamber 535 that is the opposite liquid chamber, and the second orifice passage 522 that allows the intermediate liquid chamber 535 and the auxiliary liquid chamber 516 to communicate with each other, the first orifice passage 521 may include the main liquid chamber-side passage 521a, and the intermediate liquid chamber-side passage 521b that is located on the intermediate liquid chamber 535 side as the opposite liquid chamber-side passage, the damping force difference increasing part may include the membrane 531 or 537 in which the rigidity of the portion, which forms a portion of the barrier wall of any one liquid chamber of the intermediate liquid chamber 535 and the main liquid chamber 515, is higher than the rigidity of the portion that forms a portion of the barrier wall of the second liquid chamber, and the one liquid chamber may be located on one passage side having a higher liquid flow resistance than on the second passage side, out of the main liquid chamber-side passage 521a and the intermediate liquid chamber-side passage 521b, in the flow direction of the liquid in the first orifice passage 521.

In this case, the rigidity of the portion of the membrane 531 or 537, which forms a portion of a barrier wall of any one liquid chamber of the intermediate liquid chamber 535, which is a liquid chamber (hereinafter, referred to as an opposite liquid chamber) located opposite to the main liquid chamber 515 with the membrane 531 or 537 therebetween, and the main liquid chamber 515, is higher than the rigidity of the portion of the membrane 531 or 537 that forms a portion of a barrier wall of the second liquid chamber. Thus, when the same pressing force is applied, the swelling deformation of the membrane 531 or 537 toward the one liquid chamber side is larger than the swelling deformation of the membrane toward the second liquid chamber side. Specifically, in a case where the flow resistance of the liquid in the main liquid chamber-side passage 521a in the first orifice passage 521 is higher than the flow resistance of the liquid in the intermediate liquid chamber-side passage 521b, the rigidity of the portion of the membrane 531, which forms a portion of a barrier wall of the main liquid chamber 515, is higher than the rigidity of the portion of the membrane 531 that forms a portion the barrier wall of the intermediate liquid chamber 535. As a result, when the same pressing force is applied, the amount of swelling deformation of the membrane 531 toward the main liquid chamber 515 side is larger than that toward the intermediate liquid chamber 535 side. Hence, if the rebound load is input to the vibration-damping device 52, the damping force to be generated can be suppressed to be low as the membrane 531 is largely swelled and deformed toward the main liquid chamber 515 side. On the other hand, if the rebound load is input to the vibration-damping device 52, the swelling deformation of the membrane 531 toward the intermediate liquid chamber 535 side becomes smaller than the swelling deformation of the membrane toward the main liquid chamber 515 side when the bound load is input, the positive pressure of the main liquid chamber 515 is not easily relieved, and the damping force to be generated becomes high. Additionally, as mentioned above, in a case where the flow resistance of the liquid in the main liquid chamber-side passage 521*a* is higher than the flow resistance of the liquid in the intermediate liquid chamber-side passage 521*b*, when the bound load is input and when the liquid of the main liquid chamber 515 flows into the main liquid chamber-side passage 521*a*, a larger resistance is applied compared to a case where the liquid directly flows into the intermediate liquid chamber-side passage 521*b*. As a result, a high damping force can be generated when the bound load is input. On the other hand, when the liquid on the intermediate liquid chamber 535 side flows through the first orifice passage 521 toward the main liquid chamber 515, even if the flow resistance is different between the main liquid chamber-side passage 521*a* and the intermediate liquid chamber-side passage 521*b*, both the passages constitute one orifice passage continuously with each other. Thus, it is possible to suppress the resistance generated when the liquid passes through a boundary portion therebetween, and the damping force generated when the rebound load is input can be suppressed to be low. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased. Moreover, the rigidity of the portion of the membrane 531, which forms a portion of a barrier wall of the intermediate liquid chamber 535, is lower than the rigidity of the portion of the membrane 531 that forms a portion of a barrier wall of the main liquid chamber 515. Therefore, when the main liquid chamber 515 tends to have a negative pressure suddenly with the input of a large rebound load, it is possible to smoothly swell and deform the membrane 531 toward the main liquid chamber side 515, and the negative pressure of the main liquid chamber 515 can be suppressed, and occurrence of cavitation can be suppressed.

Contrary to the above, in a case where the flow resistance of the liquid in the intermediate liquid chamber-side passage 521*b* is higher than the flow resistance of the liquid in the main liquid chamber-side passage 521*a*, the rigidity of the portion of the membrane 537, which forms a portion of a barrier wall of the intermediate liquid chamber 535, is higher than the rigidity of the portion of the membrane 537 that forms a portion the barrier wall of the main liquid chamber 515. As a result, when the same pressing force is applied, the amount of swelling deformation of the membrane 537 toward the intermediate liquid chamber 535 side is larger than that toward the main liquid chamber 515 side. Hence, if the bound load is input to the vibration-damping device 54, the damping force to be generated can be suppressed to be low as the membrane 537 is largely swelled and deformed toward the intermediate liquid chamber 535 side. On the other hand, if the rebound load is input to the vibration-damping device 54, the swelling deformation of the membrane 537 toward the main liquid chamber 515 side becomes smaller than the swelling deformation of the membrane 537 toward the intermediate liquid chamber side when the bound load is input, the negative pressure of the main liquid chamber 515 is not easily relieved, and the damping force to be generated becomes high. Additionally, as mentioned above, in a case where the flow resistance of the liquid in the main liquid chamber-side passage 521*a* is lower than the flow resistance of the liquid in the intermediate liquid chamber-side passage 521*b*, when the rebound load is input and when the liquid on the intermediate liquid chamber 535 side flows into the intermediate liquid chamber-side passage 521*b*, a larger resistance is applied compared to a case where the liquid directly flows into the main liquid chamber-side passage 521*a*. As a result, a high damping force can be generated when the rebound load is input. On the other hand, when the liquid of the main liquid chamber 515 flows through the first orifice passage 521 toward the intermediate liquid chamber 535, even if the flow resistance is different between the main liquid chamber-side passage 521*a* and the intermediate liquid chamber-side passage 521*b*, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Additionally, the aforementioned respective functions and effects are achieved by a configuration in which the flow resistance of the liquid in the intermediate liquid chamber-side passage 521*b* and the flow resistance of the liquid in the main liquid chamber-side passage 521*a* are different from each other and the rigidity of the portion of the membrane 531 or 537, which forms a portion of a barrier wall of the main liquid chamber 515 and the rigidity of the portion of the membrane 531 or 537, which forms a portion of a barrier wall of the intermediate liquid chamber 535, are different from each other, as mentioned above, without adopting, for example, members that operate when the liquid pressure within the main liquid chamber 515 reaches a predetermined value. Therefore, the aforementioned functions and effects can be stably and accurately achieved even with vibration of a relatively small amplitude.

Here, since the reinforcing member 531*d* may be buried in the portion of the membrane 531 or 537 that forms a portion of a barrier wall of the one liquid chamber.

In this case, since the reinforcing member 531*d* is buried in the portion of the membrane 531 or 537 that forms a portion of a barrier wall of the one liquid chamber, even if the thickness of the membrane 531 or 537 is not excessively increased, the membrane 531 or 537 can be easily provided with the aforementioned difference in rigidity.

Additionally, the first orifice passage 521 may include the main liquid chamber-side passage 521*a*, and the auxiliary liquid chamber-side passage 521*b* that is located on the auxiliary liquid chamber 516 side as the opposite liquid chamber-side passage, the damping force difference increasing part may include the membrane 531 or 537 in which the rigidity of the portion, which forms a portion of a barrier wall of any one liquid chamber of the auxiliary liquid chamber 516 and the main liquid chamber 515, is higher than the rigidity of the portion that forms a portion of a barrier wall of the second liquid chamber, and the one liquid chamber may be located on one passage side having a higher liquid flow resistance than on the second passage side, out of the main liquid chamber-side passage 521*a* and the auxiliary liquid chamber-side passage 521*b*, in the flow direction of the liquid in the first orifice passage 521.

In this case, the rigidity of the portion of the membrane 531 or 537, which forms a portion of a barrier wall of any one liquid chamber of the auxiliary liquid chamber 516, which is a liquid chamber (hereinafter, referred to as an opposite liquid chamber) located opposite to the main liquid chamber 515 with the membrane 531 or 537 therebetween, and the main liquid chamber 515, is higher than the rigidity of the portion of the membrane 531 or 537 that forms a portion of a barrier wall of the second liquid chamber. Thus, when the same pressing force is applied, the swelling deformation of the membrane 531 or 537 toward the one liquid chamber side is larger than the swelling deformation of the membrane 531 or 537 toward the second liquid chamber side. Specifically, in a case where the flow resistance of the liquid in the main liquid chamber-side passage 521a in the first orifice passage 521 is higher than the flow resistance of the liquid in the auxiliary liquid chamber-side passage 521b, the rigidity of the portion of the membrane 531, which forms a portion of a barrier wall of the main liquid chamber 515, is higher than the rigidity of the portion of the membrane 531 that forms a portion the barrier wall of the auxiliary liquid chamber 516. As a result, when the same pressing force is applied, the amount of swelling deformation of the membrane 531 toward the main liquid chamber 515 side is larger than that toward the auxiliary liquid chamber 516 side. Hence, if the rebound load is input to the vibration-damping device 51, the damping force to be generated can be suppressed to be low as the membrane 531 is largely swelled and deformed toward the main liquid chamber 515 side. On the other hand, if the bound load is input to the vibration-damping device 51, the swelling deformation of the membrane 531 toward the auxiliary liquid chamber 516 side becomes smaller than the swelling deformation of the membrane 531 toward the main liquid chamber 515 side when the rebound load is input, the positive pressure of the main liquid chamber 515 is not easily relieved, and the damping force to be generated becomes high. Additionally, as mentioned above, in a case where the flow resistance of the liquid in the main liquid chamber-side passage 521a is higher than the flow resistance of the liquid in the auxiliary liquid chamber-side passage 521b, when the bound load is input and when the liquid of the main liquid chamber flows into the main liquid chamber-side passage 521a, a larger resistance is applied compared to a case where the liquid directly flows into the auxiliary liquid chamber-side passage 521b. As a result, a high damping force can be generated when the bound load is input. On the other hand, when the liquid on the auxiliary liquid chamber 516 side flows through the first orifice passage 521 toward the main liquid chamber 515, even if the flow resistance is different between the main liquid chamber-side passage 521a and the auxiliary liquid chamber-side passage 521b, both the passages constitute one orifice passage continuously with each other. Thus, it is possible to suppress the resistance generated when the liquid passes through a boundary portion therebetween, and the damping force generated when the rebound load is input can be suppressed to be low. As described above, the damping force generated when the bound load is input can be reliably made higher than the damping force generated when the rebound load is input, and the difference between both the damping forces can be increased, and the ratio of the damping force generated when the bound load is input to the damping force generated when the rebound load is input can be increased. Moreover, the rigidity of the portion of the membrane 531, which forms a portion of the barrier wall of the auxiliary liquid chamber 516, is lower than the rigidity of the portion of the membrane 531 that forms a portion of the barrier wall of the main liquid chamber 515. Therefore, when the main liquid chamber 515 tends to have a negative pressure suddenly with the input of a large rebound load, it is possible to smoothly swell and deform the membrane 531 toward the main liquid chamber 515 side, and the negative pressure of the main liquid chamber 515 can be suppressed, and occurrence of cavitation can be suppressed.

Contrary to the above, in a case where the flow resistance of the liquid in the auxiliary liquid chamber-side passage 521b is higher than the flow resistance of the liquid in the main liquid chamber-side passage 521a, the rigidity of the portion of the membrane 537, which forms a portion of a barrier wall of the auxiliary liquid chamber 517, is higher than the rigidity of the portion of the membrane 537 that forms a portion the barrier wall of the main liquid chamber 515. As a result, when the same pressing force is applied, the amount of swelling deformation of the membrane 537 toward the auxiliary liquid chamber 516 side is larger than that toward the main liquid chamber 515 side. Hence, if the bound load is input to the vibration-damping device 53, the damping force to be generated can be suppressed to be low as the membrane 537 is largely swelled and deformed toward the auxiliary liquid chamber 516 side. On the other hand, if the rebound load is input to the vibration-damping device 53, the swelling deformation of the membrane 537 toward the main liquid chamber side becomes smaller than the swelling deformation of the membrane toward the auxiliary liquid chamber 516 side when the bound load is input, the negative pressure of the main liquid chamber 515 is not easily relieved, and the damping force to be generated becomes high. Additionally, as mentioned above, in a case where the flow resistance of the liquid in the main liquid chamber-side passage 521a is lower than the flow resistance of the liquid in the auxiliary liquid chamber-side passage 521b, when the rebound load is input and when the liquid on the auxiliary liquid chamber 516 side flows into the auxiliary liquid chamber-side passage 521b, a larger resistance is applied compared to a case where the liquid directly flows into the main liquid chamber-side passage 521a. As a result, a high damping force can be generated when the rebound load is input. On the other hand, when the liquid of the main liquid chamber 515 flows through the first orifice passage 521 toward the auxiliary liquid chamber 516, even if the flow resistance is different between the main liquid chamber-side passage 521a and the auxiliary liquid chamber-side passage 521b, both the passages constitute one orifice passage continuously with each other. Thus, it is possible to suppress the resistance generated when the liquid passes through a boundary portion therebetween, and the damping force generated when the bound load is input can be suppressed. As described above, the damping force generated when the rebound load is input can be reliably made higher than the damping force generated when the bound load is input, and the difference between both the damping forces can be increased, and the ratio of the damping force generated when the rebound load is input to the damping force generated when the bound load is input can be increased.

Additionally, the aforementioned respective functions and effects are achieved by a configuration in which the flow resistance of the liquid in the auxiliary liquid chamber-side passage 521b and the flow resistance of the liquid in the main liquid chamber-side passage 521a are different from each other and the rigidity of the portion of the membrane 531 or 537, which forms a portion of a barrier wall of the main liquid chamber 515 and the rigidity of the portion of the membrane 531 or 537, which forms a portion of a barrier wall of the auxiliary liquid chamber 516, are different from each other, as mentioned above, without adopting, for example, members that operate when the liquid pressure within the main liquid chamber 515 reaches a predetermined value. Therefore, the aforementioned functions and effects can be stably and accurately achieved even with vibration of a relatively small amplitude.

Here, since the reinforcing member 531d may be buried in the portion of the membrane 531 or 537 that forms a portion of a barrier wall of the one liquid chamber.

In this case, since the reinforcing member 531d is buried in the portion of the membrane 531 or 537 that forms a portion of a barrier wall of the one liquid chamber, even if the thickness of the membrane 531 or 537 is not excessively increased, the membrane 531 or 537 can be easily provided with the aforementioned difference in rigidity.

In addition, the technical scope of the invention is not limited to the above embodiment, and various changes can be made without departing the spirit of the invention.

For example, in the above respective embodiments, the first orifice passage 521 extends in the circumferential direction, and the second orifice passage 522 extends in the axial direction. However, the invention is not limited to this. Additionally, the membrane 531 or 537 may not have the uneven swelling part 523 or 536. Additionally, in the above respective embodiments, the first sandwiching part 525 or 527 protrudes longer inward in the radial direction than the second sandwiching part 538 or 529. However, the invention is not limited to this. For example, the second sandwiching part 538 or 529 may protrude longer inward in the radial direction than the first sandwiching part 525 or 527, or the respective inner peripheral surface of the first sandwiching part 525 or 527 and the second sandwiching part 538 or 529 may be located at the same position in the radial direction.

Additionally, in the above respective embodiments, the compression type vibration-damping devices 51 to 54 in which the positive pressure acts on the main liquid chamber 515 as the support load acts have been described. However, it is also applicable to a hanging-type vibration-damping device that is attached such that the main liquid chamber 515 is located on the lower side in a vertical direction and the auxiliary liquid chamber 516 is located on the upper side in the vertical direction and the negative pressure acts on the main liquid chamber 515 as the support load acts. Additionally, the vibration-damping devices 51 to 54 related to the invention are not limited to engine mounts of vehicles and is also applicable to those other than the engine mounts. For example, the vibration-damping device is also applicable to mounts of power generators loaded on construction machines or is also applicable to mounts of machines installed in factories or the like.

In addition, it is possible to appropriately substitute the constituent elements in the above-described embodiments with well-known constituent elements without departing from the spirit of the invention. Additionally, the above-described modification examples may be combined appropriately.

In the first to thirteenth embodiments described above, the respective constituent elements of the above first to thirteenth embodiments may be combined with each other without departing from the spirit of the invention.

INDUSTRIAL APPLICABILITY

According to the invention, the damping force generated when the bound load is input and the damping force generated when the rebound load is input can be made different from each other.

REFERENCE SIGNS LIST 11, 12, 21, 22, 41 to 45, 51 to 54: vibration-damping device
111, 211, 411, 511: first attachment member
112, 212, 412, 512: second attachment member
113, 213, 413, 513: elastic body
114, 214, 414, 514: liquid chamber
115, 215, 415, 515: main liquid chamber
116, 216, 416, 516: auxiliary liquid chamber
135, 235, 435, 535: intermediate liquid chamber
117, 217, 417, 517, 541, 543: partition member
121, 221, 421, 521: first orifice passage
121a, 221a, 421a, 521a: main liquid chamber-side passage
121b, 221b, 421b, 521b: opposite liquid chamber-side passage (intermediate liquid chamber-side passage, auxiliary liquid chamber-side passage)
122, 222, 422, 522: second orifice passage
126, 127: restraining member (damping force difference increasing part)
131, 231, 237, 431, 437: membrane
531, 537: membrane (damping force difference increasing part)
223, 236, 423, 426, 523, 536: uneven swelling part (damping force difference increasing part)
231a, 237a, 431a, 437a, 531a, 537a: outer peripheral edge
225, 227, 425, 427, 525, 527: first sandwiching part (damping force difference increasing part)
238, 229, 438, 429, 538, 529: second sandwiching part (damping force difference increasing part)
441: support projection
531d: reinforcing member

The invention claimed is:
1. A vibration-damping device comprising:
a tubular first attachment member that is coupled to any one of a vibration generating part and a vibration receiving part, and a second attachment member that is coupled to the other thereof;
an elastic body that couples the first attachment member and the second attachment member to each other; and
a partition member that partitions a liquid chamber within the first attachment member into a main liquid chamber having the elastic body in a portion of a barrier wall thereof, and an auxiliary liquid chamber,
wherein the partition member includes
a membrane that forms a portion of the barrier wall of the main liquid chamber,
a first orifice passage that is configured to allow the main liquid chamber and an opposite liquid chamber, which is located opposite to the main liquid chamber side with the membrane therebetween and has the membrane as a portion of a barrier wall thereof, to communicate with each other and in which a flow resistance of a liquid in an opposite liquid chamber-side passage located on the opposite liquid chamber side is different from a flow resistance of the liquid in a main liquid chamber-side passage located on the main liquid chamber side, a damping force difference increasing part that restrains any one of swelling deformation of the membrane toward the main liquid chamber side and swelling deformation of the membrane toward the opposite liquid chamber and increases a difference between a damping force generated when a bound load is input and a damping force generated when a rebound load is input, wherein the partition member further includes an intermediate liquid chamber that is the opposite liquid chamber, and a second orifice passage that is configured to allow the intermediate liquid chamber and the auxiliary liquid chamber to communicate with each other, wherein the first orifice passage includes the main liquid chamber-side passage, and an intermediate liquid chamber-side passage that is located on the intermediate liquid chamber side as the opposite liquid chamber-side passage, wherein the damping force difference increasing part includes an uneven swelling part that is formed in the membrane and makes, compared to the swelling deformation of the membrane toward any one liquid chamber side of the main liquid chamber and the intermediate liquid chamber, the swelling deformation of the membrane toward a second liquid chamber side larger when the same pressing force is applied to the membrane, and wherein the one liquid chamber is located on one passage side with the liquid flow resistance smaller than on a second passage side, out of the main liquid chamber-side passage and the intermediate liquid chamber-side passage, in a flow direction of the liquid in the first orifice passage, and wherein an other passage having a larger liquid flow resistance than the one passage out of the main liquid chamber-side passage and the intermediate liquid chamber-side passage is a passage having a longer channel length than a channel diameter.

2. The vibration-damping device according to claim 1, wherein the uneven swelling part is curved so as to project toward the one liquid chamber side.

3. The vibration-damping device according to claim 2, wherein the damping force difference increasing part further includes a sandwiching member that sandwiches an outer peripheral edge of the membrane from both directions of the main liquid chamber side and the intermediate liquid chamber side, and wherein the uneven swelling part is integrally formed over an entire region of a portion of the membrane located radially inside the outer peripheral edge.

4. The vibration-damping device according to claim 1, wherein the damping force difference increasing part includes a sandwiching member that sandwiches an outer peripheral edge of the membrane from both directions of the main liquid chamber side and the intermediate liquid chamber side, wherein the sandwiching member includes a first sandwiching part that supports the membrane from one liquid chamber side, which is located on the one passage side in the flow direction of the liquid in the first orifice passage, out of the main liquid chamber and the intermediate liquid chamber, and a second sandwiching part that supports the membrane from the second liquid chamber side located on the second passage side in the flow direction of the liquid in the first orifice passage, and wherein the first sandwiching part protrudes longer inward in a radial direction than the second sandwiching part.

5. The vibration-damping device according to claim 4, wherein a portion of an inner peripheral edge of the first sandwiching part, which abuts against the membrane, is gradually inclined so as to be spaced away from the second liquid chamber as going inward in the radial direction.

6. The vibration-damping device according to claim 4, wherein the membrane includes an outer peripheral edge that is sandwiched by the sandwiching member, and a body part that is located radially inside the outer peripheral edge and is formed to be thick, and wherein a gap is provided in the radial direction between an outer peripheral surface of a portion of the body part located closer to the second liquid chamber side than the outer peripheral edge, and an inner peripheral surface of the second sandwiching part.

7. The vibration-damping device according to claim 4, wherein the uneven swelling part is formed in a curved surface shape that projects toward the one liquid chamber side.

8. The vibration-damping device according to claim 7, wherein the uneven swelling part overhangs to an inside of the first sandwiching part.

9. The vibration-damping device according to claim 4, wherein at least one of the first sandwiching part and the outer peripheral edge of the membrane is provided with a plurality of support projections that protrude toward and abuts against an other thereof.

* * * * *